(12) United States Patent
Chiou et al.

(10) Patent No.: US 11,099,906 B2
(45) Date of Patent: Aug. 24, 2021

(54) HANDLING TENANT REQUESTS IN A SYSTEM THAT USES HARDWARE ACCELERATION COMPONENTS

(71) Applicant: Microsoft Technology Licensing, LLC, Redmond, WA (US)

(72) Inventors: Derek T. Chiou, Austin, TX (US); Sitaram V. Lanka, Mercer Island, WA (US); Douglas C. Burger, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 23 days.

(21) Appl. No.: 16/128,224

(22) Filed: Sep. 11, 2018

(65) Prior Publication Data

US 2019/0012209 A1 Jan. 10, 2019

Related U.S. Application Data

(63) Continuation of application No. 14/717,752, filed on May 20, 2015, now Pat. No. 10,198,294.
(Continued)

(51) Int. Cl.
  *G06F 9/46* (2006.01)
  *G06F 9/50* (2006.01)
  *H04L 29/08* (2006.01)

(52) U.S. Cl.
  CPC .......... *G06F 9/5044* (2013.01); *G06F 9/5027* (2013.01); *H04L 67/00* (2013.01)

(58) Field of Classification Search
  None
  See application file for complete search history.

(56) References Cited

U.S. PATENT DOCUMENTS 5,802,290 A * 9/1998 Casselman .......... G06F 9/30181
                                                    709/201
6,256,758 B1   7/2001 Abramovici et al.
(Continued)

FOREIGN PATENT DOCUMENTS

CN    1890998 A   1/2007
CN  101443750 A   5/2009
(Continued)

OTHER PUBLICATIONS

Charitopoulos et al; (2015) Hardware Task Scheduling for Partially Reconfigurable FPGAs. In: Sano K., Soudris D., Hübner M., Diniz P. (eds) Applied Reconfigurable Computing. ARC 2015. Lecture Notes in Computer Science, vol. 9040. Springer, Cham; Mar. 31, 2015 (Year: 2015).*
(Continued)

*Primary Examiner* — Bing Zhao
(74) *Attorney, Agent, or Firm* — Rainier Patents, P.S.

(57) ABSTRACT

A service mapping component (SMC) is described herein for processing requests by instances of tenant functionality that execute on software-driven host components (or some other components) in a data processing system. The SMC is configured to apply at least one rule to determine whether a service requested by an instance of tenant functionality is to be satisfied by at least one of: a local host component, a local hardware acceleration component which is locally coupled to the local host component, and/or at least one remote hardware acceleration component that is indirectly accessible to the local host component via the local hardware acceleration component. In performing its analysis, the SMC can take into account various factors, such as whether or not the service corresponds to a line-rate service, latency-related considerations, security-related considerations, and so on.

20 Claims, 28 Drawing Sheets

Related U.S. Application Data

(60) Provisional application No. 62/149,488, filed on Apr. 17, 2015.

(56) References Cited

U.S. PATENT DOCUMENTS

| | | | |
|---|---|---|---|
| 6,754,881 B2 | 6/2004 | Kuhlmann et al. | |
| 6,874,108 B1 | 3/2005 | Abramovici et al. | |
| 6,973,608 B1 | 12/2005 | Abramovici et al. | |
| 7,444,454 B2 | 10/2008 | Yancey et al. | |
| 7,533,256 B2 | 5/2009 | Walter et al. | |
| 7,584,345 B2 | 9/2009 | Doering et al. | |
| 7,809,982 B2 | 10/2010 | Rapp et al. | |
| 8,054,172 B2 | 11/2011 | Jung et al. | |
| 8,209,272 B2 | 6/2012 | Little | |
| 8,635,571 B1 | 1/2014 | Goldman | |
| 8,713,574 B2* | 4/2014 | Creamer | G06F 9/5027 718/104 |
| 8,869,160 B2 | 10/2014 | Dillenberger et al. | |
| 8,885,334 B1 | 11/2014 | Baxter | |
| 8,943,352 B1 | 1/2015 | Warneke | |
| 9,032,343 B1 | 5/2015 | Goldman | |
| 9,088,516 B2 | 7/2015 | Vachharajani et al. | |
| 9,294,097 B1 | 3/2016 | Vassiliev | |
| 9,612,900 B2 | 4/2017 | Anderson et al. | |
| 9,647,731 B2 | 5/2017 | Ardalan | |
| 10,452,605 B2* | 10/2019 | Wang | G06F 9/505 |
| 2004/0267920 A1 | 12/2004 | Hydrie et al. | |
| 2005/0120110 A1 | 6/2005 | Curran-gray et al. | |
| 2007/0038560 A1 | 2/2007 | Ansley | |
| 2009/0085603 A1 | 4/2009 | Paul et al. | |
| 2009/0102838 A1 | 4/2009 | Bullard et al. | |
| 2009/0153320 A1 | 6/2009 | Jung et al. | |
| 2009/0187756 A1 | 7/2009 | Nollet et al. | |
| 2009/0287628 A1 | 11/2009 | Indeck et al. | |
| 2010/0042870 A1* | 2/2010 | Amatsubo | G06F 11/2236 714/10 |
| 2010/0262882 A1 | 10/2010 | Krishnamurthy | |
| 2011/0167055 A1 | 7/2011 | Branscome et al. | |
| 2012/0054770 A1 | 3/2012 | Krishnamurthy et al. | |
| 2012/0150592 A1 | 6/2012 | Govrik et al. | |
| 2012/0151476 A1 | 6/2012 | Vincent | |
| 2013/0249947 A1 | 9/2013 | Reitan | |
| 2013/0297043 A1 | 11/2013 | Choi et al. | |
| 2014/0108481 A1 | 4/2014 | Davis et al. | |
| 2014/0140225 A1 | 5/2014 | Wala | |
| 2014/0282056 A1 | 9/2014 | Godsey | |
| 2015/0199214 A1* | 7/2015 | Lee | G06F 9/505 718/102 |
| 2015/0379099 A1 | 12/2015 | Vermeulen et al. | |
| 2019/0007263 A1 | 1/2019 | Lahiri et al. | |
| 2019/0155669 A1 | 5/2019 | Chiou et al. | |
| 2019/0190847 A1 | 6/2019 | Douglas et al. | |

FOREIGN PATENT DOCUMENTS

| | | |
|---|---|---|
| CN | 101794222 A | 8/2010 |
| CN | 101802789 A | 8/2010 |
| CN | 101986305 A | 3/2011 |
| CN | 102023932 A | 4/2011 |
| CN | 102024048 A | 4/2011 |
| CN | 102117197 A | 7/2011 |
| CN | 102282542 A | 12/2011 |
| CN | 102662628 A | 9/2012 |
| CN | 103034295 A | 4/2013 |
| CN | 103034536 A | 4/2013 |
| CN | 103164215 A | 6/2013 |
| CN | 103218572 A | 7/2013 |
| CN | 103220371 A | 7/2013 |
| CN | 103238305 A | 8/2013 |
| CN | 103270492 A | 8/2013 |
| CN | 103493009 A | 1/2014 |
| CN | 103645950 A | 3/2014 |
| CN | 104038570 A | 9/2014 |
| CN | 104040491 A | 9/2014 |
| CN | 104239088 A | 12/2014 |
| CN | 104299466 A | 1/2015 |
| CN | 104699508 A | 6/2015 |
| CN | 105824706 A | 8/2016 |
| CN | 107426138 A | 12/2017 |
| EP | 2722767 A1 | 4/2014 |
| JP | 2014230174 A | 12/2014 |
| WO | 2013049079 A3 | 5/2013 |
| WO | 2014088967 A1 | 6/2014 |
| WO | 2014094821 A1 | 6/2014 |

OTHER PUBLICATIONS

"Summons to Attend Oral Proceedings Issued in European Patent Application No. 16719599.9", Mailed Date: Jun. 3, 2019, 6 Pages.

"Summons to Attend Oral Proceedings Issued in European Patent Application No. 16719605.4", Mailed Date: May 31, 2019, 6 Pages.

"Extended Search Report Received for European Patent Application No. 11834944.8", Mailed Date: Jun. 12, 2019, 13 Pages.

"Advisory Action Issued in U.S. Appl. No. 15/669,652", dated Nov. 20, 2019, 5 Pages.

"Notice of Allowance Issued in U.S. Appl. No. 16/283,878", dated Dec. 12, 2019, 8 Pages.

"Notice of Allowance Issued in U.S. Appl. No. 14/752,785", dated Sep. 21, 2018, 10 Pages.

"Notice of Allowance Issued in U.S. Appl. No. 14/752,785", dated Oct. 18, 2018, 9 Pages.

"Final Office Action Issued in U.S. Appl. No. 14/752,807", dated Oct. 18, 2018, 7 Pages.

Bolchini, Cristiana, et al., "TMR and Partial Dynamic Reconfiguration to mitigate SEU faults in FPGAs", In proceedings of the 22nd IEEE International Symposium on in Defect and Fault-Tolerance in VLSI Systems, Sep. 26, 2007, pp. 87-95.

Danek, et al., "Increasing the Level of Abstraction in FPGA-Based Designs", In Proceedings of International Conference on Field Programmable Logic and Applications, Sep. 23, 2008, pp. 5-10.

Emmert, et al., "Dynamic Fault Tolerance in FPGAs via Partial Reconfiguration", In Proceedings of IEEE Symposium on Field-Programmable Custom Computing Machines, Apr. 17, 2000, pp. 165-174.

Heiner, Jonathan, et al., "FPGA Partial Reconfiguration Via Configuration Scrubbing", In Proceedings of the International Conference on in Field Programmable Logic and Applications, Aug. 31, 2009, pp. 99-104.

Horta, Edson L.., et al., "Dynamic Hardware Plugins in an FPGA with Partial Run-time Reconfiguration", In Proceedings of the 39th annual Design Automation Conference, Jun. 2002, pp. 343-348.

Li, et al., "Configuration Prefetching Techniques for Partial Reconfigurable Coprocessor", In Proceedings of the ACM/SIGDA tenth international symposium on Field-programmable gate arrays, Feb. 24, 2002, pp. 187-195.

Lie, et al., "Dynamic partial reconfiguration in FPGAs", In Proceedings of Third International Symposium on Intelligent Information Technology Application, Nov. 21, 2009, pp. 445-448.

Lysaght, Patrick, et al., "Invited Paper: Enhanced Architectures, Design Methodologies and Cad Tools for Dynamic Reconfiguration of Xilinx FPGAS", In International Conference on in Field Programmable Logic and Applications, Aug. 28, 2006, pp. 1-6.

Rani, Sheeba J.., et al., "FPGA Based Partial Reconfigurable Fir Filter Design", In Proceedings of the IEEE International Conference on in Advance Computing, Feb. 21, 2014, pp. 789-792.

Steiger, et al., "Operating Systems for Reconfigurable Embedded Platforms", In Journal of IEEE Transactions on Computers, vol. 53, Issue 11, Nov. 2004, pp. 1393-1407.

"Non Final Office Action Issued in U.S. Appl. No. 16/258,181", dated Jan. 15, 2020, 13 Pages.

"Non Final Office Action Issued in U.S. Appl. No. 15/669,652", dated Mar. 3, 2020, 31 Pages.

Kwok, et al., "On the Design of a Self-Reconfigurable SoPC Cryptographic Engine", In Proceedings of the 24th International Conference on Distributed Computing Systems Workshop, Mar. 23, 2004, 6 Pages.

(56) References Cited

OTHER PUBLICATIONS

"First Office Action Issued in Chinese Patent Application No. 201680022186.8", dated Mar. 3, 2020, 6 Pages. (Without English Translation).
"First Office Action Issued in Chinese Patent Application No. 201680022187.2", dated Mar. 5, 2020, 5 Pages. (Without English Translation).
"First Office Action Issued in Chinese Patent Application No. 201680022447.6", dated Feb. 25, 2020, 7 Pages. (Without English Translation).
"First Office Action Issued in Chinese Patent Application No. 201680022845.8", dated Mar. 26, 2020, 10 Pages. (Without English Translation).
"Non Final Office Action Issued in U.S. Appl. No. 15/669,652", dated Apr. 2, 2019, 20 Pages.
Fukuda, Eric Shun., "A Study on Acceleration Methods of Data Center Applications with Reconfigurable Hardware", Retrieved from https://eprints.lib.hokudai.ac.jp/dspace/bitstream/2115/58890/1/Eric_Shun_Fukuda.pdf, Mar. 2015, 111 Pages.
McDonald, E J., et al., "Runtime FPGA Partial Reconfiguration", In Proceedings of IEEE Aerospace Conference, Mar. 1, 2008, 7 Pages.
"Final Office Action Issued in U.S. Appl. No. 15/669,652", dated Aug. 21, 2019, 25 Pages.
Knodel, et al., "Integration of a Highly Scalable, Multi-FPGA-Based Hardware Accelerator in Common Cluster Infrastructures", In Proceedings of 42nd International Conference on Parallel Processing, Oct. 1, 2013, pp. 893-900.
"Office Action Issued in European Patent Application No. 16719600.5", dated Oct. 16, 2020, 9 Pages.
"Second Office Action Issued in Chinese Patent Application No. 201680022447.6", dated Aug. 28, 2020, 10 Pages.
"First Office Action and Search Report Issued in Chinese Patent Application No. 201680021987.2", dated Apr. 14, 2020, 28 Pages.
"First Office Action and Search Report Issued in Chinese Patent Application No. 201680022171.1", dated Apr. 22, 2020, 8 Pages.
"Non-Final Office Action Issued in U.S. Appl. No. 16/100,110", dated May 12, 2020, 24 Pages.
"Notice of Allowance Issued in U.S. Appl. No. 16/258,181", dated Apr. 24, 2020, 9 Pages.
Tumeo et al., "A Reconfigurable Multiprocessor Architecture for a Reliable Face Recognition Implementation", In Proceedings of Design, Automation and Test in Europe Conference and Exhibition, Mar. 8, 2010, pp. 319-322.
"Office Action Issued in Chinese Patent Application No. 201680037389.4", dated May 28, 2020, 11 Pages.
"Notice of Allowance Issued in US Patent Application No. 201680022845.8", dated Jun. 23, 2020, 5 Pages.
"Office Action Issued in Chinese Patent Application No. 201680037768.3", dated Jun. 17, 2020, 8 Pages.
"Final Office Action Issued in U.S. Appl. No. 15/669,652", dated Jul. 22, 2020, 27 Pages.
Cilardo, et al., "Automated Synthesis of FPGA-based Heterogeneous Interconnect Topologies", In Proceedings of International Conference on Field Programmable Logic and Applications, Sep. 4, 2013, 8 Pages.
Fox, et al., "Reliably Prototyping Large SoCs Using FPGA Clusters", In Proceedings of the 9th International Symposium on Reconfigurable and Communication-Centric Systems-on-Chip, May 26, 2014, pp. 8 Pages.
"First Office Action and Search Report Issued in Chinese Patent Application No. 201680035401.8", dated Jan. 6, 2021, 28 Pages.
"Notice of Allowance Issued in Chinese Patent Application No. 201680022447.6", dated Jan. 20, 2021, 5 Pages.
"Office Action Issued in European Patent Application No. 16716441.7", dated Nov. 24, 2020, 5 Pages.
"Office Action Issued in European Patent Application No. 16719601.3", dated Oct. 30, 2020, 8 Pages.
"Final Office Action Issued in U.S. Appl. No. 16/100,110", dated Nov. 4, 2020, 30 Pages.
"Summons to Attend Oral Proceedings Issued in European Patent Application No. 16719600.5", dated May 28, 2021, 12 Pages.
"Notice of Allowance and Search Report Issued in Chinese Patent Application No. 201680035401.8", dated May 28, 2021, 9 Pages.
Ekanayaka, et al., "FPGA Based Custom Accelerator Architecture Framework for Complex Event Processing", In Proceedings of the TENCON IEEE Region 10 Conference, Oct. 22, 2014, 6 Pages.
Ling, Zheng, "Research on Heterogeneous Multicore System Design and Parallel Programming Model Based on CPU-FPGA", In China Excellent Master's Thesis Full-text Database Information Technology Series, Nov. 15, 2014, 66 Pages.
"Summons to Attend Oral Proceedings Issued in European Patent Application No. 16719604.7", dated Jun. 23, 2021, 11 Pages.

* cited by examiner

INSTRUCTION TO RECONFIGURE DOMAIN 1,
LEAVING DOMAIN 2 UNDISTURBED

HANDLING TENANT REQUESTS IN A SYSTEM THAT USES HARDWARE ACCELERATION COMPONENTS

This application claims the benefit of U.S. Provisional Application No. 62/149,488 (the '488 application), filed Apr. 17, 2015. The '488 application is incorporated by reference herein in its entirety.

BACKGROUND

The computing industry faces increasing challenges in its efforts to improve the speed and efficiency of software-driven computing devices, e.g., due to power limitations and other factors. Software-driven computing devices employ one or more central processing units (CPUs) that process machine-readable instructions in a conventional temporal manner. To address this issue, the computing industry has proposed using hardware acceleration components (such as field-programmable gate arrays (FPGAs)) to supplement the processing performed by software-driven computing devices. However, software-driven computing devices and hardware acceleration components are dissimilar types of devices having fundamentally different architectures, performance characteristics, power requirements, program configuration paradigms, interface features, and so on. It is thus a challenging task to integrate these two types of devices together in a manner that satisfies the various design requirements of a particular data processing environment.

SUMMARY

A service mapping component (SMC) is described herein for processing requests by instances of tenant functionality executing on software-driven host components (or other components) in a data processing system. The SMC is configured to apply at least one rule to determine whether a service requested by an instance of tenant functionality is to be satisfied by at least one of: a local software-driven host component, a local hardware acceleration component which is locally coupled to the local host component, and/or at least one remote hardware acceleration component that is indirectly accessible to the local host component via the local hardware acceleration component.

In one illustrative manner of operation, the SMC may first determine whether it is appropriate to perform the service on the local hardware acceleration component. If so, the SMC instructs the local host component to perform the service using the local hardware acceleration component. Otherwise, the SMC determines whether it is appropriate for a remote hardware acceleration component to perform the service. If so, the SMC instructs the local host component to perform the service using the remote hardware acceleration component. If execution by no hardware acceleration components is appropriate, then the SMC may instruct the local host component to perform the service itself in software, if possible. In one implementation, the SMC is implemented by plural local management components in conjunction with a global management component.

In performing its analysis, the SMC can take into account various factors, such as whether or not the service corresponds to a line-rate service, latency-related considerations, power-related considerations, security-related considerations, and so on.

The above-summarized functionality can be manifested in various types of systems, devices, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
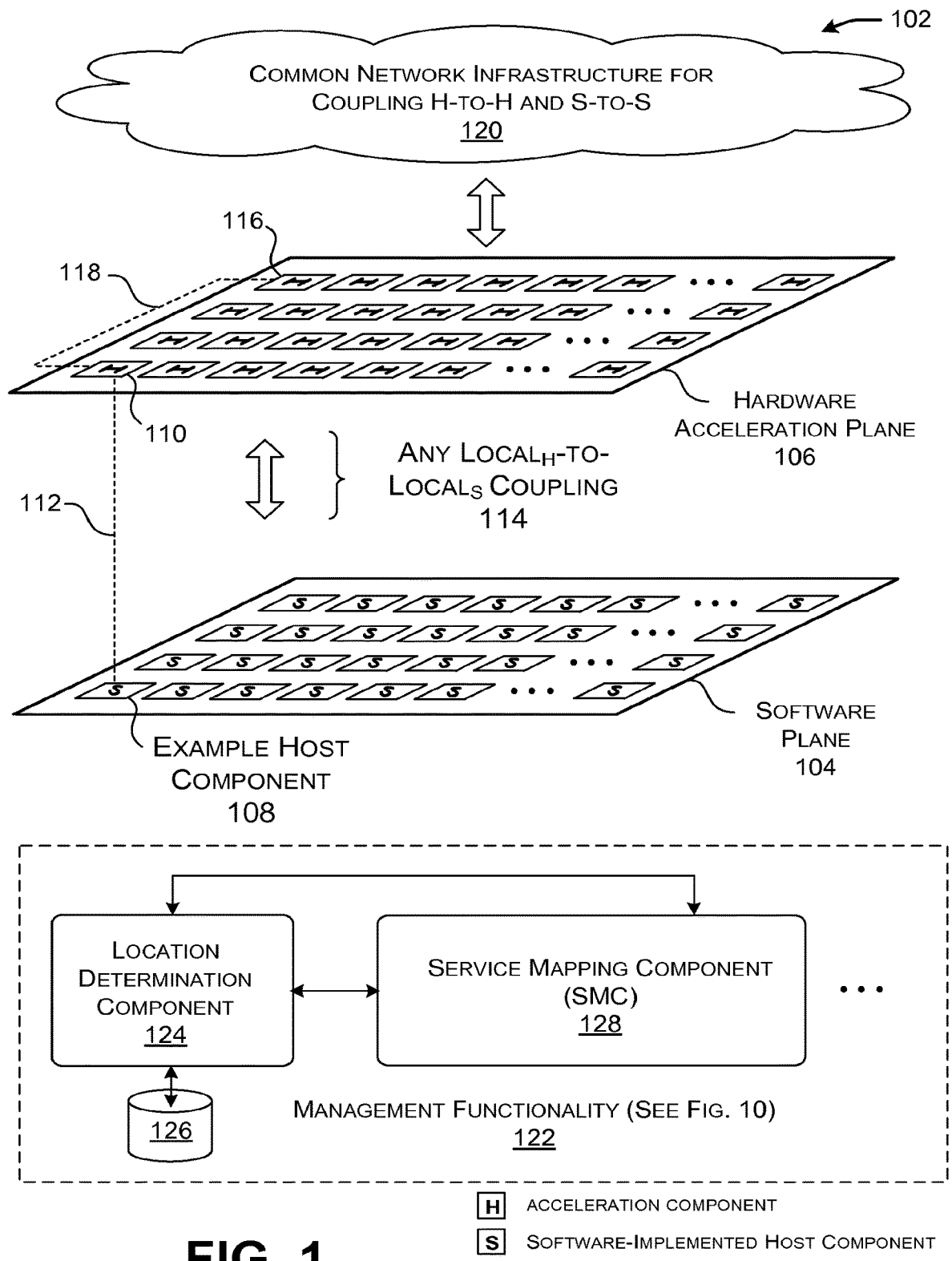
FIG. 1 shows an overview of a data processing system that includes a software plane and a hardware acceleration plane.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative data processing system that includes a hardware acceleration plane and a software plane. Section B describes management functionality that is used to manage the data processing system of Section A. Section C sets forth one implementation of an illustrative hardware acceleration component in the hardware acceleration plane.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

Any of the storage resources described herein, or any combination of the storage resources, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Overview

FIG. 1 shows an overview of a data processing system 102 that includes a software plane 104 and a hardware acceleration plane 106. The software plane 104 includes a collection of software-driven components (each denoted by the symbol "S" in FIG. 1), while the hardware plane includes a collection of hardware acceleration components (each denoted by the symbol "H" in FIG. 1). For instance, each host component may correspond to a server computer that executes machine-readable instructions using one or more central processing units (CPUs). Each CPU, in turn, may execute the instructions on one or more hardware threads. Each hardware acceleration component, one the other hand, may correspond to hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), and so on.

The term "hardware" acceleration component is also intended to broadly encompass different ways of leveraging a hardware device to perform a function, including, for instance, at least: a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run on MPPAs of soft processors or the like; e) a case in which at least some tasks run as software on hard ASIC processors or the like, and so on, or any combination thereof.

Likewise, the data processing system 102 can accommodate different manifestations of software-driven devices in the software plane 104.

To simplify repeated reference to hardware acceleration components, the following explanation will henceforth refer to these devices as simply "acceleration components." Further, the following explanation will present a primary example in which the acceleration components correspond to FPGA devices, although, as noted, the data processing system 102 may be constructed using other types of acceleration components. Further, the hardware acceleration plane 106 may be constructed using a heterogeneous collection of acceleration components, including different types of FPGA devices having different respective processing capabilities and architectures, a mixture of FPGA devices and other devices, and so on.

A host component generally performs operations using a temporal execution paradigm, e.g., by using each of its CPU hardware threads to execute machine-readable instructions, one after the after. In contrast, an acceleration component may perform operations using a spatial paradigm, e.g., by using a large number of parallel logic elements to perform computational tasks. Thus, an acceleration component can perform some operations in less time compared to a software-driven host component. In the context of the data processing system 102, the "acceleration" qualifier associated with the term "acceleration component" reflects its potential for accelerating the functions that are performed by the host components.

In one example, the data processing system 102 corresponds to a data center environment that includes a plurality of computer servers. The computer servers correspond to the host components in the software plane 104 shown in FIG. 1. In other cases, the data processing system 102 corresponds to an enterprise system. In other cases, the data processing system 102 corresponds to a user device or appliance which uses at least one host component that has access to two or more acceleration components, etc. These examples are cited by way of example, not limitation; still other applications are possible.

In one implementation, each host component in the data processing system 102 is coupled to at least one acceleration component through a local link. That fundamental unit of processing equipment is referred to herein as a "server unit component" because that equipment may be grouped together and maintained as a single serviceable unit within the data processing system 102 (although not necessarily so). The host component in the server unit component is referred to as the "local" host component to distinguish it from other host components that are associated with other server unit components. Likewise, the acceleration component(s) of the server unit component are referred to as the "local" acceleration component(s) to distinguish them from other acceleration components that are associated with other server unit components.

For example, FIG. 1 shows an illustrative local host component 108 that is coupled to a local acceleration component 110 through a local link 112 (such as, as will be described below, a Peripheral Component Interconnect Express (PCIe) link). That pairing of the local host component 108 and the local acceleration component 110 forms at least part of a single server unit component. More generally, FIG. 1 shows that the software plane 104 is coupled to the hardware acceleration plane through many individual local links, which FIG. 1 collectively refers to as a $local_H$-to-$local_S$ coupling 114.

The local host component 108 may further indirectly communicate with any other remote acceleration component in the hardware acceleration plane 106. For example, the local host component 108 has access to a remote acceleration component 116 via the local acceleration component 110. More specifically, the local acceleration component 110 communicates with the remote acceleration component 116 via a link 118.

In one implementation, a common network 120 is used to couple host components in the software plane 104 to other host components, and to couple acceleration components in the hardware acceleration plane 106 to other acceleration components. That is, two host components may use the same network 120 to communicate with each other as do two acceleration components. As another feature, the interaction among host components in the software plane 104 is independent of the interaction among acceleration components in the hardware acceleration plane 106. This means, for instance, that two or more acceleration components may communicate with each other in a transparent manner from the perspective of host components in the software plane 104, outside the direction of the host components, and without the host components being "aware" of the particular interactions that are taking place in the hardware acceleration plane 106. A host component may nevertheless initiate interactions that take place in the hardware acceleration plane 106 by issuing a request for a service that is hosted by the hardware acceleration plane 106.

According to one non-limiting implementation, the data processing system 102 uses the Ethernet protocol to transmit IP packets over the common network 120. In one implementation, each local host component in a server unit component is given a single physical IP address. The local acceleration component in the same server unit component may adopt the same IP address. The server unit component can determine whether an incoming packet is destined for the local host component as opposed to the local acceleration component in different ways. For example, packets that are destined for the local acceleration component can be formulated as user datagram protocol (UDP) packets specifying a specific port; host-destined packets, on the other hand, are not formulated in this way. In another case, packets belonging to the acceleration plane 106 can be distinguished from packets belonging to the software plane 104 based on the value of a status flag in each of the packets (e.g., in the header or body of a packet).

In view of the above characteristic, the data processing system 102 may be conceptualized as forming two logical networks that share the same physical communication links. The packets associated with the two logical networks may be distinguished from each other by their respective traffic classes in the manner described above. But in other implementations (e.g., as described below with respect to FIG. 8), the data processing system 102 may use two distinct physical networks to handle host-to-host traffic and hardware-to-hardware traffic, respectively. Further, in implementations that do use the common network 120, the host-to-host network infrastructure need not be entirely identical to the hardware-to-hardware network infrastructure; that is, these two infrastructures are common in the sense that most of their network resources are shared, but not necessarily all of their network resources are shared.

Finally, management functionality 122 serves to manage the operations of the data processing system 102. As will be set forth in greater detail in Section B (below), the management functionality 122 can be physically implemented using different control architectures. For example, in one control architecture, the management functionality 122 may include plural local management components that are coupled to one or more global management components.

By way of introduction to Section B, the management functionality 122 can include a number of sub-components that perform different respective logical functions (which can be physically implemented in different ways). A location determination component 124, for instance, identifies the current locations of services within the data processing system 102, based on current allocation information stored in a data store 126. As used herein, a service refers to any function that is performed by the data processing system 102. For example, one service may correspond to an encryption function. Another service may correspond to a document ranking function. Another service may correspond to a data compression function, and so on.

In operation, the location determination component 124 may receive a request for a service. In response, the location determination component 124 returns an address associated with the service, if that address is present in the data store 126. The address may identify a particular acceleration component that hosts the requested service.

A service mapping component (SMC) 128 maps services to particular acceleration components. The SMC 128 may operate in at least two modes depending on the type of triggering event that it receives which invokes it operation. In a first case, the SMC 128 processes requests for services made by instances of tenant functionality. An instance of tenant functionality may correspond to a software program running on a particular local host component, or, more specifically, a program executing on a virtual machine that, in turn, is associated with the particular local host component. That software program may request a service in the course of its execution. The SMC 128 handles the request by determining an appropriate component (or components) in the data processing system 102 to provide the service. Possible components for consideration include: a local acceleration component (associated with the local host component from which the request originated); a remote acceleration component; and/or the local host component itself (whereupon the local host component will implement the service in software). The SMC 128 makes its determinations based on one or more mapping considerations, such as whether the requested service pertains to a line-rate service.

In another manner of operation, the SMC 128 generally operates in a background and global mode, allocating services to acceleration components based on global conditions in the data processing system 102 (rather than, or in addition to, handling individual requests from instances of tenant functionality). For example, the SMC 128 may invoke its allocation function in response to a change in demand that affects one or more services. In this mode, the SMC 128 again makes its determinations based on one or more mapping considerations, such as the historical demand associated with the services, etc.

The SMC 128 may interact with the location determination component 124 in performing its functions. For instance, the SMC 128 may consult the data store 126 when it seeks to determine the address of an already allocated service provided by an acceleration component. The SMC 128 can also update the data store 126 when it maps a service to one or more acceleration components, e.g., by storing the addresses of those acceleration components in relation to the service.

Although not shown in FIG. 1, a sub-component of the SMC 128 also manages multi-component services. A multi-component service is a service that is composed of plural parts. Plural respective acceleration components perform the respective parts.

Note that FIG. 1 illustrates, as a matter of convenience, that the management functionality 122 is separate from the components in the software plane 104 and the hardware plane 106. But as will be clarified in Section B, any aspect of the management functionality 122 can be implemented using the resources of the software plane 104 and/or the hardware plane 106. When implemented by the hardware plane 106, the management functions can be accelerated like any service.

Figure 2:
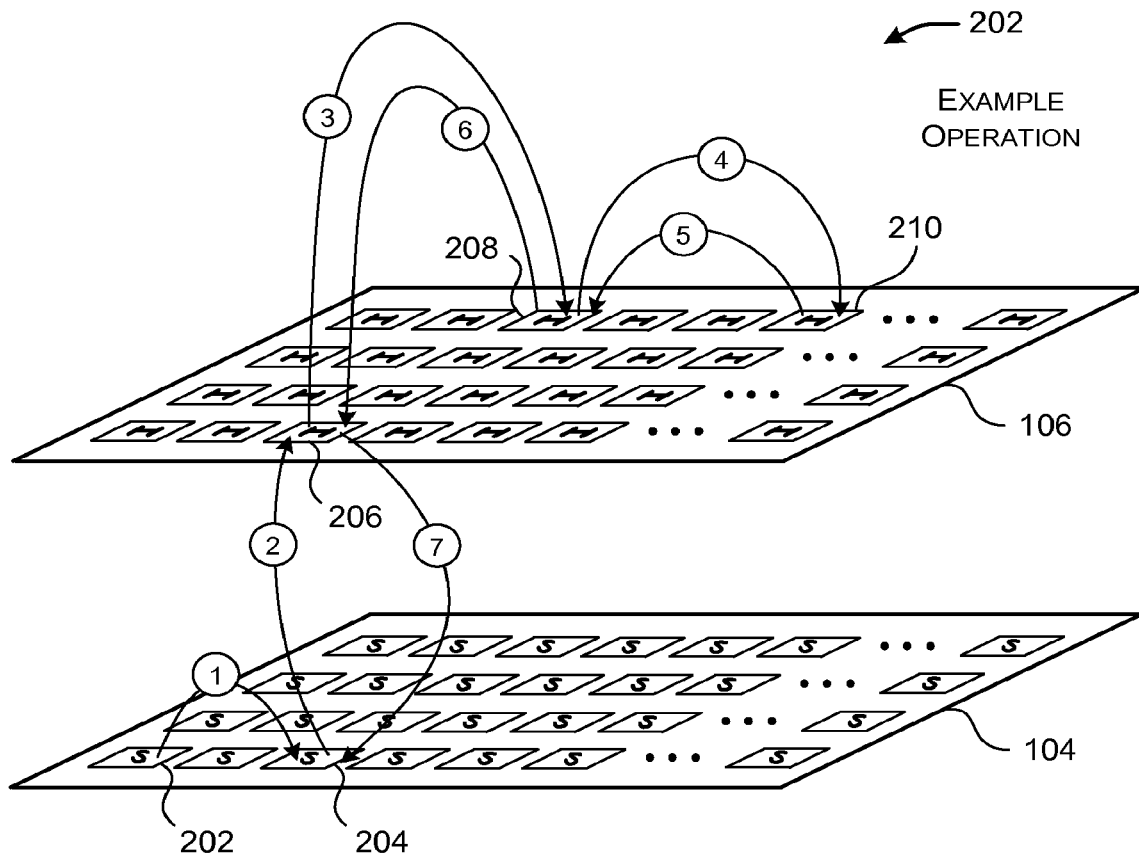
FIG. 2 shows a first example of the operation of the data processing system of FIG. 1.

FIG. 2 shows a first example of the operation of the data processing system 102 of FIG. 1, corresponding to a single transaction, or part of a single transaction. In operation (1), a first host component 202 communicates with a second host component 204 in the course of performing a single computational task. The second host component 204 then requests the use of a service that is implemented in the hardware acceleration plane 106 (although the second host component 204 may not be "aware" of where the service is implemented, beyond that the service can be accessed at a specified address).

In many cases, a requested service is implemented on a single acceleration component (although there may be plural redundant such acceleration components to choose from among). But in the particular example of FIG. 2, the requested service corresponds to a multi-component service that is spread out over a collection (or cluster) of acceleration components, each of which performs an allocated part of the service. A graph structure may specify the manner by which the individual acceleration components are coupled together in the collection. In some implementations, the graph structure also identifies at least one head component. The head component corresponds to a point of contact by which entities in the data processing system 102 may interact with the multi-component service in the hardware acceleration plane 106. The head component may also serve as an initial processing stage in a processing pipeline defined by the graph structure.

In the particular case of FIG. 2, assume that acceleration component 206 corresponds to the local acceleration component that is locally linked to the local host component 204, and that an acceleration component 208 is the head component of the multi-component service. In operations (2) and (3), the requesting host component 204 accesses the acceleration component 208 via its local acceleration component 206. The acceleration component 208 then performs its part of the multi-component service to generate an intermediate output result. In operation (4), the acceleration component 208 then invokes another acceleration component 210, which performs another respective part of the multi-component service, to generate a final result. In operations (5), (6), and (7), the hardware acceleration plane 106 successively forwards the final result back to the requesting host component 204, through the same chain of components set forth above but in the opposite direction. Note that the data flow operations described above, including the flow operations that define the return path, are cited by way of example, not limitation; other multi-component services may use other graph structures that specify any other flow paths. For example, the acceleration component 210 can forward the final result directly to the local acceleration component 206.

First, note that the operations that take place in the hardware acceleration plane 106 are performed in an independent manner of operations performed in the software plane 104. In other words, the host components in the software plane 104 do not manage the operations in the hardware acceleration plane 106. However, the host components may invoke the operations in the hardware acceleration plane 106 by issuing requests for services that are hosted by the hardware acceleration plane 106.

Second, note that the hardware acceleration plane 106 performs its transactions in a manner that is transparent to a requesting host component. For example, the local host component 204 may be "unaware" of how its request is being processed in the hardware acceleration plane, including the fact that the service corresponds to a multi-component service.

Third, note that, in this implementation, the communication in the software plane 104 (e.g., corresponding to operation (1)) takes place using the same common network 120 as communication in the hardware acceleration plane 106 (e.g., corresponding to operations (3)-(6)). Operations (2) and (7) may take place over a local link, corresponding to the local$_H$-to-local$_S$ coupling 114 shown in FIG. 1.

The multi-component service shown in FIG. 2 resembles a ring in that a series of acceleration components are traversed in a first direction to arrive at a final result; that final result is then propagated back through the same series of acceleration components in the opposite direction to the head component. But as noted above, other multi-component services may use different collections of acceleration components having different respective flow structures.

Figure 3:
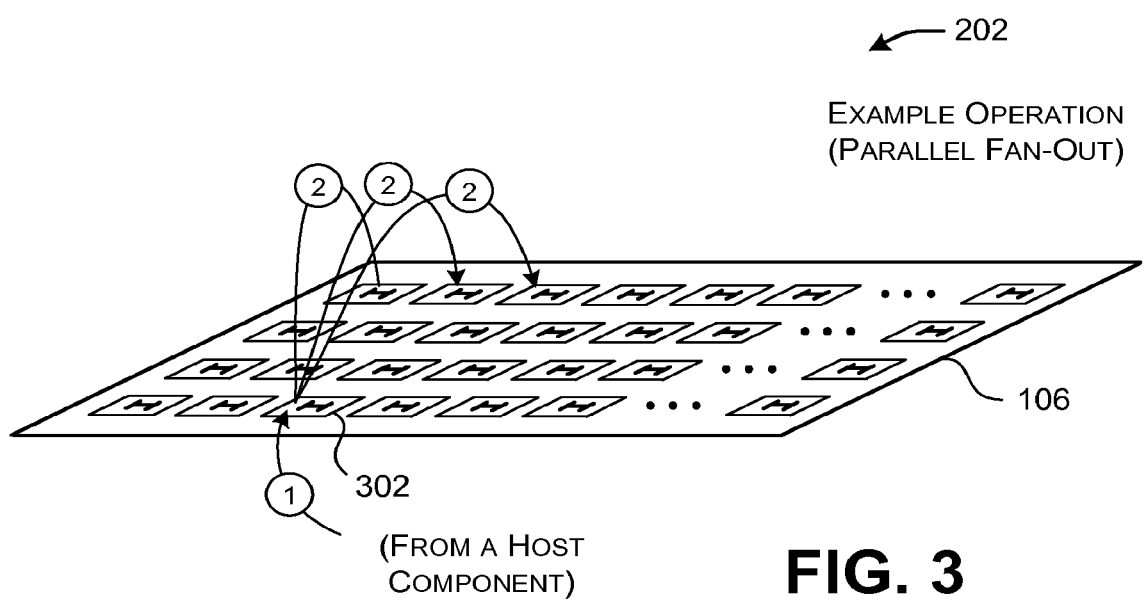
FIG. 3 shows a second example of the operation of the data processing system of FIG. 1.

For example, FIG. 3 shows a second example of the operation of the data processing system 102 of FIG. 1 that employs a different flow structure compared to the example of FIG. 1. More specifically, in operation (1), a local host component (not shown) sends a request to its local acceleration component 302. In this case, assume that the local acceleration component is also the head component of the service. In operation (2), the head component may then forward plural messages to plural respective acceleration components. Each acceleration component that receives the message may perform a part of the multi-component service in parallel with the other acceleration components. (Note that FIG. 3 may represent only a portion of a more complete transaction.)

Moreover, a multi-component service does not necessarily need to employ a single head component, or any head component. For example, a multi-component service can employ a cluster of acceleration components which all perform the same function. The data processing system 102 can be configured to invoke this kind of multi-component service by contacting any arbitrary member in the cluster. That acceleration component may be referred to as a head component because it is the first component to be accessed, but it otherwise has no special status. In yet other cases, a host component may initially distribute plural requests to plural members of a collection of acceleration components.

Figure 4:
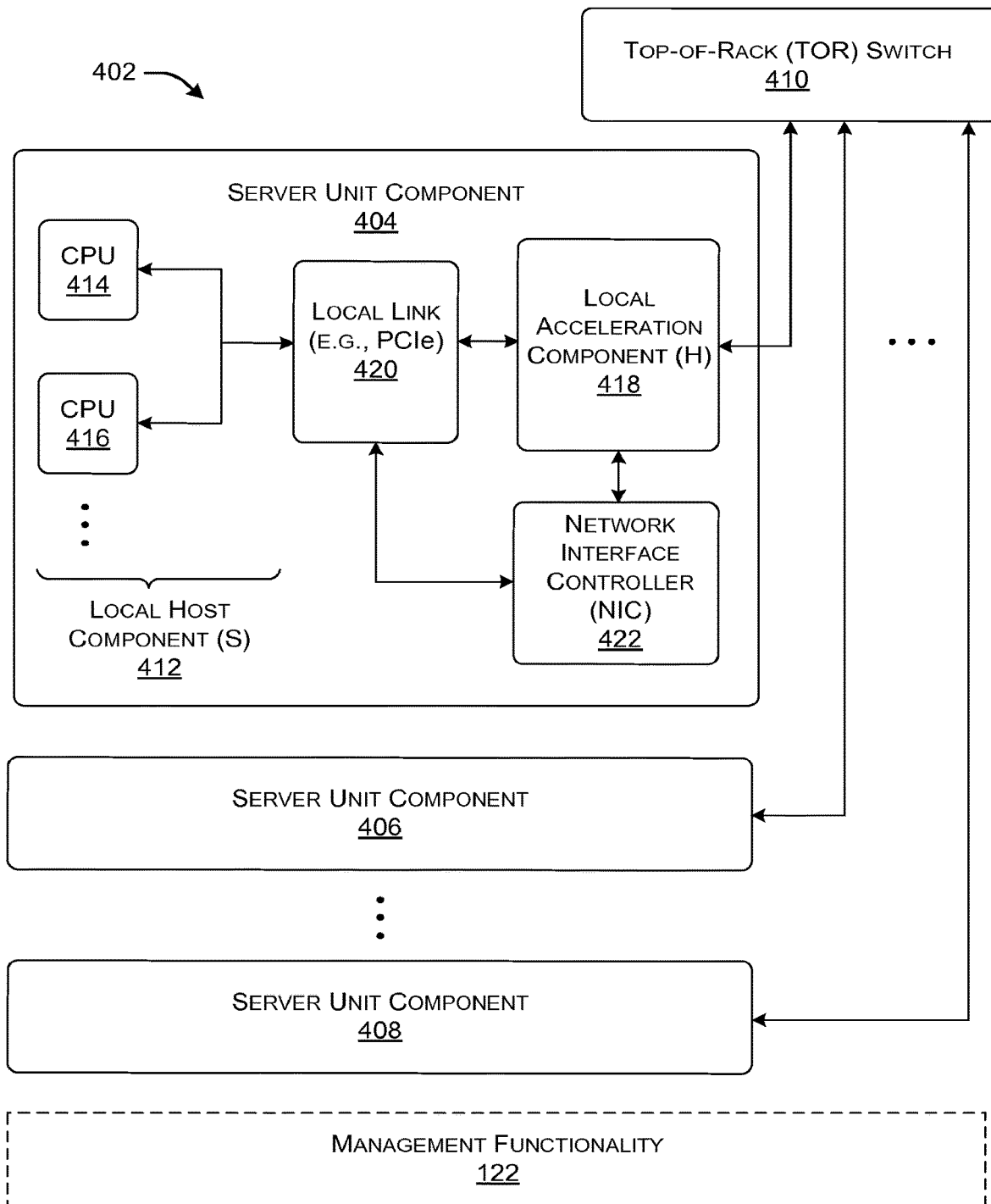
FIG. 4 shows one implementation of the data processing system of FIG. 1, corresponding to a data center.

FIG. 4 shows a portion of a data center 402 which represents one implementation of the data processing system 102 of FIG. 1. In particular, FIG. 4 shows one rack in that data center 402. The rack includes plural server unit components (404, 406, . . . , 408), each of which is coupled to a top-of-rack (TOR) switch 410. A top-of-rack switch refers to a switch which couples the components in a rack to other parts of a data center. Other racks, although not shown, may exhibit a similar architecture. A rack is a physical structure for housing or otherwise grouping plural processing components.

FIG. 4 also shows the illustrative composition of one representative server unit component 404. It includes a local host component 412 that includes one or more central processing units (CPUs) (414, 416, . . . ), together with a local acceleration component 418. The local acceleration component 418 is directly coupled to the host component 412 via a local link 420. The local link 420, for example, may be implemented as a PCIe link. The local acceleration component 418 is also indirectly coupled to the host component 412 by way of a network interface controller (NIC) 422.

Finally, note that the local acceleration component 418 is coupled to the TOR switch 410. Hence, in this particular implementation, the local acceleration component 418 represents the sole path through which the host component 412 interacts with other components in the data center 402 (including other host components and other acceleration components). Among other effects, the architecture of FIG. 4 allows the local acceleration component 418 to perform processing on packets that are received from (and/or sent to) the TOR switch 410 (e.g., by performing encryption, compression, etc.), without burdening the CPU-based operations performed by the host component 412.

Note that the local host component 412 may communicate with the local acceleration component 418 through the local link 420 or via the NIC 422. Different entities may leverage these two paths in different respective circumstances. For example, assume that a program running on the host component 412 requests a service. In one implementation, assume that the host component 412 provides a local instantiation of the location determination component 124 and the data store 126. Or a global management component may provide the location determination component 124 and its data store 126. In either case, the host component 412 may consult the data store 126 to determine the address of the service. The host component 412 may then access the service via the NIC 422 and the TOR switch 410, using the identified address.

In another implementation, assume that local acceleration component 418 provides a local instantiation of the location determination component 124 and the data store 126. The host component 412 may access the local acceleration component 418 via the local link 420. The local acceleration component 418 can then consult the local data store 126 to determine the address of the service, upon which it accesses the service via the TOR switch 410. Still other ways of accessing the service are possible.

Figure 5:
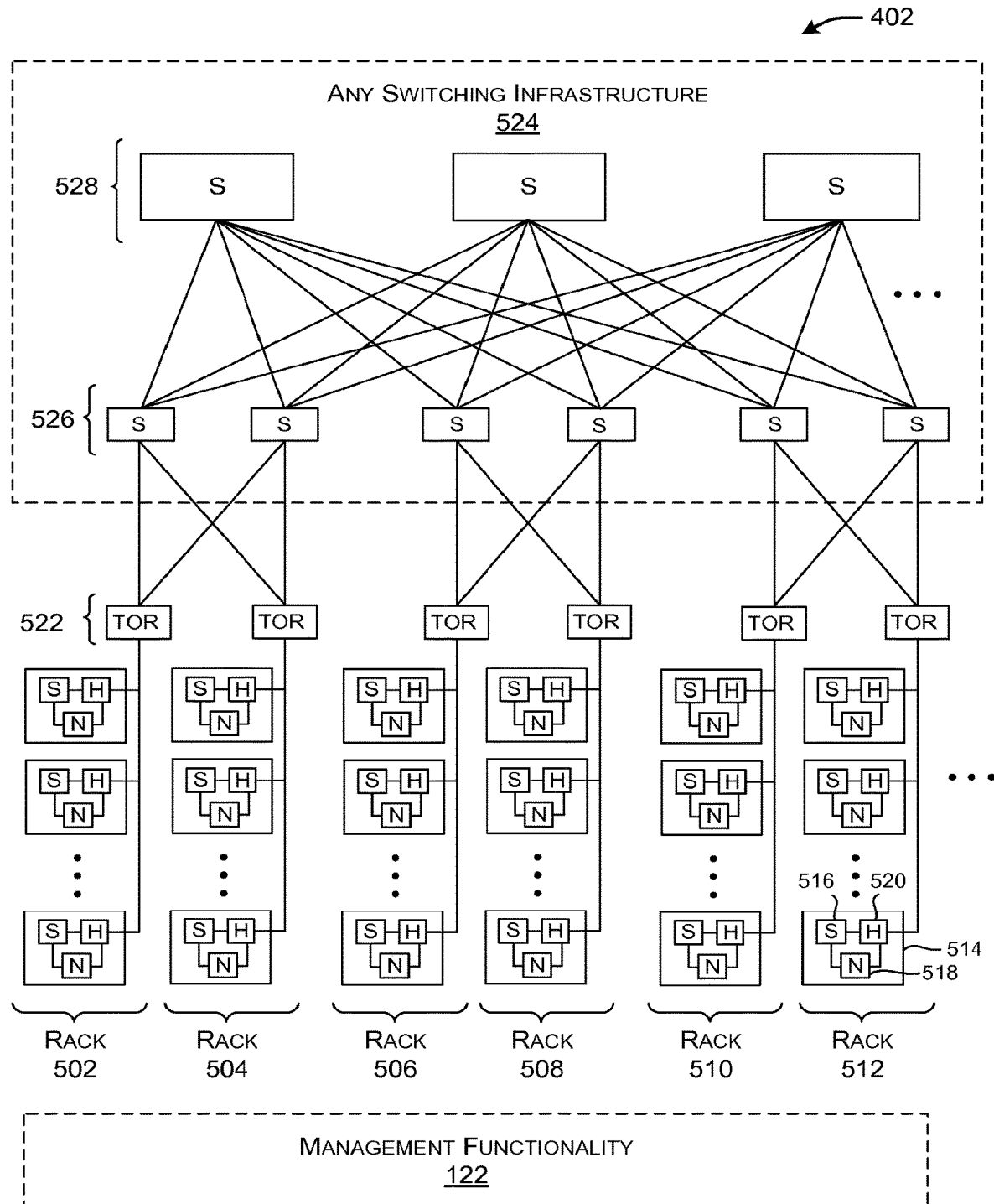
FIG. 5 is a more encompassing depiction of the data center implementation of FIG. 4.

FIG. 5 is a more encompassing depiction of the data center 402 shown in FIG. 4. The data center 402 includes a plurality of racks (502-512, . . . ). Each rack includes a plurality of server unit components. Each server unit component, in turn, may have the architecture described above in FIG. 4. For example, a representative server unit component 514 includes a local host component (S) 516, a network interface controller (N) 518, and a local acceleration component (S) 520.

The routing infrastructure shown in FIG. 5 corresponds to one implementation of the common network 120, described above with reference to FIG. 1. The routing infrastructure includes a plurality of top-of-rack (TOR) switches 522 and higher-level switching infrastructure 524. The higher-level switching architecture 524 connects the TOR switches 522 together. The higher-level switching infrastructure 524 can have any architecture, and may be driven by any routing protocol(s). In the illustrated example of FIG. 5, the higher-level switching infrastructure 524 includes at least a collection of aggregation switches 526, core switches 528, etc. The traffic routed through the illustrated infrastructure may correspond to Ethernet IP packets.

The data center 402 shown in FIG. 5 may correspond to a set of resources provided at a single geographic location, or a distributed collection of resources that are distributed over plural geographic locations (e.g., over plural individual contributing data centers located in different parts of the world). In a distributed context, the management functionality 122 can send work from a first contributing data center to a second contributing data center based on any mapping consideration(s), such as: (1) a determination that acceleration components are available at the second contributing data center; (2) a determination that acceleration components are configured to perform a desired service or services at the second contributing data center; and/or (3) a determination that the acceleration components are not only configured to performed a desired service or services, but they are immediately available (e.g., "online") to perform those services, and so on. Other mapping considerations that can play a part in the allocation of services are set forth below in Section B. As used herein, the term "global" generally refers to any scope that is more encompassing than the local domain associated with an individual server unit component.

Generally note that, while FIGS. 4 and 5 focus on the use of a relatively expansive data processing system (corresponding to a data center), some of the principles set forth herein can be applied to smaller systems, including a case in which a single local host component (or other type of component) is coupled to plural acceleration components, including a local acceleration component and one or more remote acceleration components. Such a smaller system may even be embodied in a user device or appliance, etc. The user device may have the option of using local acceleration resources and/or remote acceleration resources.

Figure 6:
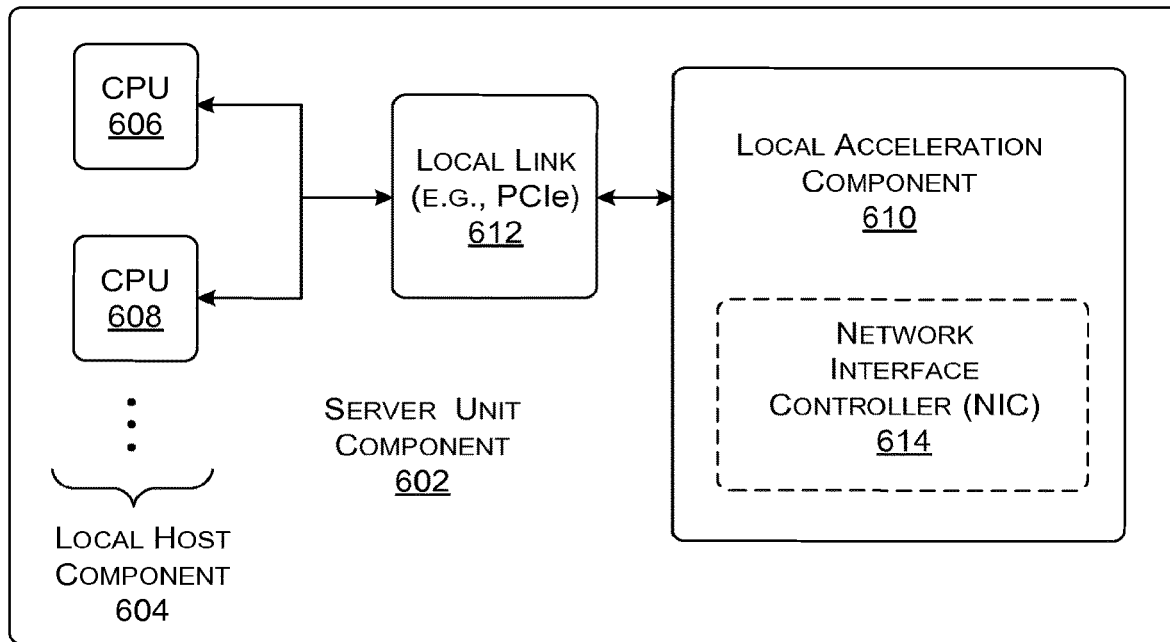
FIG. 6 shows an alternative way of implementing a server unit component, compared to that shown in FIG. 4.

FIG. 6 shows an alternative way of implementing a server unit component 602, compared to the architecture that shown in FIG. 4. Like the case of FIG. 4, the server unit component 602 of FIG. 6 includes a local host component 604 made up of one or more CPUs (606, 608, . . . ), a local acceleration component 610, and a local link 612 for coupling the local host component 604 with the local acceleration component 610. Unlike the case of FIG. 4, the server unit component 602 implements a network interface controller (NIC) 614 as an internal component of the local acceleration component 610, rather than as a separate component.

Figure 7:
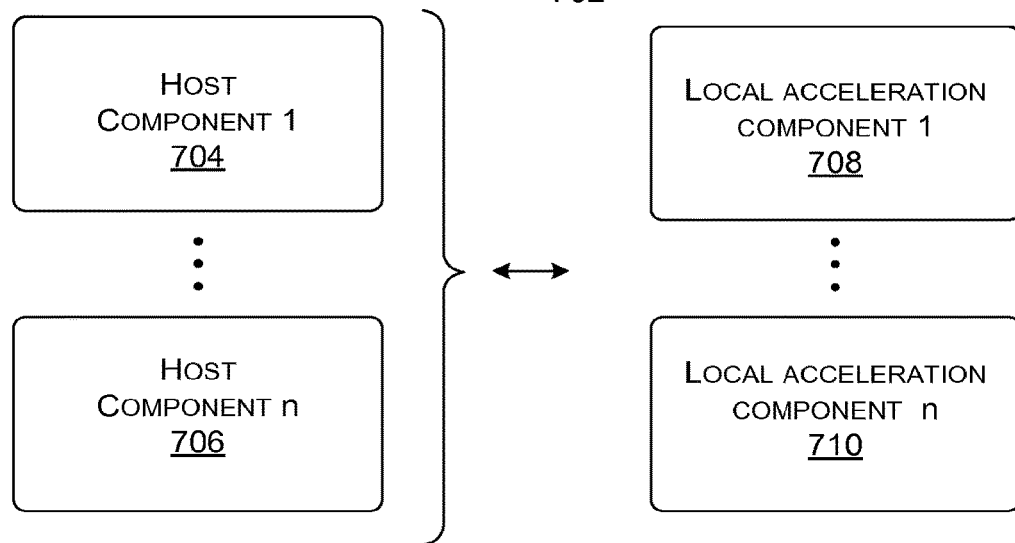
FIG. 7 shows yet another way of implementing a server unit component compared to that shown in FIG. 4.

FIG. 7 shows yet another alternative way of implementing a server unit component 702 compared to the architecture shown in FIG. 4. In the case of FIG. 7, the server unit component 702 includes any number n of local host components (704, . . . , 706) together with any number m of local acceleration components (708, . . . , 710). (Other components of the server unit component 702 are omitted from the figure to facilitate explanation.) For example, the server unit component 702 may include a single host component coupled to two local acceleration components. The two acceleration components can perform different respective tasks. For example, one acceleration component can be used to process outgoing traffic to its local TOR switch, while the other acceleration component can be used to process incoming traffic from the TOR switch. In addition, the server unit component 702 can load any services on any of the local acceleration components (708, . . . , 710).

Also note that, in the examples set forth above, a server unit component may refer to a physical grouping of components, e.g., by forming a single serviceable unit within a rack of a data center. In other cases, a server unit component may include one or more host components and one or more acceleration components that are not necessarily housed together in a single physical unit. In that case, a local acceleration component may be considered logically, rather than physically, associated with its respective local host component.

Alternatively, or in addition, a local host component and one or more remote acceleration components can be implemented on a single physical component, such as a single MPSoC-FPGA die. The network switch may also be incorporated into that single component.

Figure 8:
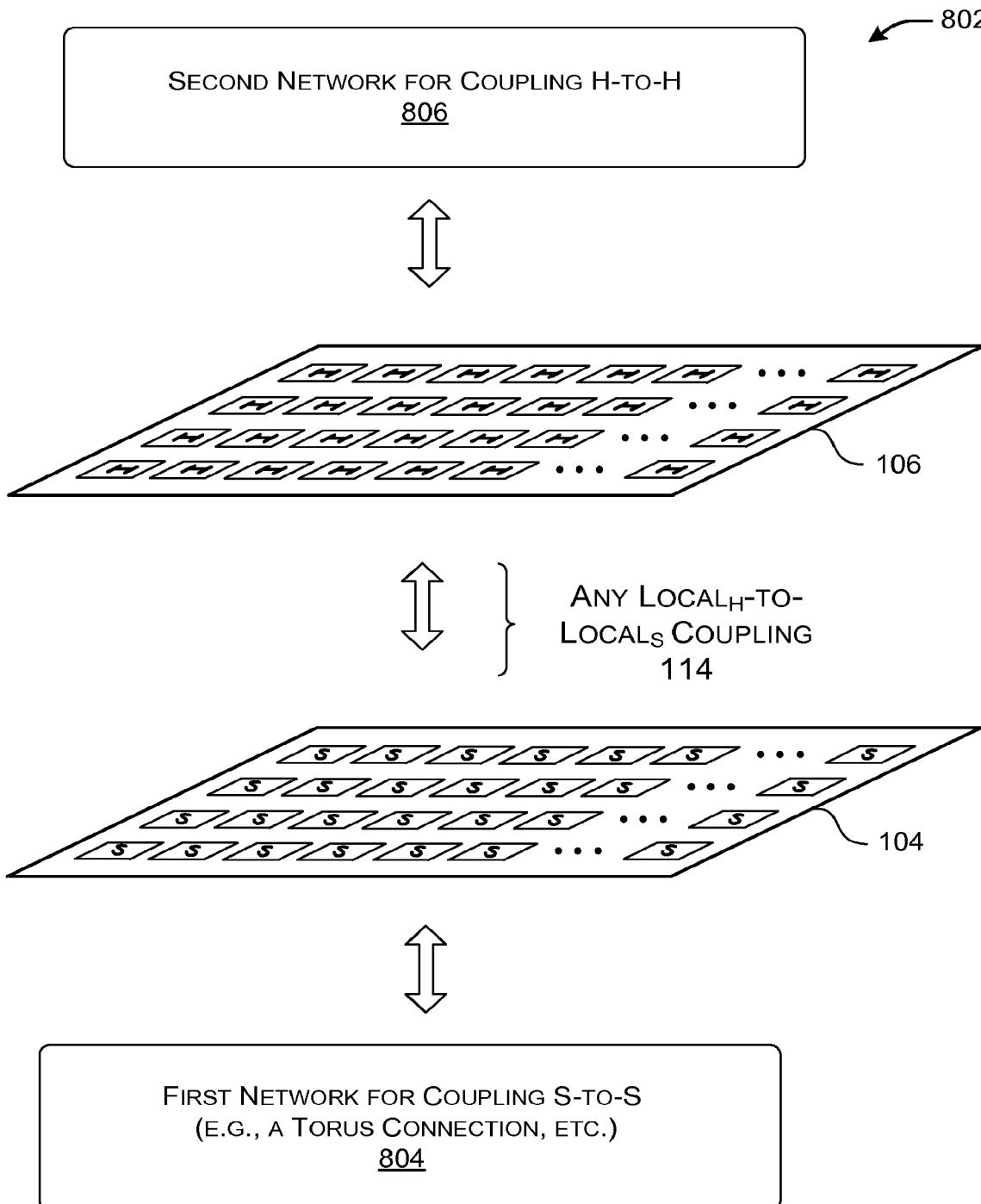
FIG. 8 shows an alternative data processing system compared to that shown in FIG. 1, e.g., which uses a different network infrastructure compared to that shown in FIG. 1.

FIG. 8 shows an alternative data processing system 802 compared to that shown in FIG. 1. Like the data processing system 102 of FIG. 1, the data processing system 802 includes a software plane 104 and a hardware acceleration plane 106, and a local$_H$-to-local$_S$ coupling 114 for connecting local host components to respective local acceleration components. But unlike the data processing system 102 of FIG. 1, the data processing system 802 includes a first network 804 for coupling host components together, and a second network 806 for coupling hardware components together, wherein the first network 804 differs from the second network 806, at least in part. For example, the first network 804 may correspond to the type of data center switching infrastructure shown in FIG. 5. The second network 806 may correspond to dedicated links for connecting the acceleration components together having any network topology. For example, the second network 806 may correspond to a p×r torus network. Each acceleration component in the torus network is coupled to east, west, north, and south neighboring acceleration components via appropriate cable links or the like. Other types of torus networks can alternatively be used having any respective sizes and dimensions.

In other cases, local hard CPUs, and/or soft CPUs, and/or acceleration logic provided by a single processing component (e.g., as implemented on a single die) may be coupled via diverse networks to other elements on other processing components (e.g., as implemented on other dies, boards, racks, etc.). An individual service may itself utilize one or more recursively local interconnection networks.

Further note that the above description was framed in the context of host components which issue service requests that are satisfied by acceleration components. But alternatively, or in addition, any acceleration component can also make a request for a service which can be satisfied by any other component, e.g., another acceleration component and/or even a host component. The SMC 102 can address such a request in a similar manner to that described above. Indeed, certain features described herein can be implemented on a hardware acceleration plane by itself, without a software plane.

More generally stated, certain features can be implemented by any first component which requests a service, which may be satisfied by the first component, and/or by one or more local components relative to the first component, and/or by one or more remote components relative to the first component. To facilitate explanation, however, the description below will continue to be framed mainly in the context in which the entity making the request corresponds to a local host component.

Figure 14:
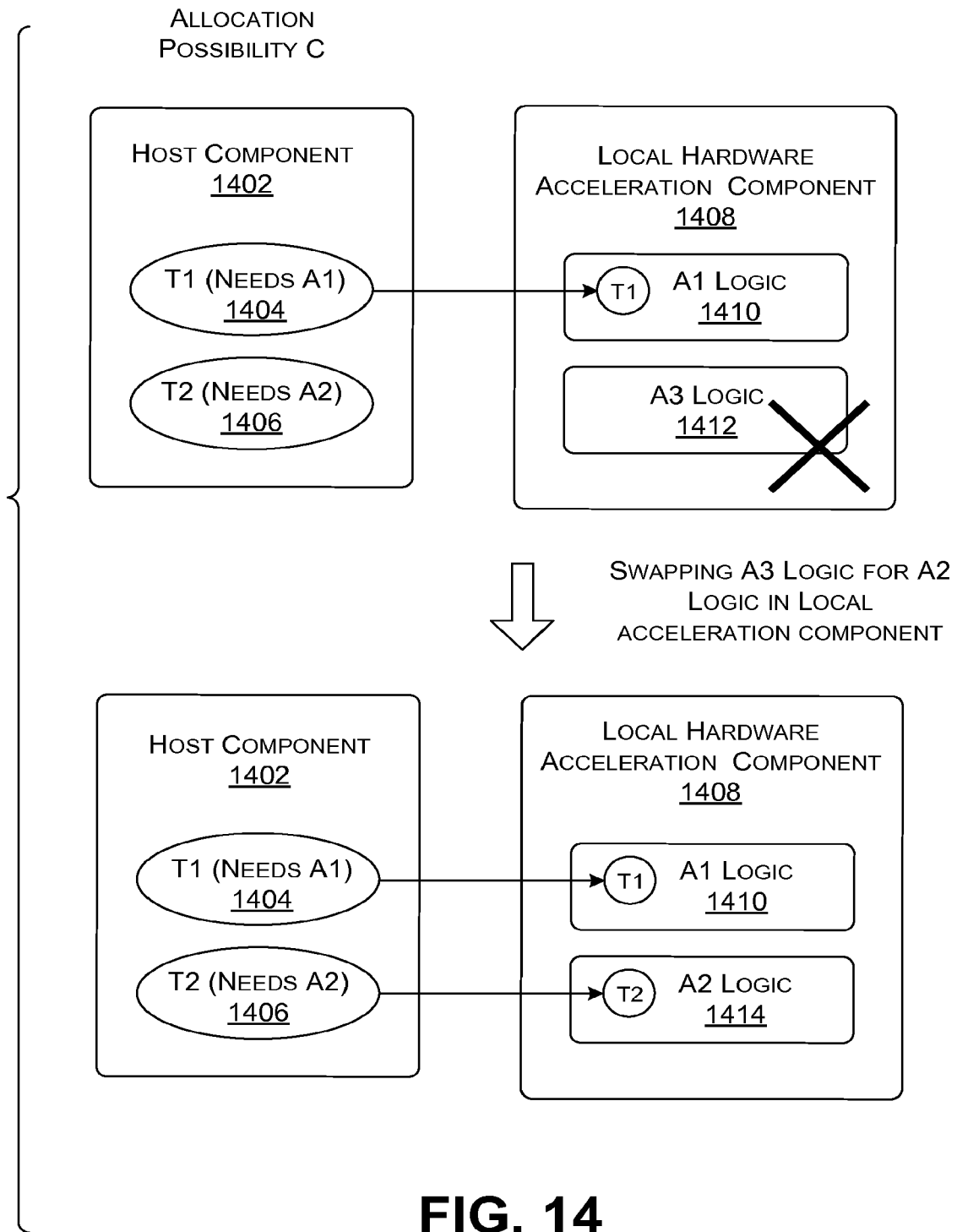

Finally, other implementations can adopt different strategies for coupling the host components to the hardware components, e.g., other than the local$_H$-to-local$_S$ coupling 114 shown in FIG. 14.

Figure 9:
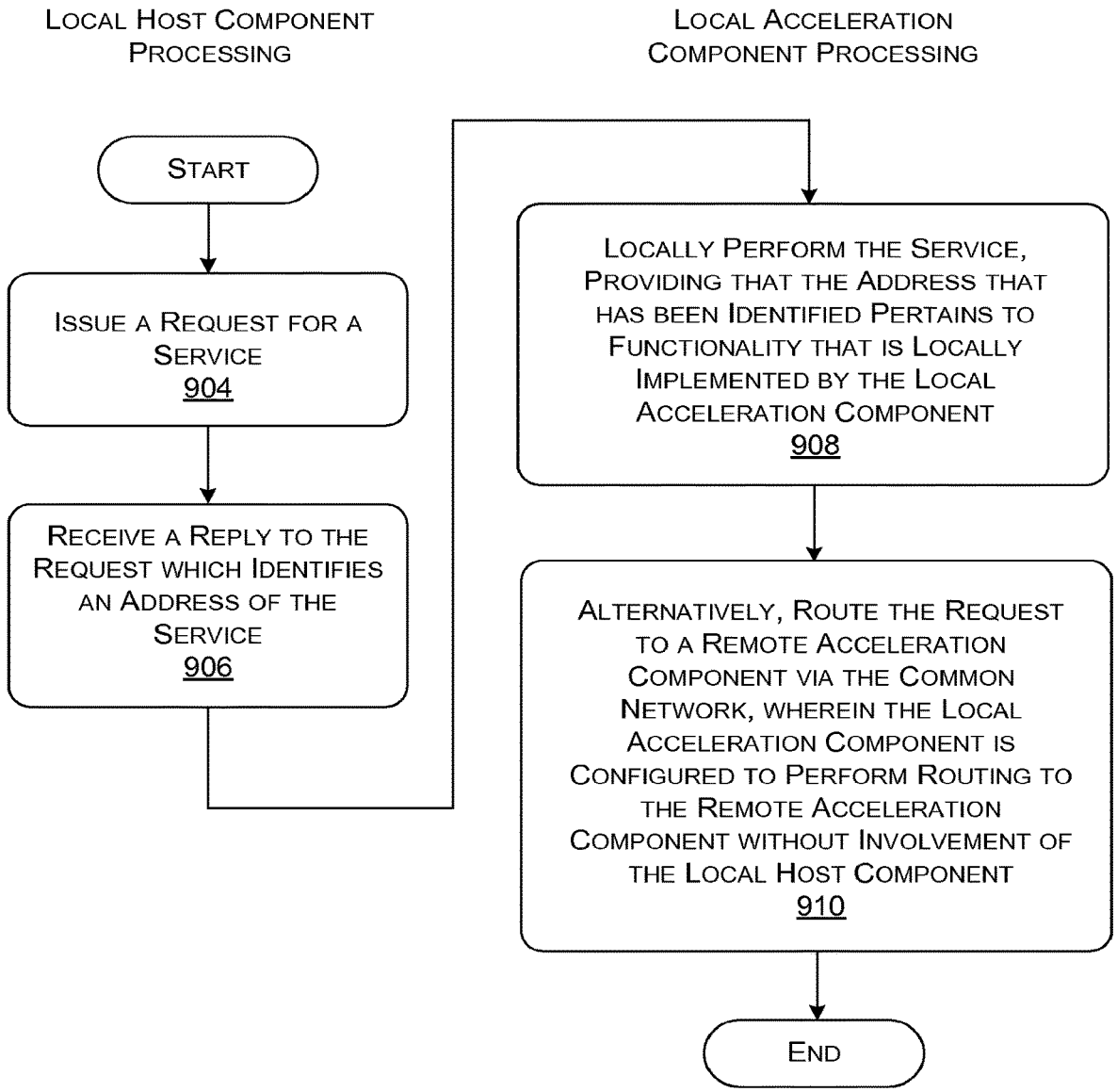
FIG. 9 is a flowchart that shows one manner of operation of the data processing system of FIG. 1.

FIG. 9 shows a process 902 which represents one illustrative manner of operation of the data processing system 102 of FIG. 1. In block 904, a local host component issues a request for a service. In block 906, the local host component receives a reply to the request which may identify an address of the service. In an alternative implementation, an associated local acceleration component may perform blocks 904 and 906 after receiving a request from the local host component. In other words, either the local host component or the local acceleration component can perform the address lookup function.

In block 908, the associated local acceleration component may locally perform the service, assuming that the address that has been identified pertains to functionality that is locally implemented by the local acceleration component. Alternatively, or in addition, in block 910, the local acceleration component routes the request to a remote acceleration component. As noted above, the local acceleration component is configured to perform routing to the remote acceleration component without involvement of the local host component. Further, plural host components communicate in the data processing system 102 with each other over a same physical network as do plural acceleration components.

In conclusion to Section A, the data processing system 102 has a number of useful characteristics. First, the data processing system 102 uses a common network 120 (except for the example of FIG. 8) that avoids the expense associated with a custom network for coupling acceleration components together. Second, the common network 120 makes it feasible to add an acceleration plane to an existing data processing environment, such as a data center. And after installment, the resultant data processing system 102 can be efficiently maintained because it leverages existing physical links found in the existing data processing environment. Third, the data processing system 102 integrates the acceleration plane 106 without imposing large additional power requirements, e.g., in view of the above-described manner in which local acceleration components may be integrated with existing server unit components. Fourth, the data processing system 102 provides an efficient and flexible mechanism for allowing host components to access any acceleration resources provided by the hardware acceleration plane 106, e.g., without narrowly pairing host components to specific fixed acceleration resources, and without burdening the host components with managing the hardware acceleration plane 106 itself. Fifth, the data processing system 102 provides an efficient mechanism for managing acceleration resources by intelligently dispersing these resources within the hardware plane 106, thereby: (a) reducing the overutilization and underutilization of resources (e.g., corresponding to the "stranded capacity" problem); (b) facilitating quick access to these services by consumers of these services; (c) accommodating heightened processing requirements specified by some consumers and/or services, and so on. The above effects are illustrative, rather than exhaustive; the data processing system 102 offers yet other useful effects.

B. Management Functionality

Figure 10:
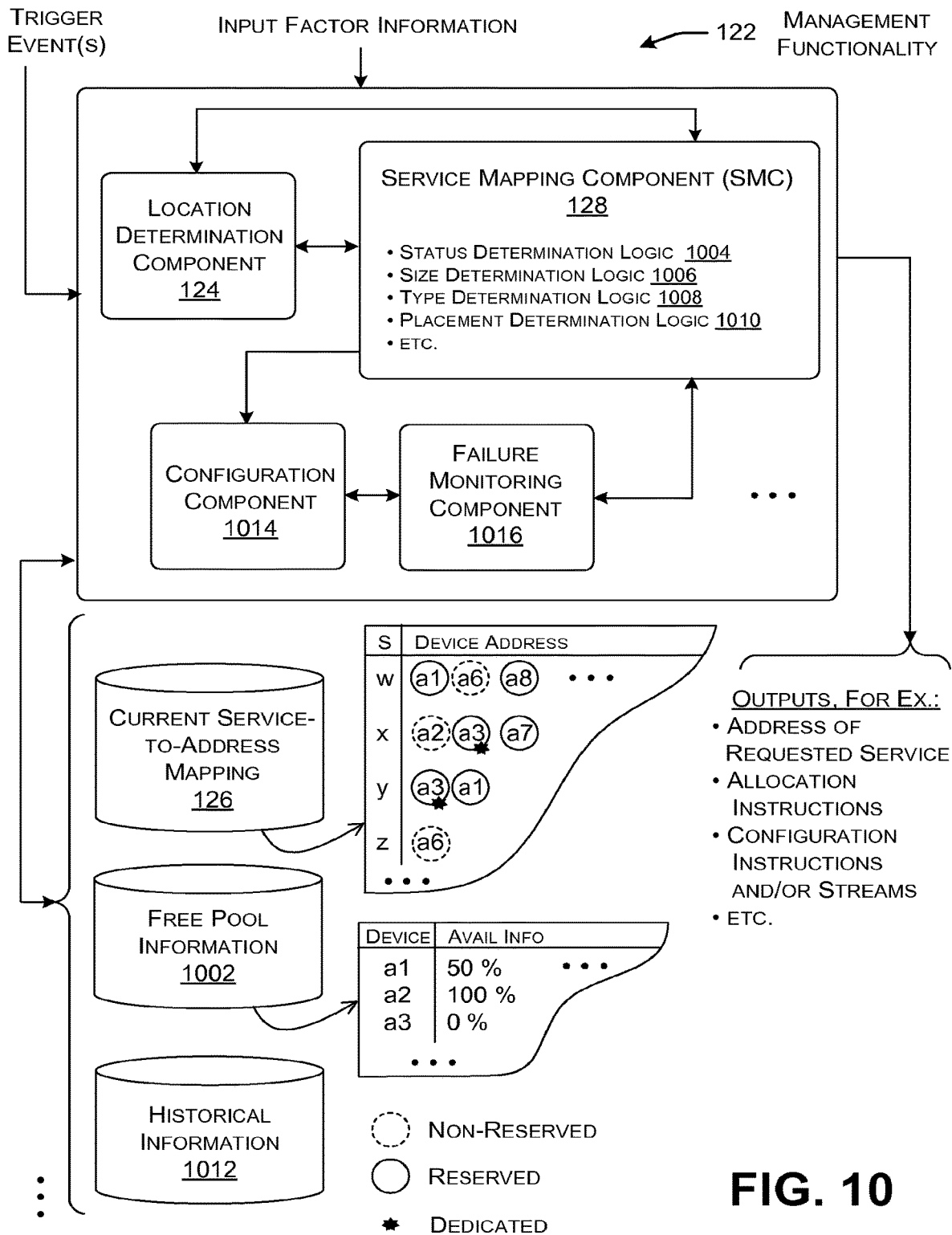
FIG. 10 shows an overview of one implementation of management functionality that is used to manage the data processing system of FIG. 1.

FIG. 10 shows an overview of one implementation of the management functionality 122 that is used to manage the data processing system 102 of FIG. 1. More specifically, FIG. 10 depicts a logical view of the functions performed by the management functionality 122, including its principal engine, the service mapping component (SMC) 128. Different sub-components correspond to different main functions performed by the management functionality 122. FIGS. 17-20, described below, show various possible physical implementations of the logical functionality.

As described in the introductory Section A, the location determination component 124 identifies the current location of services within the data processing system 102, based on current allocation information stored in the data store 126. In operation, the location determination component 124 receives a request for a service. In response, it returns an address of the service, if present within the data store 126. The address may identify a particular acceleration component that implements the service.

The data store 126 may maintain any type of information which maps services to addresses. In the small excerpt shown in FIG. 10, the data store 126 maps a small number of services (service w, service x, service y, and service z) to the acceleration components which are currently configured to provide these services. For example, the data store 126 indicates that a configuration image for service w is currently installed on devices having addresses a1, a6, and a8. The address information may be expressed in any manner. Here, the address information is represented in high-level symbolic form to facilitate explanation.

In some implementations, the data store 126 may optionally also store status information which characterizes each current service-to-component allocation in any manner. Generally, the status information for a service-to-component allocation specifies the way that the allocated service, as implemented on its assigned component (or components), is to be treated within the data processing system 102, such as by specifying its level of persistence, specifying its access rights (e.g., "ownership rights"), etc. In one non-limiting implementation, for instance, a service-to-component allocation can be designated as either reserved or non-reserved. When performing a configuration operation, the SMC 128 can take into account the reserved/non-reserved status information associated with an allocation in determining whether it is appropriate to change that allocation, e.g., to satisfy a current request for a service, a change in demand for one or more services, etc. For example, the data store 126 indicates that the acceleration components having address a1, a6, and a8 are currently configured to perform service w, but that only the assignments to acceleration components a1 and a8 are considered reserved. Thus, the SMC 128 will view the allocation to acceleration component a6 as a more appropriate candidate for reassignment (reconfiguration), compared to the other two acceleration components.

In addition, or alternatively, the data store 126 can provide information which indicates whether a service-to-component allocation is to be shared by all instances of tenant functionality, or dedicated to one or more particular instances of tenant functionality (or some other indicated consumer(s) of the service). In the former (fully shared) case, all instances of tenant functionality vie for the same resources provided by an acceleration component. In the latter (dedicated) case, only those clients that are associated with a service allocation are permitted to use the allocated acceleration component. FIG. 10 shows, in high-level fashion, that the services x and y that run on the acceleration component having address a3 are reserved for use by one or more specified instances of tenant functionality, whereas any instance of tenant functionality can use the other service-to-component allocations.

The SMC 128 may also interact with a data store 1002 that provides availability information. The availability information identifies a pool of acceleration components that have free capacity to implement one or more services. For example, in one manner of use, the SMC 128 may determine that it is appropriate to assign one or more acceleration components as providers of a function. To do so, the SMC 128 draws on the data store 1002 to find acceleration components that have free capacity to implement the function. The SMC 128 will then assign the function to one or more of these free acceleration components. Doing so will change the availability-related status of the chosen acceleration components.

The SMC 128 also manages and maintains the availability information in the data store 1002. In doing so, the SMC 128 can use different rules to determine whether an acceleration component is available or unavailable. In one approach, the SMC 128 may consider an acceleration component that is currently being used as unavailable, while an acceleration component that is not currently being used as available. In other cases, the acceleration component may have different configurable domains (e.g., tiles), some of which are being currently used and others which are not being currently used. Here, the SMC 128 can specify the availability of an acceleration component by expressing the fraction of its processing resources that are currently not being used. For example, FIG. 10 indicates that an acceleration component having address a1 has 50% of its processing resources available for use. On the other hand, an acceleration component having address a2 is completely available, while an acceleration component having an address a3 is completely unavailable. Individual acceleration components can notify the SMC 128 of their relative levels of utilization in different ways, as will be described in greater detail below.

In other cases, the SMC 128 can take into consideration pending requests for an acceleration component in registering whether it is available or not available. For example, the SMC 128 may indicate that an acceleration component is not available because it is scheduled to deliver a service to one or more instances of tenant functionality, even though it may not be engaged in providing that service at the current time.

In other cases, the SMC 128 can also register the type of each acceleration component that is available. For example, the data processing system 102 may correspond to a heterogeneous environment that supports acceleration components having different physical characteristics. The availability information in this case can indicate not only the identities of processing resources that are available, but also the types of those resources.

In other cases, the SMC 128 can also take into consideration the status of a service-to-component allocation when registering an acceleration component as available or unavailable. For example, assume that a particular acceleration component is currently configured to perform a certain service, and furthermore, assume that the allocation has been designated as reserved rather than non-reserved. The SMC 128 may designate that acceleration component as unavailable (or some fraction thereof as being unavailable) in view of its reserved status alone, irrespective of whether the service is currently being actively used to perform a function at the present time. In practice, the reserved status of an acceleration component therefore serves as a lock which prevents the SMC 128 from reconfiguring the acceleration component, at least in certain circumstances.

Now referring to the core mapping operation of the SMC 128 itself, the SMC 128 allocates or maps services to acceleration components in response to triggering events. More specifically, the SMC 128 operates in different modes depending on the type of triggering event that has been received. In a request-driven mode, the SMC 128 handles requests for services by tenant functionality. Here, each triggering event corresponds to a request by an instance of tenant functionality that resides, at least in part, on a particular local host component. In response to each request by a local host component, the SMC 128 determines an appropriate component to implement the service. For example, the SMC 128 may choose from among: a local acceleration component (associated with the local host component that made the request), a remote acceleration component, or the local host component itself (whereupon the local host component will implement the service in software), or some combination thereof.

In a second background mode, the SMC 128 operates by globally allocating services to acceleration components within the data processing system 102 to meet overall anticipated demand in the data processing system 102 and/or to satisfy other system-wide objectives and other factors (rather than narrowly focusing on individual requests by host components). Here, each triggering event that is received corresponds to some condition in the data processing system 102 as a whole that warrants allocation (or reallocation) of a service, such as a change in demand for the service.

Note, however, that the above-described modes are not mutually exclusive domains of analysis. For example, in the request-driven mode, the SMC 128 may attempt to achieve at least two objectives. As a first primary objective, the SMC 128 will attempt to find an acceleration component (or components) that will satisfy an outstanding request for a service, while also meeting one or more performance goals relevant to the data processing system 102 as a whole. As a second objective, the SMC 128 may optionally also consider the long term implications of its allocation of the service with respect to future uses of that service by other instances of tenant functionality. In other words, the second objective pertains to a background consideration that happens to be triggered by a request by a particular instance of tenant functionality.

For example, consider the following simplified case. An instance of tenant functionality may make a request for a service, where that instance of tenant functionality is associated with a local host component. The SMC 128 may respond to the request by configuring a local acceleration component to perform the service. In making this decision, the SMC 128 may first of all attempt to find an allocation which satisfies the request by the instance of tenant functionality. But the SMC 128 may also make its allocation based on a determination that many other host components have requested the same service, and that these host components are mostly located in the same rack as the instance of tenant functionality which has generated the current request for the service. In other words, this supplemental finding further supports the decision to place the service on an in-rack acceleration component.

FIG. 10 depicts the SMC 128 as optionally including plural logic components that perform different respective analyses. As a first optional component of analysis, the SMC 128 may use status determination logic 1004 to define the status of an allocation that it is making, e.g., as either reserved or non-reserved, dedicated or fully shared, etc. For example, assume that the SMC 128 receives a request from an instance of tenant functionality for a service. In response, the SMC 128 may decide to configure a local acceleration component to provide the service, and, in the process, designate this allocation as non-reserved, e.g., under the initial assumption that the request may be a "one-off" request for the service. In another situation, assume that the SMC 128 makes the additional determination that the same instance of tenant functionality has repeatedly made a request for the same service in a short period of time. In this situation, the SMC 128 may make the same allocation decision as described above, but this time the SMC 128 may designate it as being reserved. The SMC 128 may also optionally designate the service as being dedicated to just the requesting tenant functionality. By doing so, the SMC 128 may enable the data processing system 102 to more effectively satisfy future requests for this service by the instance of tenant functionality. In other words, the reserved status may reduce the chance that the SMC 128 will later move the service from the local acceleration component, where it is being heavily used by the local host component.

In addition, an instance of tenant functionality (or a local host component) may specifically request that it be granted a reserved and dedicated use of a local acceleration component. The status determination logic 1004 can use different environment-specific rules in determining whether to honor this request. For instance, the status determination logic 1004 may decide to honor the request, providing that no other triggering event is received which warrants overriding the request. The status determination logic 1004 may override the request, for instance, when it seeks to fulfill another request that is determined, based on any environment-specific reasons, as having greater urgency than the tenant functionality's request.

In some implementations, note that an instance of tenant functionality (or a local host component or some other consumer of a service) may independently control the use of its local resources. For example, a local host component may pass utilization information to the management functionality 122 which indicates that its local acceleration component is not available or not fully available, irrespective of whether the local acceleration component is actually busy at the moment. In doing so, the local host component may prevent the SMC 128 from "stealing" its local resources. Different implementations can use different environment-specific rules to determine whether an entity is permitted to restrict access to its local resources in the above-described manner, and if so, in what circumstances.

In another example, assume that the SMC 128 determines that there has been a general increase in demand for a particular service. In response, the SMC 128 may find a prescribed number of free acceleration components, corresponding to a "pool" of acceleration components, and then designate that pool of acceleration components as reserved (but fully shared) resources for use in providing the particular service. Later, the SMC 128 may detect a general decrease in demand for the particular service. In response, the SMC 128 can decrease the pool of reserved acceleration components, e.g., by changing the status of one or more acceleration components that were previously registered as "reserved" to "non-reserved."

Note that the particular dimensions of status described above (reserved vs. non-reserved, dedicated vs. fully shared) are cited by way of illustration, not limitation. Other implementations can adopt any other status-related dimensions, or may accommodate only a single status designation (and therefore omit use of the status determination logic 1004 functionality).

As a second component of analysis, the SMC 128 may use size determination logic 1006 to determine a number of acceleration components that are appropriate to provide a service. The SMC 128 can make such a determination based on a consideration of the processing demands associated with the service, together with the resources that are available to meet those processing demands.

As a third component of analysis, the SMC 128 can use type determination logic 1008 to determine the type(s) of acceleration components that are appropriate to provide a service. For example, consider the case in which the data processing system 102 has a heterogeneous collection of acceleration components having different respective capabilities. The type determination logic 1008 can determine one or more of a particular kind of acceleration components that are appropriate to provide the service.

As a fourth component of analysis, the SMC 128 can use placement determination logic 1010 to determine the specific acceleration component (or components) that are appropriate to address a particular triggering event. This determination, in turn, can have one more aspects. For instance, as part of its analysis, the placement determination logic 1010 can determine whether it is appropriate to configure an acceleration component to perform a service, where that component is not currently configured to perform the service.

The above facets of analysis are cited by way of illustration, not limitation. In other implementations, the SMC 128 can provide additional phases of analyses.

Generally, the SMC 128 performs its various allocation determinations based on one or more mapping considerations. For example, one mapping consideration may pertain to historical demand information provided in a data store 1012. The explanation (below) will provide additional description of different mapping considerations, as they apply to the operation of the placement determination logic 1010.

Note, however, that the SMC 128 need not perform multi-factor analysis in all cases. In some cases, for instance, a host component may make a request for a service that is associated with a single fixed location, e.g., corresponding to the local acceleration component or a remote acceleration component. In those cases, the SMC 128 may simply defer to the location determination component 124 to map the service request to the address of the service, rather than assessing the costs and benefits of executing the service in different ways. In other cases, the data store 126 may associate plural addresses with a single service, each address associated with an acceleration component that can perform the service. The SMC 128 can use any mapping consideration(s) in allocating a request for a service to a particular address, to be described below, such as a load balancing consideration.

As a result of its operation, the SMC 128 can update the data store 126 with information that maps services to addresses at which those services can be found (assuming that this information has been changed by the SMC 128). The SMC 128 can also store status information that pertains to new service-to-component allocations.

To configure one or more acceleration components to perform a function (if not already so configured), the SMC 128 can invoke a configuration component 1014. In one implementation, the configuration component 1014 configures acceleration components by sending a configuration stream to the acceleration components. A configuration stream specifies the logic to be "programmed" into a recipient acceleration component. The configuration component 1014 may use different strategies to configure an acceleration component, several of which are set forth below.

A failure monitoring component 1016 determines whether an acceleration component has failed. The SMC 128 may respond to a failure notification by substituting a spare acceleration component for a failed acceleration component.

B.1. Operation of the SMC in a Request-Driven Mode

Figure 11:
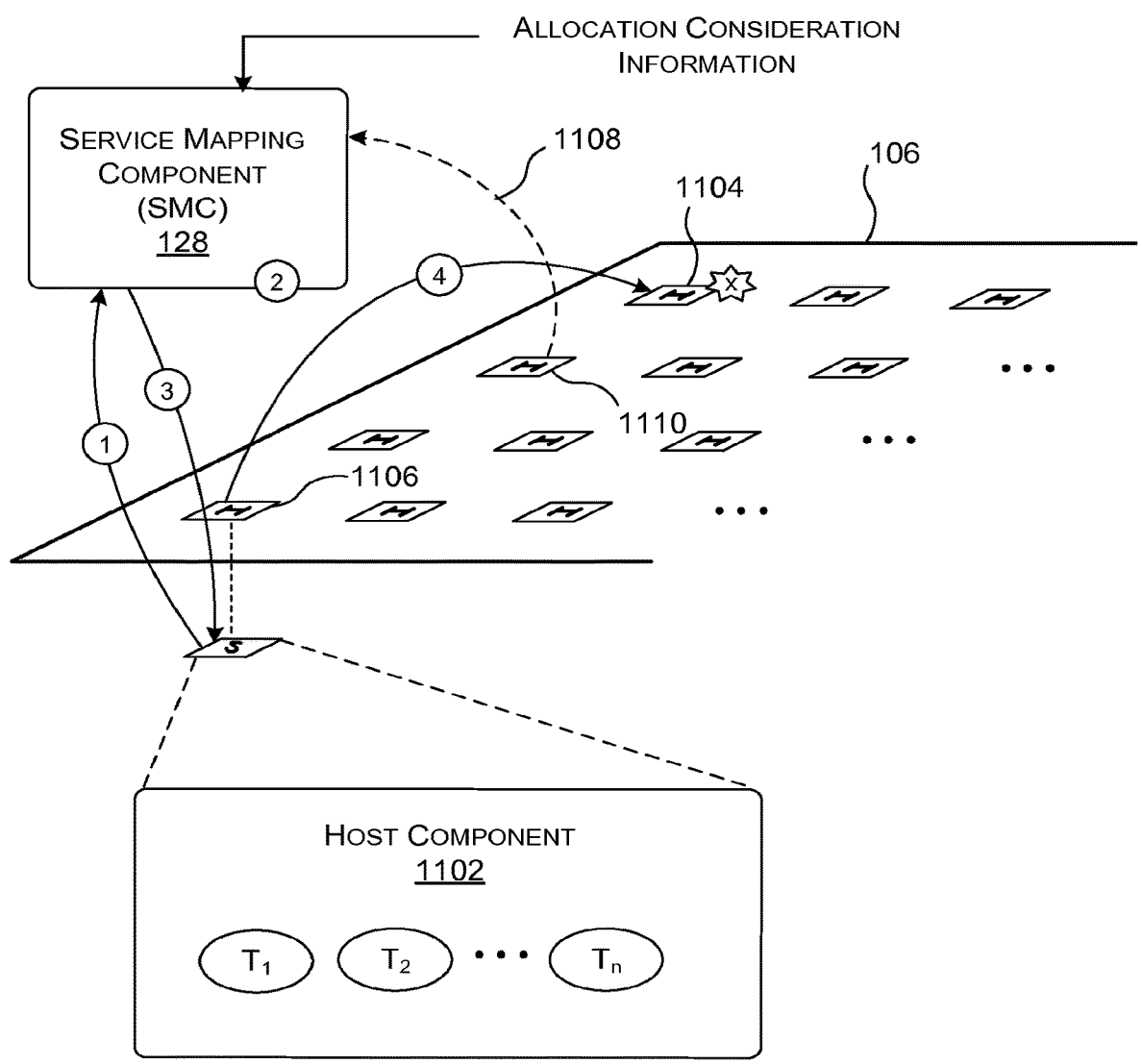
FIG. 11 provides an overview of one request-driven manner of operation of a service mapping component (SMC), which is a component of the management functionality of FIG. 10.
Figure 12:
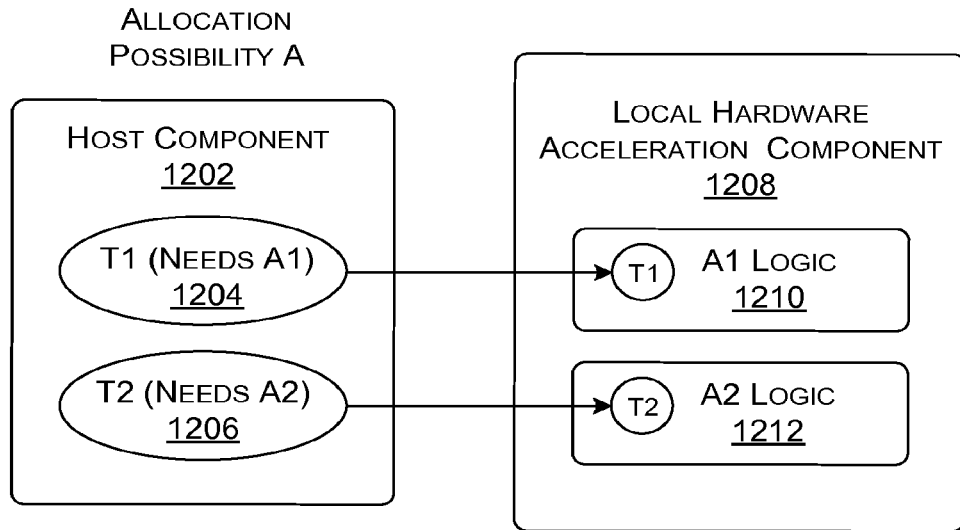
FIGS. 12-15 show different respective options for handling requests for services made by instances of tenant functionality that reside on a host component.

FIG. 11 provides an overview of one manner of operation of the SMC 128 when applied to the task of processing requests by instances of tenant functionality running on host components. In the illustrated scenario, assume that a host component 1102 implements plural instances of tenant functionality ($T_1, T_2, \ldots, T_n$). Each instance of tenant functionality may correspond to a software program that executes, at least in part, on the host component 1102, e.g., in a virtual machine that runs using the physical resources of the host component 1102 (among other possible host components). Further assume that one instance of tenant functionality initiates the transaction shown in FIG. 11 by generating a request for a particular service. For example, the tenant functionality may perform a photo editing function, and may call on a compression service as part of its overall operation. Or the tenant functionality may perform a search algorithm, and may call on a ranking service as part of its overall operation.

In operation (1), the local host component 1102 may send its request for the service to the SMC 128. In operation (2), among other analyses, the SMC 128 may determine at least one appropriate component to implement the service. In this case, assume that the SMC 128 determines that a remote acceleration component 1104 is the most appropriate component to implement the service. The SMC 128 can obtain the address of that acceleration component 1104 from the location determination component 124. In operation (3), the SMC 128 may communicate its answer to the local host component 1102, e.g., in the form of the address associated with the service. In operation (4), the local host component 1102 may invoke the remote acceleration component 1104 via its local acceleration component 1106. Other ways of handling a request by tenant functionality are possible. For example, the local acceleration component 1106 can query the SMC 128, rather than, or in addition to, the local host component 102.

Path 1108 represents an example in which a representative acceleration component 1110 (and/or its associated local host component) communicates utilization information to the SMC 128. The utilization information may identify whether the acceleration component 1110 is available or unavailable for use, in whole or in part. The utilization information may also optionally specify the type of processing resources that the acceleration component 1110 possesses which are available for use. As noted above, the utilization information can also be chosen to purposively prevent the SMC 128 from later utilizing the resources of the acceleration component 1110, e.g., by indicating in whole or in part that the resources are not available.

Although not shown, any acceleration component can also make directed requests for specific resources to the SMC 128. For example, the host component 1102 may specifically ask to use its local acceleration component 1106 as a reserved and dedicated resource. As noted above, the SMC 128 can use different environment-specific rules in determining whether to honor such a request.

Further, although not shown, other components besides the host components can make requests. For example, a hardware acceleration component may run an instance of tenant functionality that issues a request for a service that can be satisfied by itself, another hardware acceleration component (or components), a host component (or components), etc., or any combination thereof.

FIGS. 12-15 show different respective options for handling a request for a service made by tenant functionality that is resident on a host component. Starting with FIG. 12, assume that a local host component 1202 includes at least two instances of tenant functionality, T1 (1204) and T2 (1206), both of which are running at the same time (but, in actuality, the local host component 1202 can host many more instances of tenant functionality). The first instance of tenant functionality T1 requires an acceleration service A1 to perform its operation, while the second instance of tenant functionality T2 requires an acceleration service A2 to perform its operation.

Further assume that a local acceleration component 1208 is coupled to the local host component 1202, e.g., via a PCIe local link or the like. At the current time, the local acceleration component 1208 hosts A1 logic 1210 for performing the acceleration service A1, and A2 logic 1212 for performing the acceleration service A2.

According to one management decision, the SMC 128 assigns T1 to the A1 logic 1210, and assigns T2 to the A2 logic 1212. However, this decision by the SMC 128 is not a fixed rule; as will be described, the SMC 128 may make its decision based on plural factors, some of which may reflect conflicting considerations. As such, based on other factors (not described at this juncture), the SMC 128 may choose to assign jobs to acceleration logic in a different manner from that illustrated in FIG. 12.

Figure 13:
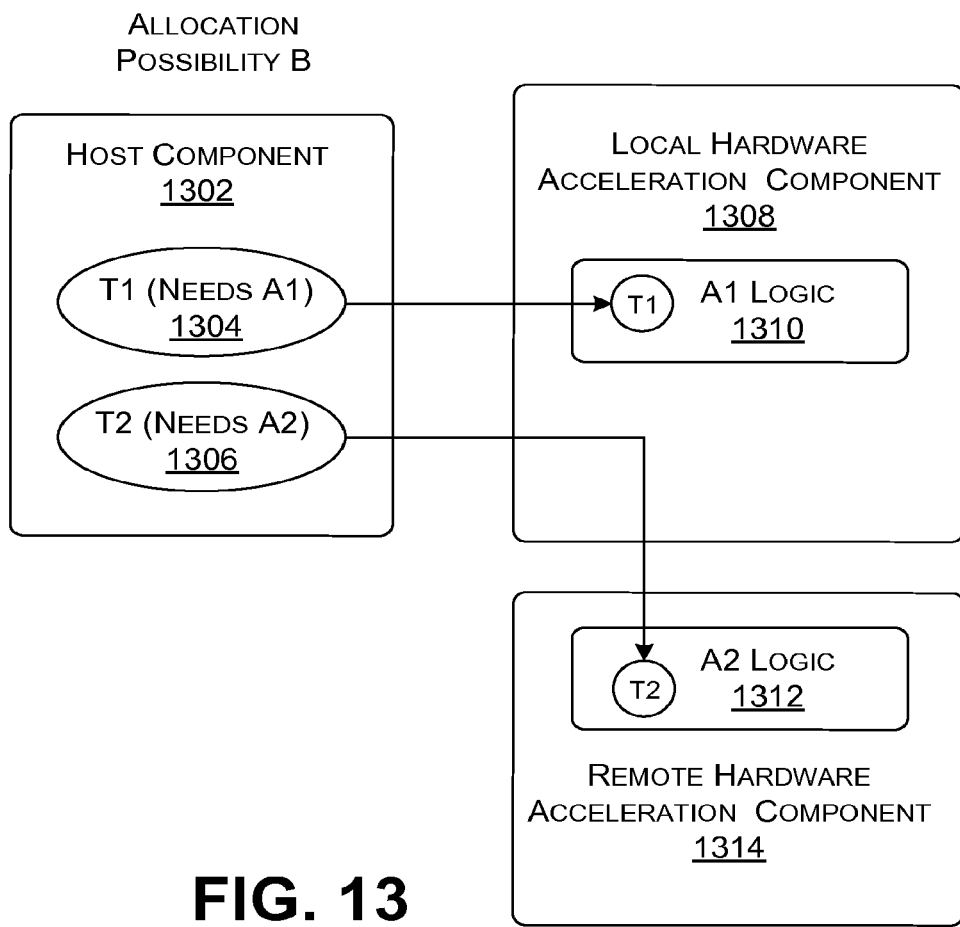

In the scenario of FIG. 13, the host component 1302 has the same instances of tenant functionality (1304, 1306) with the same service needs described above. But in this case, a local acceleration component 1308 includes only A1 logic 1310 for performing service A1. That is, it no longer hosts A2 logic for performing the service A2.

In response to the above scenario, the SMC 128 may choose to assign T1 to the A1 logic 1310 of the acceleration component 1308. The SMC 128 may then assign T2 to the A2 logic 1312 of a remote acceleration component 1314, which is already configured to perform that service. Again, the illustrated assignment is set forth here in the spirit of illustration, not limitation; the SMC 128 may choose a different allocation based on another combination of input considerations. In one implementation, the local host component 1302 and the remote acceleration component 1314 can optionally compress the information that they send to each other, e.g., to reduce consumption of bandwidth.

Note that the host component 1302 accesses the A2 logic 1312 via the local acceleration component 1308. But in another case (not illustrated), the host component 1302 may access the A2 logic 1312 via the local host component (not illustrated) that is associated with the acceleration component 1314.

FIG. 14 presents another scenario in which the host component 1402 has the same instances of tenant functionality (1404, 1406) with the same service needs described above. In this case, a local acceleration component 1408 includes A1 logic 1410 for performing service A1, and A3 logic 1412 for performing service A3. Further assume that the availability information in the data store 1002 indicates that the A3 logic 1412 is not currently being used by any instance of tenant functionality. In response to the above scenario, the SMC 128 may use the configuration component 1014 (of FIG. 10) to reconfigure the acceleration component 1408 so that it includes A2 logic 1414, rather than A3 logic 1412 (as shown at the bottom of FIG. 14). The SMC 128 may then assign T2 to the A2 logic 1414. Although not shown, the SMC 128 can alternatively, or in addition, decide to reconfigure any remote acceleration component to perform the A2 service.

Generally, the SMC 128 can perform configuration in a full or partial manner to satisfy any request by an instance of tenant functionality. The SMC performs full configuration by reconfiguring all of the application logic provided by an acceleration component. The SMC 128 can perform partial configuration by reconfiguring part (e.g., one or more tiles) of the application logic provided by an acceleration component, leaving other parts (e.g., one or more other tiles)

intact and operational during reconfiguration. The same is true with respect to the operation of the SMC 128 in its background mode of operation, described below. Further note that additional factors may play a role in determining whether the A3 logic 1412 is a valid candidate for reconfiguration, such as whether or not the service is considered reserved, whether or not there are pending requests for this service, etc.

Figure 15:
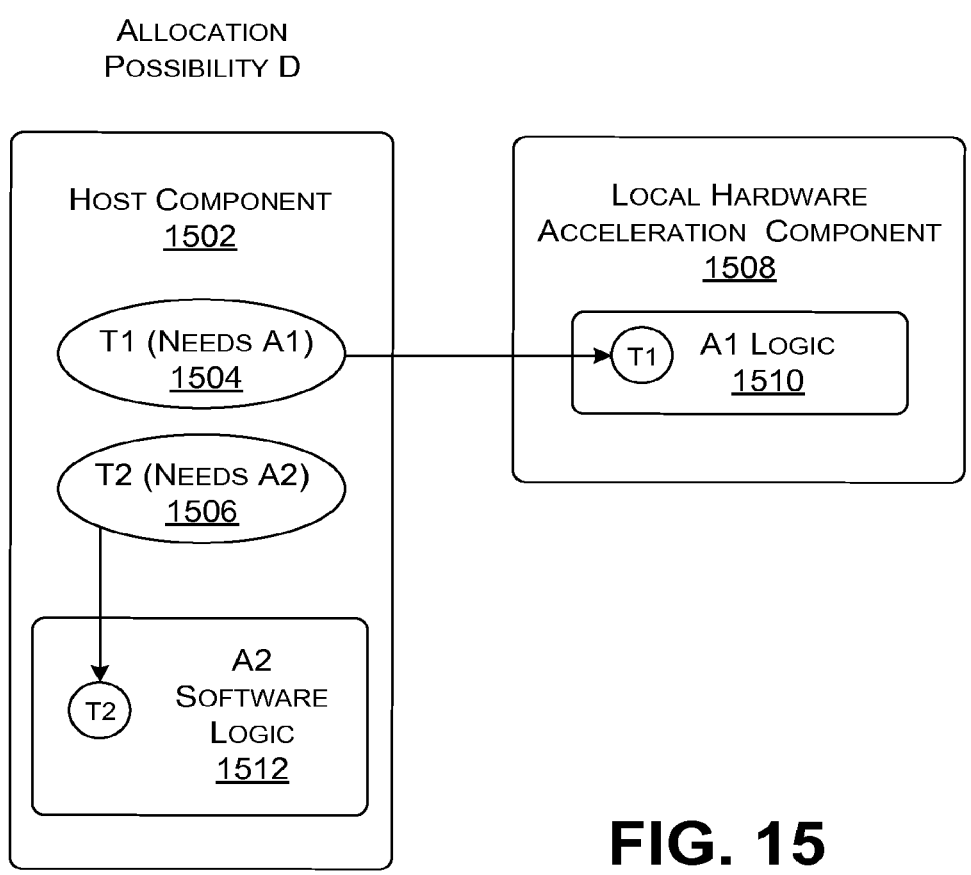

FIG. 15 presents another scenario in which the host component 1502 has the same instances of tenant functionality (1504, 1506) with the same service needs described above. In this case, a local acceleration component 1508 includes only A1 logic 1510) for performing service A1. In response to the above scenario, the SMC 128 may assign T1 to the A1 logic 1510. Further, assume that the SMC 128 determines that it is not feasible for any acceleration component to perform the A2 service. In response, the SMC 128 may instruct the local host component 1502 to assign T2 to local A2 software logic 1512, if, in fact, that logic is available at the host component 1502. The SMC 128 can make the decision of FIG. 15 on various grounds. For example, the SMC 128 may conclude that hardware acceleration is not possible because a configuration image does not currently exist for this service. Or the configuration image may exist, but the SMC 128 concludes that there is insufficient capacity on any of the acceleration devices to load and/or run such a configuration.

Finally, the above examples were described in the context of instances of tenant functionality that run on host components. But as already noted above, the instances of tenant functionality may more generally correspond to service requestors, and those service requestors can run on any component(s), including acceleration components. Thus, for example, a requestor that runs on an acceleration component can generate a request for a service to be executed by one or more other acceleration components and/or by itself and/or by one or more host components. The SMC 102 can handle the requestor's request in any of the ways described above.

B.2. Operation of the SMC in a Background Mode

Figure 16:
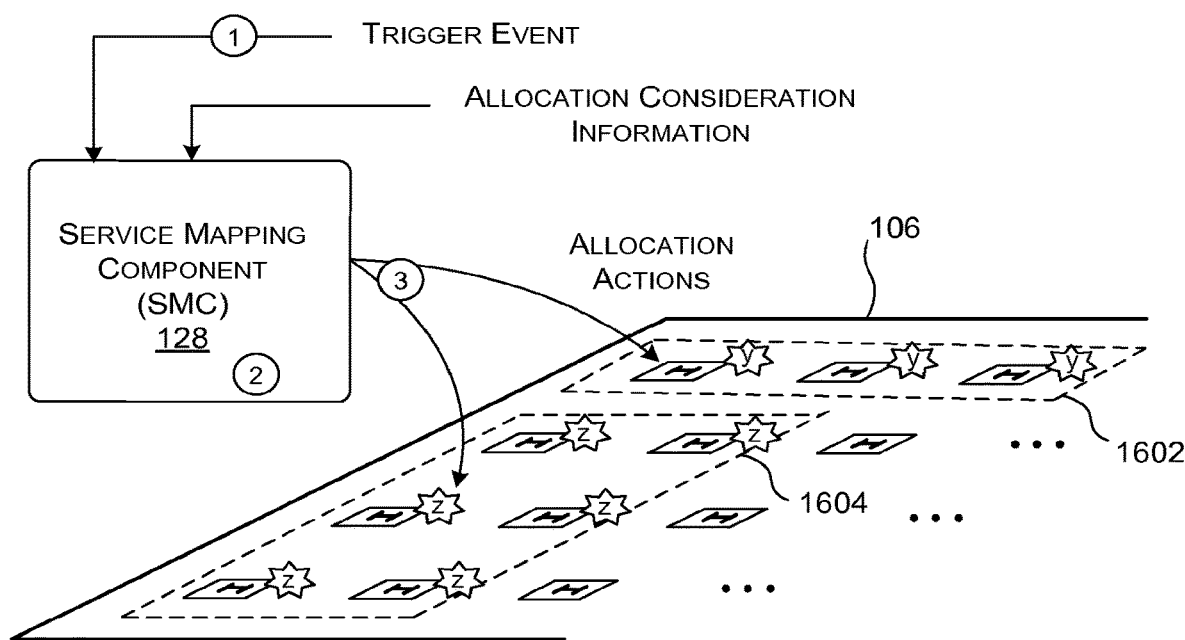
FIG. 16 provides an overview of another, background-related, manner of operation of the SMC of FIG. 10.

FIG. 16 provides an overview of one manner of operation of the SMC 128 when operating in a background mode. In operation (1), the SMC 128 may receive some type of triggering event which initiates the operation of the SMC 128. For example, the triggering event may correspond to a change in demand which affects a service, etc. In operation (2), in response to the triggering event, the SMC 128 determines an allocation of one or more services to acceleration components based one or more mapping considerations and the availability information in the data store 1002, e.g., by assigning the services to a set of one or more available acceleration components. In operation (3), the SMC 128 carries out its allocation decisions. As part of this process, the SMC 128 may call on the configuration component 1014 to configure the acceleration components that have been allocated to perform the service(s), assuming that these components are not already configured to perform the service(s). The SMC 128 also updates the service location information in the data store 126, and, if appropriate, the availability information in the data store 1002.

In the particular example of FIG. 16, the SMC 102 allocates a first group 1602 of acceleration components to perform a first service ("service y"), and allocates a second group 1604 of acceleration components to perform a second service ("service z"). In actual practice, an allocated group of acceleration components can have any number of members, and these members may be distributed in any fashion across the hardware acceleration plane 106. The SMC 128, however, may attempt to group the acceleration components associated with a service in a particular manner to achieve satisfactory bandwidth and latency performance (among other factors), as will be described in greater detail below. The SMC 128 may apply further analysis in allocating acceleration components associated with a single multi-component service.

The SMC 128 can also operate in the background mode to allocate one or more acceleration components, which implement a particular service, to at least one instance of tenant functionality, without necessarily requiring the tenant functionality to make a request for this particular service each time. For example, assume that an instance of tenant functionality regularly uses a compression function, corresponding to "service z" in FIG. 16. The SMC 128 can proactively allocate one or more dedicated acceleration components 1604 to at least this instance of tenant functionality. When the tenant functionality requires use of the service, it may draw from the pool of available addresses associated with the acceleration components 1604 that have been assigned to it. The same dedicated mapping operation can be performed with respect to a group of instances of tenant functionality (instead of a single instance).

B.3. Physical Implementations of the Management Functionality

Figure 17:
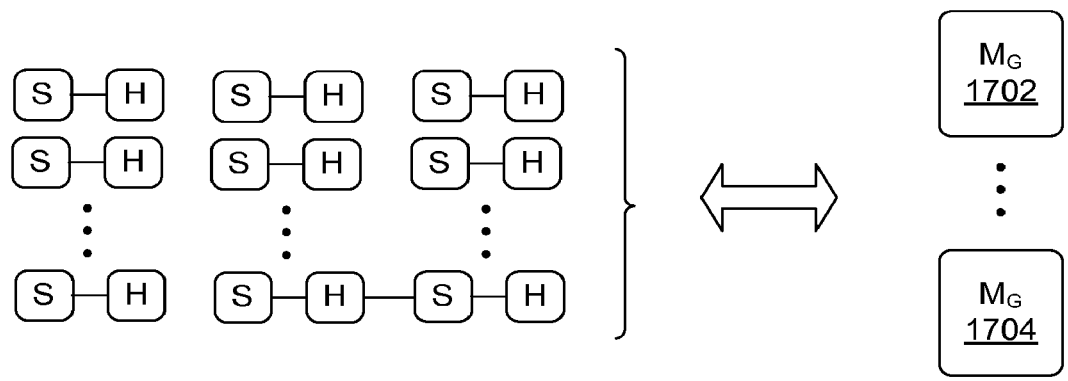
FIGS. 17-20 show different respective architectures for physically implementing the management functionality of FIG. 10.

FIG. 17 shows a first physical implementation of the management functionality 122 of FIG. 10. In this case, the management functionality 122 is provided on a single global management component ($M_G$) 1702, or on plural global management components (1702, . . . , 1704). The plural global management components (1702, . . . , 1704), if used, may provide redundant logic and information to achieve desired load balancing and failure management performance. In one case, each global management component may be implemented on a computer server device, which may correspond to one of the host components, or a dedicated management computing device. In operation, any individual host component (S) or acceleration component (H) may interact with a global management component via the common network 120 shown in FIG. 1.

Figure 18:
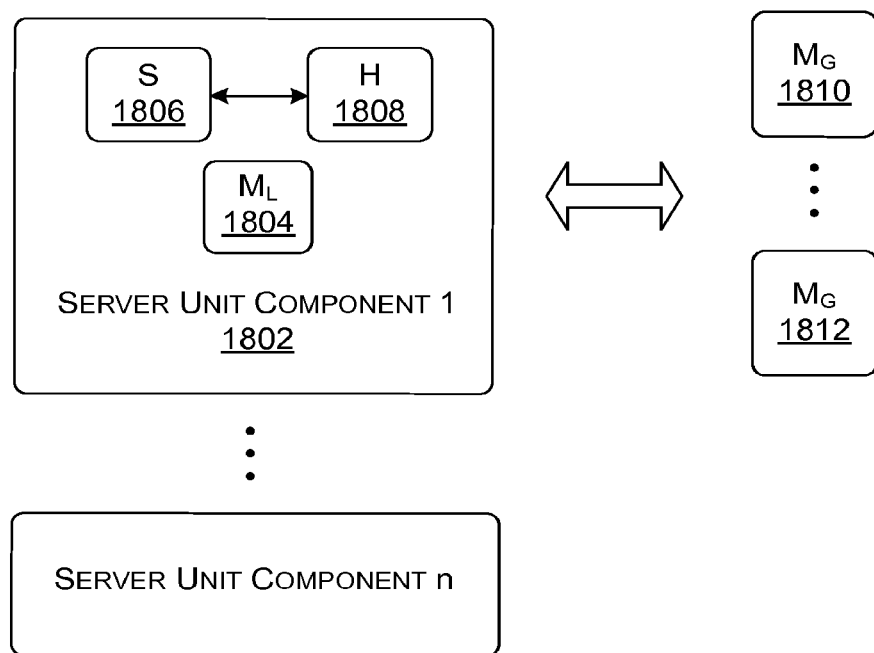

FIG. 18 shows a second physical implementation of the management functionality 122 of FIG. 10. In this case, each server unit component (such as representative server unit component 1802) provides at least one local management component ($M_L$) 1804. For example, a local host component 1806 may implement the local management component 1804 (e.g., as part of its hypervisor functionality), or a local acceleration component 1808 may implement the local management component 1804, or some other component within the server unit component 1802 may implement the local management component 1804 (or some combination thereof). The data processing system 102 also includes one or more global management components (1810, . . . , 1812). Each global management component may provide redundant logic and information in the manner described above with respect to FIG. 17. The management functionality 122 collectively presents all of the local and global management components in the data processing system 102, as set forth above.

The architecture of FIG. 18 can implement the request-driven aspects of the SMC 128, for instance, in the following manner. The local management component 1804 may first determine whether the local acceleration component 1808 can perform a service requested by tenant functionality. A global management component ($M_G$) can perform other decisions, such as identifying a remote acceleration component to perform a service, in the event that the local acceleration component 1808 cannot perform this task. On the other hand, in the architecture of FIG. 17, a single global management component can perform all decisions pertaining to the mapping of a request to an acceleration component.

Further, the local management component 1804 can send utilization information to a global management component on any basis, such as periodic basis and/or an event-driven basis (e.g., in response to a change in utilization). The global management component can use the utilization information to update its master record of availability information in the data store 1002.

Figure 19:
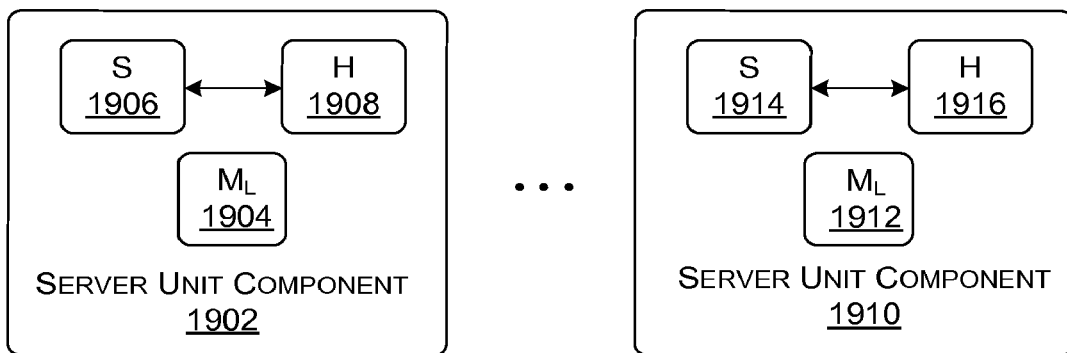

FIG. 19 shows a third physical implementation of the management functionality 122 of FIG. 10. In this case, each server unit component stores its own dedicated local management component ($M_L$) (which can be implemented by a local host component as part of its hypervisor functionality, a local acceleration component, some other local component, or some combination thereof). For instance, a server unit component 1902 provides a local management component 1904, along with a local host component 1906 and a local acceleration component 1908. Likewise, a server unit component 1910 provides a local management component 1912, along with a local host component 1914 and a local acceleration component 1916. Each instance of a local management component stores redundant logic and information with respect to other instances of the same component. Known distributed system tools can be used to ensure that all distributed versions of this component contain the same logic and information, such as the ZOOKEEPER tool provided by Apache Software Foundation of Forest Hill, Md. (As an aside, note that the same technology can be used to maintain the redundant logic and information in the other examples described in this subsection.) The management functionality 122 collectively presents all of the local management components in the data processing system 102, as set forth above. That is, there is no central global management component(s) in this implementation.

Figure 20:
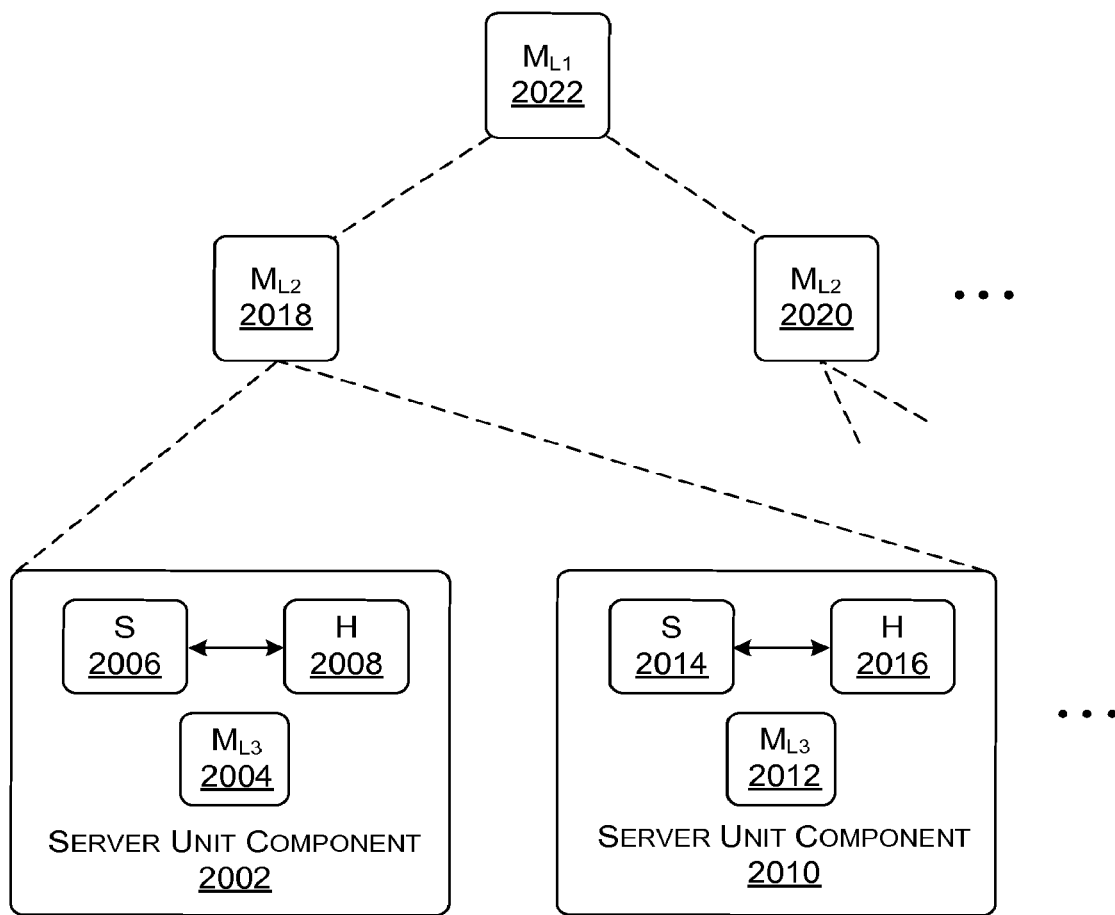
Figure 21:
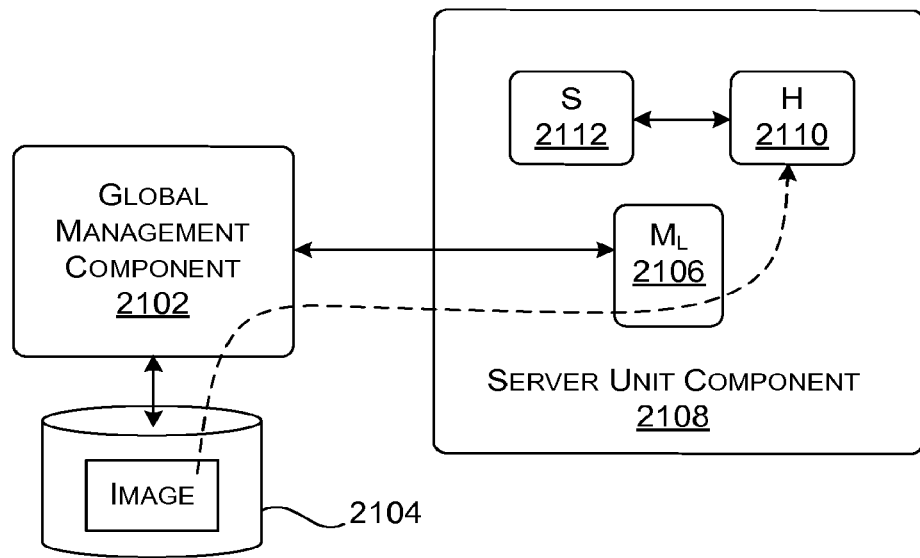
FIGS. 21-24 show different respective strategies for configuring a hardware acceleration component in the data processing system of FIG. 1.

FIG. 20 shows a fourth physical implementation of the management functionality 122 of FIG. 10. In this case, the management functionality 122 embodies a hierarchical structure of individual management components. For example, in one merely representative structure, each server unit component includes a low-level local management component ($M_{L3}$) (which can be implemented by a local host component, a local acceleration component, some other local component, or some combination thereof). For example, a server unit component 2002 provides a low-level local management component 2004, along with a local host component 2006 and a local acceleration component 2008. Likewise, a server unit component 2010 provides a low-level local management component 2012, along with a local host component 2014 and an acceleration component 2016. A next management tier of the structure includes at least a mid-level management component 2018 and a mid-level management component 2020. A top level of the structure includes a single global management component 2022 (or plural redundant such global management components). The illustrated control architecture thus forms a structure having three levels, but the architecture can have any number of levels.

In operation, the low-level management components (2004, 2012, . . . ) handle certain low-level management decisions that directly affect the resources associated with individual server unit components. The mid-level management components (2018, 2020) can make decisions which affect a relevant section of the data processing system 102, such as an individual rack or a group of racks. The top-level management component (2022) can make global decisions which broadly apply to the entire data processing system 102.

B.4. The Configuration Component

FIGS. 21-24 show different respective strategies for configuring an acceleration component, corresponding to different ways of implementing the configuration component 1014 of FIG. 10. Starting with FIG. 21, a global management component 2102 has access to a data store 2104 that provides one or more configuration images. Each configuration image contains logic that can be used to implement a corresponding service. The global management component 2102 can configure an acceleration component by forwarding a configuration stream (corresponding to a configuration image) to the acceleration component. For example, in one approach, the global management component 2102 can send the configuration stream to a local management component 2106 associated with a particular server unit component 2108. The local management component 2106 can then coordinate the configuration of a local acceleration component 2110 based on the received configuration stream. Alternatively, the local host component 2112 can perform the above-described operation, instead of, or in addition to, the local management component 2106.

Figure 22:
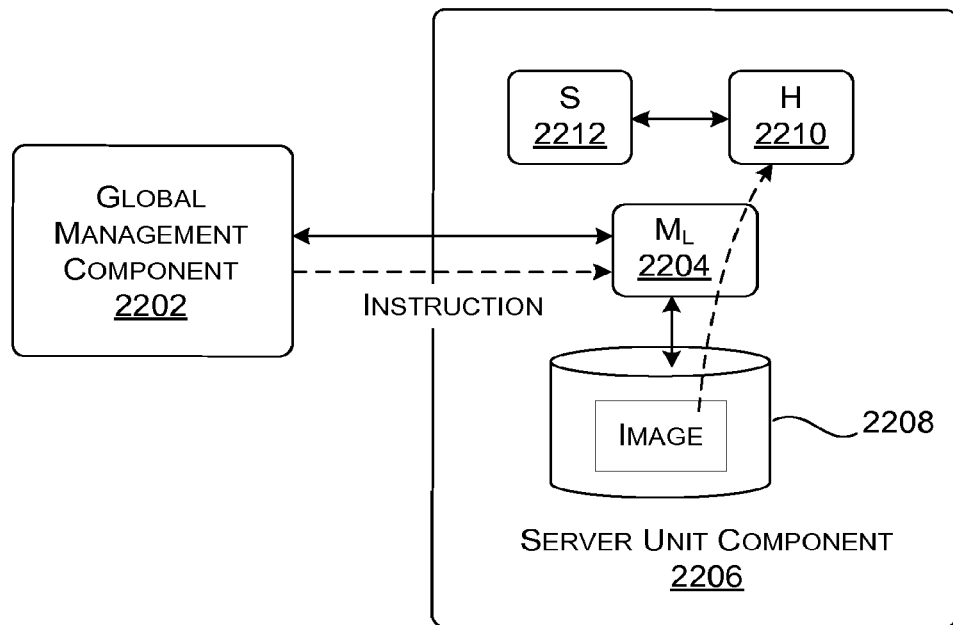

FIG. 22 shows another strategy for configuring an acceleration component. In this case, a global management component 2202 sends an instruction to a local management component 2204 of a server unit component 2206. In response, the local management component 2204 accesses a configuration image in a local data store 2208 and then uses it to configure a local acceleration component 2210. Alternatively, a local host component 2212 can perform the above-described operation, instead of, or in addition to, the local management component 2204.

Figure 23:
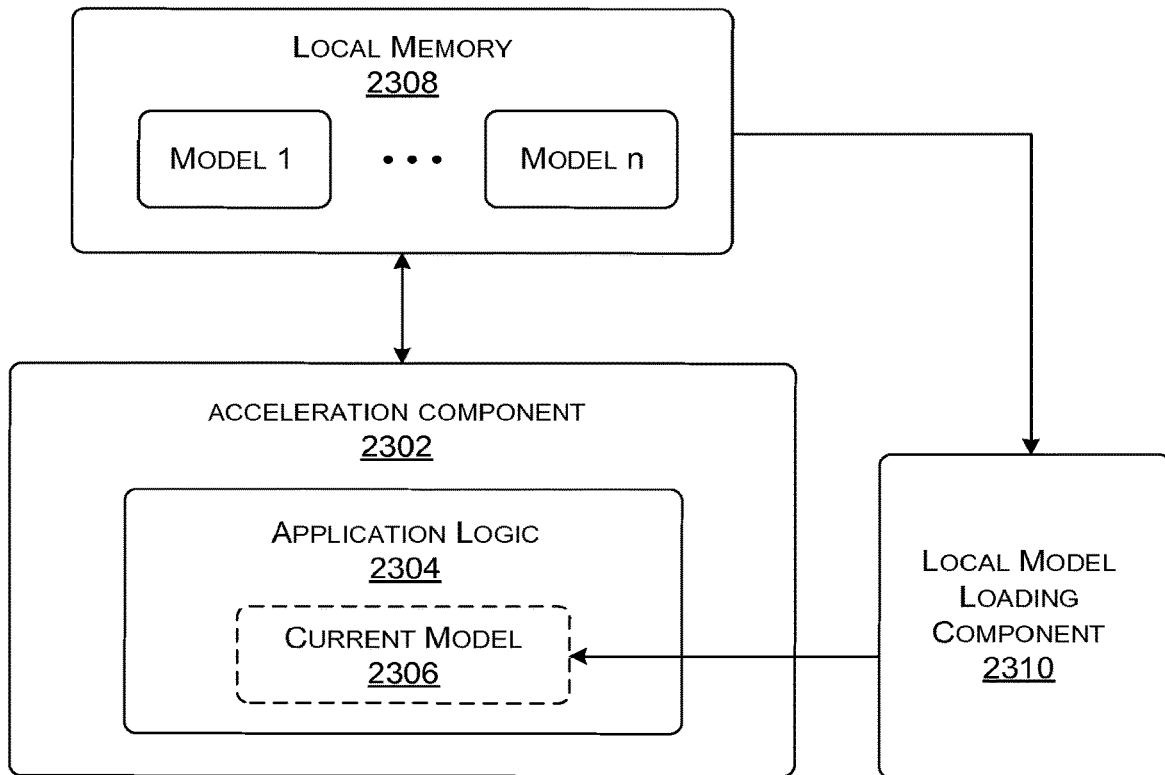

FIG. 23 shows another technique for configuring a local acceleration component 2302. In this approach, assume that the acceleration component 2302 includes application logic 2304, which, in turn, is governed by a current model 2306 (where a model corresponds to logic that performs a function in a particular manner). Further assume that the acceleration component 2302 has access to local memory 2308. The local memory 2308 stores configuration images associated with one or more other models (model 1, . . . , model n). When triggered, a local model loading component 2310 can swap out the configuration associated with the current model 2306 with the configuration associated with another model in the local memory 2308. The model loading component 2310 may be implemented by the acceleration component 2302 itself, a local host component, a local management component, etc., or some combination thereof. In one implementation, the configuration operation shown in FIG. 23 can be performed in less time than the overall reconfiguration of the application logic 2304 as a whole, as it entails replacing some of the logic used by the application logic 2304, not the entire application logic 2304 in wholesale fashion.

Figure 24:
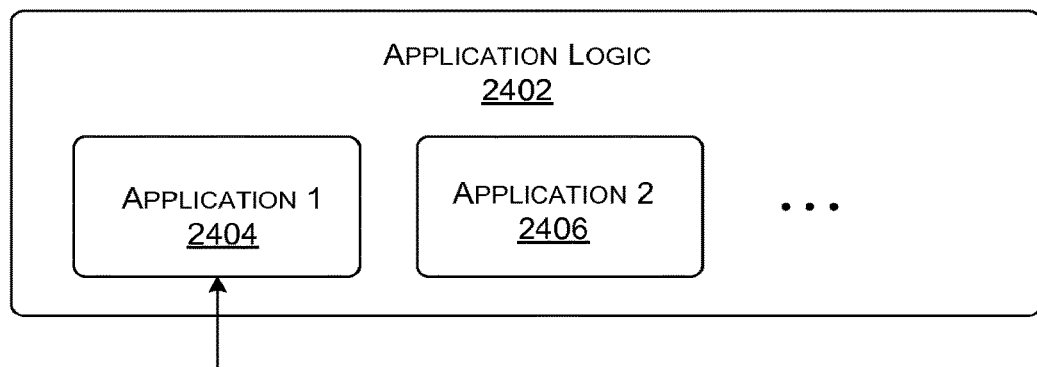

Finally, FIG. 24 shows an acceleration component having application logic 2402 that supports partial configuration. The management functionality 122 can leverage this capability by configuring application 1 (2404) separately from application 2 (2406), and vice versa.

B.5. Illustrative Operation of the SMC

Figure 25:
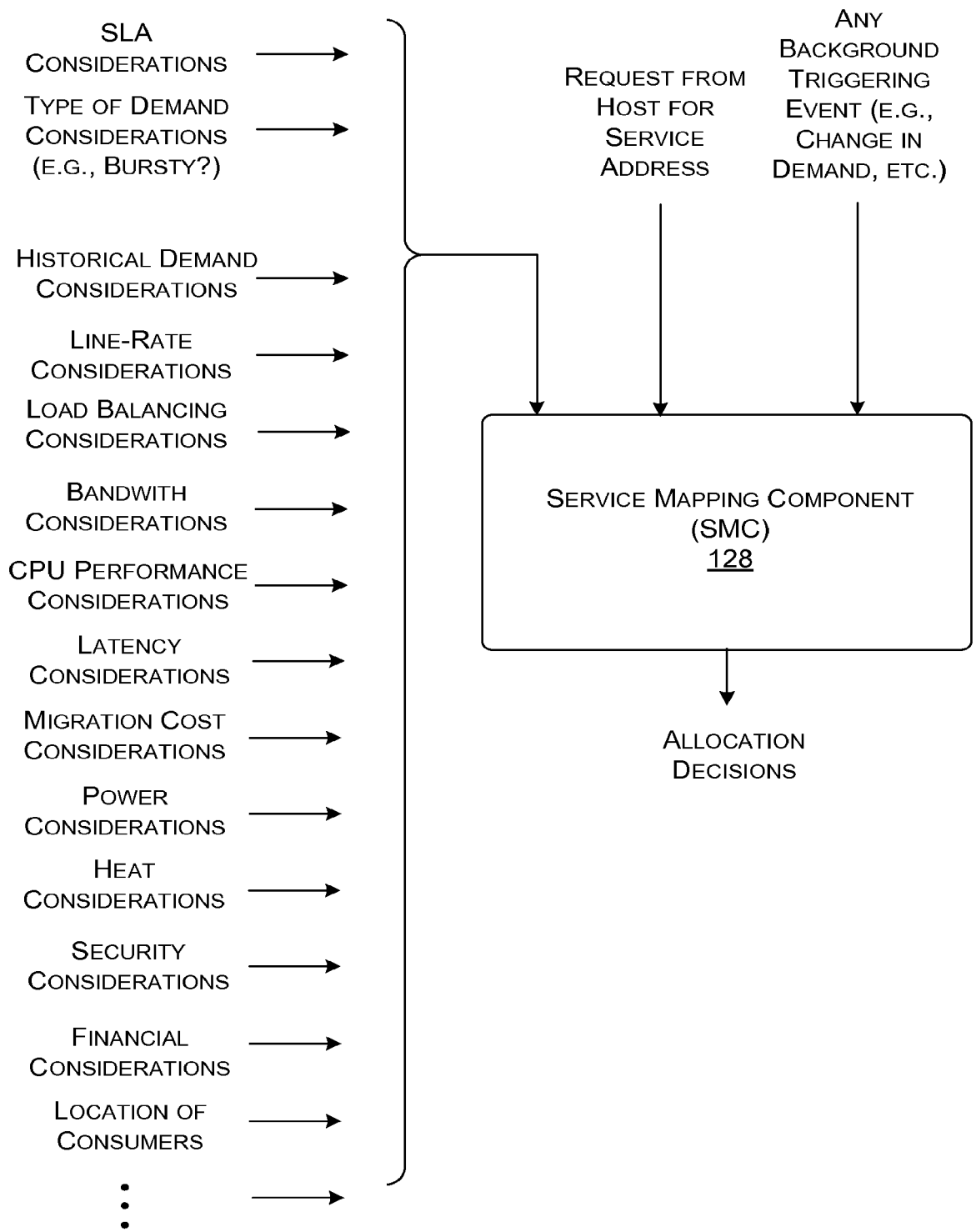
FIG. 25 provides additional information regarding one manner of operation of the SMC of FIG. 10.

FIG. 25 provides an overview of one manner of operation of the service mapping component (SMC) 128. As stated above, the SMC 128 may perform its decision process upon receiving one or more triggering events. In a request-driven mode, a triggering event may correspond to a request from an instance of tenant functionality, or some other entity which requests an acceleration service. In a background mode, one type of triggering event corresponds to a change in a demand for one or more services. Another background-mode triggering event corresponds to a change in the availability of acceleration resources that are used to perform the services. Another background-mode triggering event corresponds to the introduction and/or removal of one or more services. Another background-mode triggering event may correspond to a change in the performance of the data processing system 102, particularly with respect to processing load issues, bandwidth issues, etc. In addition, or alternatively, the SMC 128 may operate in the background mode by periodically analyzing the prevailing conditions in the data processing center based on any specified frequency. The SMC 128 can also combine request-driven analysis with background analysis in the manner described above by considering the general background-related implications of its allocations when responding to individual requests by instances of tenant functionality.

As also noted above, the SMC 128 may perform different phases of analysis, such as: (1) determining the status associated with a service-to-component allocation (e.g., reserved vs. non-reserved, dedicated vs. fully shared, etc.), which is performed by the status determination logic 1004; (2) determining a number of acceleration components to be used, which is performed by the size determination logic 1006; (3) determining the type(s) of acceleration components to be used, which is performed by the type determination logic 1008; and/or (4) determining individual acceleration components to be used within the data processing system 102, which is performed by the placement determination logic 1010, and so on.

To facilitate explanation, the operation of the SMC 102 will be principally explained with respect to the fourth determination performed by the placement determination logic 1010. To further simplify the explanation, the following explanation will be initially set forth in the context of the assignment of a single service to one or more acceleration components, where plural consumers are not yet contending for the same resources.

Generally, in a request-driven mode, the placement determination logic 1004 of the SMC 128 may satisfy a request by instructing a requesting instance of tenant functionality as to where it can access a requested service. In doing so, the SMC 128 can optionally call on the configuration component 1014 to configure an acceleration component (or components) to perform the requested service, if these components are not already configured to perform the service. Alternatively, or in addition, the SMC 128 can assign a request to an already configured service on an identified acceleration component. Similarly, in the background mode, the placement determination logic 1006 of the SMC 128 can satisfy overall demand for a service in the data processing system 102 by calling on the configuration component 1014 to configure one or more acceleration components to provide the service, and/or draw from one or more already configured acceleration components.

Upon invocation, the SMC 128 can make a decision based on several factors, referred to below as "mapping considerations." The SMC 128 can obtain input information pertaining to these mapping considerations from various sources, such as host components and acceleration components within the data processing system 102, external entities which provide information regarding performance parameter values and the like (which may be accessed via one or more network connections, such as the Internet), etc.

Some mapping considerations are relatively narrow in focus, e.g., by emphasizing the extent to which an allocation decision satisfies a particular request generated by an instance of tenant functionality that runs on a local host component. Other mapping considerations are more global in focus, e.g., by emphasizing an effect that an allocation decision will have on the data processing system 102 as a whole. Other mapping considerations take into account both particular and global factors. The following explanation identifies a representative but non-exhaustive list of mapping considerations.

a. Location of Consumers

One mapping consideration pertains to the location(s) of the entity(ies) which have requested the service under consideration, or the location(s) of the entity(ies) that will likely consume that service in the future. For example, when performing an allocation in the background mode, the SMC 128 can determine whether a service under consideration has just a few main consumers. If so, then the SMC 128 may attempt to place one or more acceleration components "close" to those consumers. More specifically, in one non-limiting case, the SMC 128 may load the service onto one or more local acceleration components associated with respective host components which regularly request the service. On the other hand, if the service has many random consumers spread over the data processing system 102, then the SMC 128 may consider it less important to place the service in proximity to any one consumer.

b. Current Mapping Considerations

Another mapping consideration pertains to what service or services are currently loaded onto the acceleration components in the hardware acceleration plane 106, e.g., as reflected in the current allocation information provided in the data store 126. For example, assume that the SMC 128 seeks to fulfill a request for a service by an instance of tenant functionality associated with a local host component. The SMC 128 may favor allocating the requested service to the local acceleration component (which is associated with the local host component) when that local acceleration component is already configured to perform that service. Similarly, when operating in the background mode to select a pool of reserved acceleration components for performing a service, the SMC 128 may favor allocating the service to an acceleration component when that component is already configured to perform that service. This factor is also related to a cost-of-migration consideration described below.

c. Image Availability Considerations

Another related consideration pertains whether a configuration image for a requested service even exists. Not all services are good candidates for hardware acceleration, so not all requested software services have counterpart configuration images. The SMC 128 may leverage this consideration in the request-driven mode by immediately instructing a host component to perform a service in software, where that service cannot be implemented in hardware.

d. Acceleration Benefit Considerations

Another mapping consideration pertains to whether a performance boost can be expected by deploying a service on acceleration hardware, as opposed to performing the function in software by a host component. If negligible performance benefit is likely, then the SMC 128 can instruct a local host component to implement a requested service in software. In the background mode, the SMC 128 may decline to create a pool of acceleration components dedicated to a particular service if negligible acceleration benefit can be expected.

e. Current Availability Considerations

Another mapping consideration pertains to the available capacity of each acceleration component under consideration (e.g., as reflected in the data store 1002 that provides availability information), with respect its ability to handle an identified service. As noted above, the availability of an acceleration component can be specified as binary Yes/No information, percentile information, etc. The availability of an acceleration component can also take into account pending requests for the acceleration component, etc., e.g., in which the acceleration component is scheduled to perform identified processing in the future. The SMC 128 can leverage this consideration to determine whether it is feasible to configure a given acceleration component under consideration to perform a service.

f. SLA Considerations

Another mapping consideration pertains to a service level agreement (SLA) associated with the service. For example, an SLA associated with a service may specify one or more parameter values which reflect the requested speed at which the service is to be delivered to end users, such by specifying worst-case latency performance that is to be permitted, and/or other worst-case performance parameter values. The SMC 128 may choose one or more acceleration components to satisfy the SLA requirements of the service, which may entail selecting a certain number of acceleration components, and/or choosing certain types of acceleration components, and/or selecting the locations of those acceleration components, etc.

g. Type-Of-Demand Considerations

Another mapping consideration pertains to the nature of traffic patterns associated with a service. For instance, some services are characterized by relatively steady-state traffic flow. Other services exhibit highly "bursty" traffic, meaning that they are subject to large and perhaps unpredictable spikes in traffic. In one non-limiting strategy, the SMC 128 may seek to avoid dedicating a single bursty service to a single acceleration component (or components), as the bursty service may generally fail to efficiently utilize the resources of the dedicated component (e.g., due to underutilization). Instead, the SMC 128 may choose to allocate plural bursty services to a pool of acceleration components. Such an allocation strategy is based on the premise that the intermittent bursts associated with plural services will be uncorrelated, and the average demand associated with several of these bursty services can be reasonably predicted and taken into account, thus permitting a more efficient utilization of the resources of the allocated acceleration components.

h. Historical Demand Considerations

Another mapping consideration pertains to the historical demand associated with a service. In the background mode, the SMC 128 will attempt to allocate a sufficient number of acceleration components to satisfy the expected demand for a service, which may vary throughout the day, throughout the week, etc. The SMC 128 can also take into account the manner in which demand changes for the service, e.g., whether it is typically bursty vs. relatively steady (as described above), unpredictable vs. predictable, trending up vs. trending down, etc.

When handling a specific request, the SMC 128 can take demand information into account in different ways. In one scenario, the SMC 128 may consider historical demand information associated with a particular candidate acceleration component when deciding whether to use that acceleration component to satisfy a current request for a service. For instance, an acceleration component that is soon to be overloaded may not be a good candidate to satisfy the request. The SMC 128 can also leverage such known demand patterns to determine the likely resource requirements associated the current request (where those are not specified in advance), and then use that information as another factor in determining how to most effectively handle the request.

i. Line-Rate Service Considerations

Another mapping consideration pertains to whether or not the service under consideration is a line-rate service. A line-rate service is a service that is performed on information flowing on a link (or through some other point of analysis) at a prescribed rate, preferably without delaying the transmission of that information. The SMC 128 may choose to place line-rate services close to their respective consumers to ensure that the heightened processing demands associated with these services are met. For example, a line-rate service may be rendered inoperable when that service is located remotely from a consumer of the line-service, e.g., due to the latencies involved in contacting the remote acceleration component and/or bandwidth overload caused by interacting with the remote acceleration component, etc.

j. Load Balancing Considerations

Another mapping consideration pertains to load balancing. When handling particular requests for a service, the SMC 128 will seek to allocate the requests to acceleration components in a manner that does not overburden any acceleration component (and/or other processing component) in the data processing system 102. This can be achieved by using any load-balancing strategy to spread the requests out over plural acceleration components that provide the service. Similarly, when performing a more general background allocation, the SMC 128 will seek to distribute a service over acceleration components in such a manner that no one acceleration component (and/or other computing resource associated with the data processing system 102) is overburdened.

k. Bandwidth Considerations

Another mapping consideration pertains to bandwidth in the data processing system 102. When handling particular requests for a service, the SMC 128 will seek to assign the requests to acceleration components in such a manner that no link in the data processing system 102 is overburdened. Similarly, when performing a more general background allocation, the SMC 128 will seek to distribute a service in such a manner that no link in the data processing system 102 is overburdened.

l. Latency Considerations

Another mapping consideration pertains to latency incurred in accessing a service. The SMC 128 will seek to provide a service in such a manner that the latencies involved in accessing the service are within acceptable ranges. As noted above, a line-rate service may be effectively rendered inoperable if the service is located too "far" from the expected consumer(s) of the service. Generally note that, in many cases, the SMC 128 can satisfy several allocation constraints (such as latency, bandwidth, etc.) by placing a service on the same rack as its expected consumers, and preferably on the same server unit component as an expected consumer.

m. CPU Performance Considerations

Another mapping consideration pertains to the load placed on host components in the software plane 104. When processing a particular request, the SMC 128 may avoid performing the requested service in software on the local host component if doing so will overburden the CPUs of that component. Similarly, when operating in the background mode, the SMC 128 may attempt to identify any software-related services that are contributing to overloading of a CPU, and then offload some of that processing to one or more acceleration components.

n. Migration Cost Considerations

Another mapping consideration pertains to costs that will be incurred upon reconfiguring the hardware acceleration plane 106 in a particular manner under consideration. Here, the SMC 128 will generate an assessment of the amount of time and/or other resources that are required to perform the reconfiguration (e.g., based on known and pre-stored configuration data). Based on that knowledge, the SMC 128 will then determine the impact that the reconfiguration process will have on other functions performed by the data processing system 102. For example, the SMC 128 may prohibit a reconfiguration process when that process is projected to interfere with a critical process performed by the data processing system 102.

o. Power and Thermal Considerations

Another mapping consideration pertains to power and/or thermal effects. The SMC 128 may consult a reference table or the like to determine the amount of power that will be consumed, and the amount of heat that will be generated, in running a service on a particular candidate acceleration component or components. The SMC 128 may use this information to choose an allocation option that satisfies appropriate power and/or thermal constraints. The SMC 128 can also consult real-time temperature and power measurements in making its decision. For example, the SMC 128 may seek to distribute a service over plural racks if performing the service on a single rack will exceed thermal limits for that rack.

p. Monetary Considerations

Another mapping consideration pertains to monetary considerations. In some cases, a service confers a known monetary benefit (e.g., as measured by ad revenue, product sales revenue, etc.). Further, a service running on one or more acceleration components may have known costs, such as the cost of the devices themselves (or fractions thereof that are being used to run the service), the cost of supplying power to the components, the cost of utilizing computational resources (e.g., as assessed by a data center administrator), the opportunity cost of forgoing another service or services, and so on. The SMC 128 can compute the monetary benefits and costs for different allocation options, and use this information in determining how and where to allocate the service. In one scenario, the SMC 128 can leverage this consideration to maximize overall profit provided by a data center.

q. Security Considerations

Another mapping consideration pertains to the security implications of allocating a service to one or more proposed acceleration components. For example, security considerations may prohibit two services of a certain type from being placed on the same acceleration component. Alternatively, or in addition, security considerations may prohibit a service from being placed on a remote acceleration component, with respect to its consumer (e.g., with respect to the local host component which consumes the service). The SMC 128 may take these factors into account when determining how to allocate a service in the hardware acceleration plane 106.

r. Co-location Considerations

Another consideration pertains to the manner in which two or more services are typically hosted or used together on a same computing device or other platform. For example, consider a hypothetical environment in which many users use a document compression service in conjunction with an encryption service, e.g., by first using the document compression service to compress a document, and then using the encryption service to encrypt the compressed document. To the extent that such co-location information is available, the SMC 128 can allocate commonly-grouped services to the same acceleration component, or to the same rack, etc. Doing so may be advantageous, for instance, to facilitate the management of services in the hardware acceleration plane 106. Co-location information can be obtained by examining actual usage patterns within the data processing system 102, and/or by consulting more general statistical information regarding usage habits.

s. Received Request Considerations

Another consideration pertains to whether an entity (such as a local acceleration component, local host component, local management component, an instance of tenant functionality, etc.) has made a request for a specific kind of allocation. For instance, an instance of tenant functionality may ask the SMC 128 to grant it dedicated use of a service that runs on its local acceleration component. The SMC 128 can balance this request against all of the other factors described above.

The above considerations are cited by way of example, not limitation. Other implementations can take into account additional considerations, and/or can omit one or more considerations described above.

Note that the above description sometimes assumed that the SMC 128 uses a single acceleration component to implement a complete instance of a service. In multi-component services, however, a collection of acceleration components implement a single service. That is, each acceleration component in the collection implements a part of the multi-component service. The SMC 128 can apply special considerations when allocating multi-component services to acceleration components.

For example, the SMC 128 may take into account the manner in which a multi-component's acceleration components are distributed in the data processing system 102, as this factor may affect the performance of the multi-component service (and the data processing system 102 as a whole) in terms of latency, bandwidth, load balancing, etc. For instance, the SMC 128 may choose to allocate a collection of acceleration components associated with a multi-component service to a single rack or group of racks to reduce latency and bandwidth bottlenecks. By doing so, for instance, the SMC 128 can reduce the bandwidth in the higher nodes of the switching fabric.

Further note that the above description was framed in the context of the allocation of complete services. But the SMC 128 may also allocate and reallocate fragments of any service of any size to various hardware and/or software processing elements in a dynamic manner, rather than, or in addition to, assigning the complete service to a single processing element.

The SMC 128 can use different algorithms to process all of the mapping considerations described above to arrive at a final conclusion. In one technique, once invoked, the SMC 128 can apply a rules-based process to determine how to allocate a service among a pool of available acceleration components. In one implementation, the rules may be structured as a graph of IF-THEN decisions. Generally, different rules may be appropriate to different data processing systems, based on environment-specific considerations associated with those systems.

To cite one representative case, the SMC 128 can process a request by an instance of tenant functionality that runs on a local host component by first determining whether the requested service is already present on a local acceleration component associated with the local host component. If so, the SMC 128 will determine whether the service is a line-rate service or some other service having relatively high processing demands. If so, the SMC 128 will use the local acceleration component to fulfill the tenant functionality's request, unless there are security constraints which make this allocation inappropriate. On the other hand, if the service is a relatively non-critical task that does not affect key performance metrics of the tenant functionality's operation, the SMC 128 may choose to use a remote acceleration component to fulfill the tenant functionality's request, thereby freeing up the local acceleration component to handle more urgent jobs. The SMC 128 may perform similar multi-factor analysis when allocating services to acceleration components in the background mode.

In other algorithmic approaches, upon encountering a triggering event, the SMC 128 can enumerate the possible allocation options for a service at the present time. Each option reflects the allocation of the service to a specific feasible set of acceleration components within the data processing system 102 (where the set includes one more acceleration components). The SMC 128 can then assign a score to each option which reflects a weighted combination of the above-described considerations. The weights associated with these scores can be empirically generated for a particular processing environment. The SMC 128 can then choose and apply the allocation option having the highest (most favorable) score.

In other approaches, the SMC 128 can employ a model produced by a machine-learning process to make allocation decisions. The model is trained based on a training set that reflects the prior-assessed performance of the management functionality 122. That is, the training set may specify different mapping considerations that have been encountered in the data processing system 102, together with resultant allocation decisions that were considered desirable and undesirable (as assessed by human evaluators and/or other labelling techniques). The model that is learned reflects the relationships between input mapping considerations and desirable (and undesirable) allocation decisions.

In other approaches, the SMC 128 can treat the allocation task as a problem of finding an optimal solution within a search space, subject to specified constraints. In the present case, the constraints correspond to the above-described mapping considerations, or some subset thereof. The SMC 128 can use various techniques for quickly searching the space (such as a best-fit search technique) to find an optimal solution, or at least a satisfactory solution, even though not optimal.

Further note that the processing associated with the SMC 128 can be "layered on top of," or otherwise integrated with, any existing scheduling, resource allocation, and/or forecasting algorithm(s). For example, assume that a local host component has plural instances of tenant functionality that have issued plural respective service requests. Any conventional resource algorithm can be used to determine the order in which the requests are to be processed. For example, the conventional resource algorithm can process requests based on a first-in-first-out rule, any type of fairness calculus, any priority-based ranking of the requests (e.g., where some instances of tenant functionality may have superior priority over other instances due to the urgency of their tasks, their generally privileged statuses, and/or other factors), and so on. Once the conventional resource algorithm chooses a request to process, the SMC 128 may then apply the above considerations to determine an appropriate resource (or resources) to process the request. The SMC 128 can perform a similar allocation function when more generally considering competing demands among multiples services in its background mode of operation.

In another case, the SMC 128 can integrate forecasting analysis into the above-described logic by projecting when services will be needed (e.g., based on historical demand patterns). The SMC 128 can then automatically and proactively load those services into the acceleration plane 106 at the appropriate times.

In any of the above scenarios, the SMC 128 can also make allocation decisions based on the totality of the requests that are pending (and/or anticipated) at any given time (as opposed to considering each request in isolation). For example, assume that the SMC 128 observes that there are many pending requests for a particular service. In response, the SMC 128 can reserve a pool of acceleration components to handle these requests. In another case, the SMC 128 may take into consideration the respective locations of consumers associated with pending requests in making its allocation decisions, e.g., by favoring the selection of components that are near many of the pending consumers. The SMC 128 can perform similar analysis in the background mode when more generally considering prevailing demands for different services Finally, the above description was framed in the illustrative context of the placement determination logic 1008, which determines the placement of allocated components within the data processing system 102. Similar analyses to that described above can be applied to other aspects of the operation of the SMC 102. For example, the status determination logic 1004 can conclude that it is appropriate to label a service-to-component allocation as reserved (vs. non-reserved) based on: (a) a determination that there is significant historical demand for the service; and/or (b) a determination that the service is relatively important (e.g., due to monetary considerations and/or other factors); and/or (c) a determination that the consumer(s) themselves are important for any reason (e.g., because they have privileged rights in the data processing system 102 for any environment-specific reason); and/or (d) a determination that the service imposes relatively strict demands (due to SLA considerations, line-rate considerations, etc.), and so on.

The status determination logic 1004 can also determine whether or not the service should be dedicated to one or more particular consumers (as opposed to fully shared) based on the same analysis set forth above, but framed in the context of specific consumers. For example, the status determination logic 1004 may decide to grant a particular consumer dedicated access to a service being run on an acceleration component based on a determination that this particular consumer has frequently requested the service within a short period of time.

Figure 26:
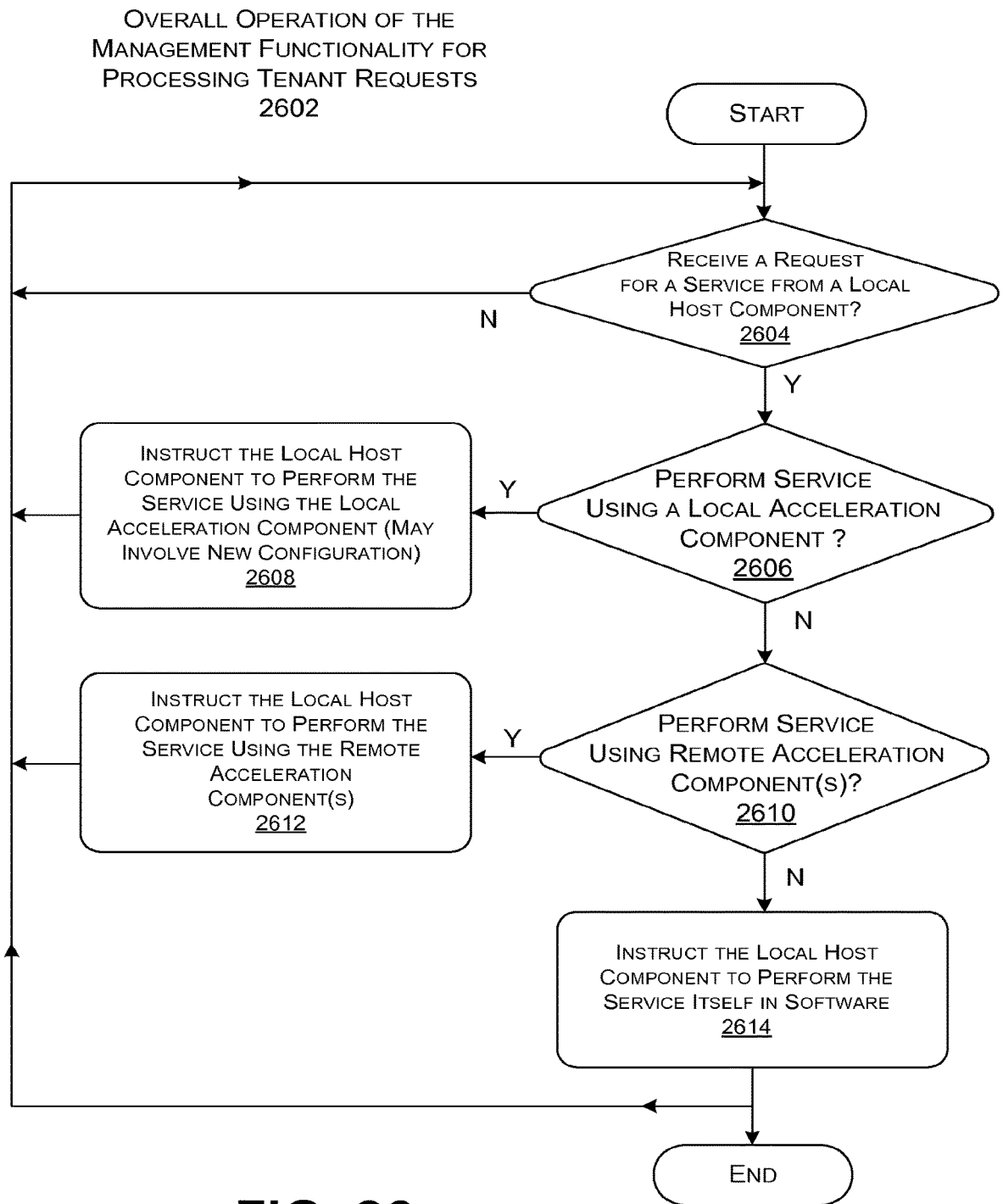
FIG. 26 is a flowchart that shows an overview of one manner of operation of the management functionality of FIG. 10, in a request-driven mode operation.

Advancing to FIG. 26, this figure corresponds to a process 2602 that shows an overview of one manner of operation of the SMC 128 of FIG. 10 in a request-driven mode, without regard to the control architecture used to implement this component, and with specific regard to the operation of the placement determination logic 1010. In block 2604, the SMC 128 determines whether it has received a request for a service from an instance of tenant functionality running on a local host component (or, more generally stated, any first local component in whatever manner implemented). In block 2606, the SMC 128 determines whether it is appropriate to perform the requested service using a local acceleration component. If so, in block 2608, the SMC 128 instructs the local host component to perform the service using the local acceleration component. In block 2610, the SMC 128 determines whether it is appropriate to perform the requested service using one or more remote acceleration components. If so, in block 2612, the SMC 128 instructs the local host component to perform the requested service using the remote acceleration component(s). The host component can access these remote acceleration component(s) via its local acceleration component in the manner described above. In block 2614, the SMC 128 instructs the local host component to perform the requested service itself in software, providing that none of the above-described options are appropriate.

Figure 27:
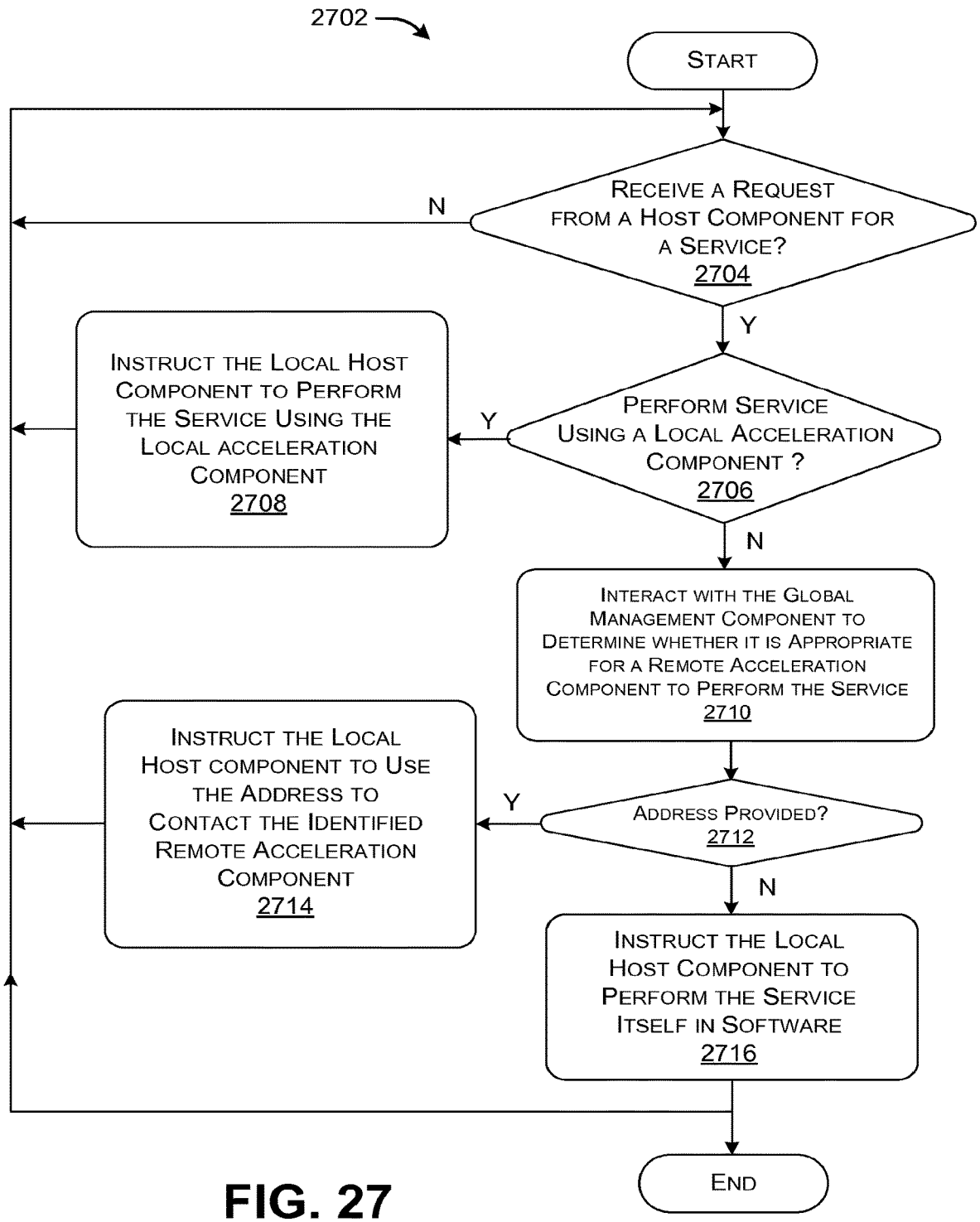
FIG. 27 is a flowchart that shows one manner of operation of the management functionality of FIG. 10 from a standpoint of a local management component.

FIG. 27 is a process 2702 that shows one manner of implementing the process of FIG. 27. In particular, the process 2702 is expressed from the perspective of a local management component ($M_L$) which interacts with a global management component ($M_G$), although other architectures can be used to perform the decision process shown in FIG. 27.

In block 2704, the local management component determines whether a request for a service has been received from an instance of tenant functionality running on a local host component. In block 2706, the local management component determines whether it is appropriate to perform the requested service using the local acceleration component. If so, in block 2708, the local management component instructs the local acceleration component to perform the service using the local acceleration component. Alternatively, in block 2710, the local management component contacts the global management component to determine whether it is appropriate for a remote acceleration component to perform the requested service. If so, the global management component returns an address associated with this service. In block 2712, the local management component determines whether an address has been identified. If so, in block 2714, the local management component instructs the local host component to use the address that has been provided to contact the identified remote acceleration component. If no address is provided, then, in block 2716, the local management component (or the global management component) instructs the local host component to perform the service itself in software.

Although not shown in FIGS. 26 and 27, each acceleration component (or the local management component associated therewith) can report its available capacity to the management functionality 122 (e.g., to a global management component) on any basis, e.g., on a periodic basis and/or on an event-driven basis. The available capacity can be specified in any manner, such as binary information which indicates whether an acceleration component is available or not available, or percentage information which reflects the fraction of the acceleration component's total processing resources that are available. In other cases, an acceleration component can report its capacity on a service by service basis. Further, a local entity (such as an instance of tenant functionality) can specifically request a particular kind of allocation, e.g., by asking that a service be run on its local acceleration component.

Figure 28:
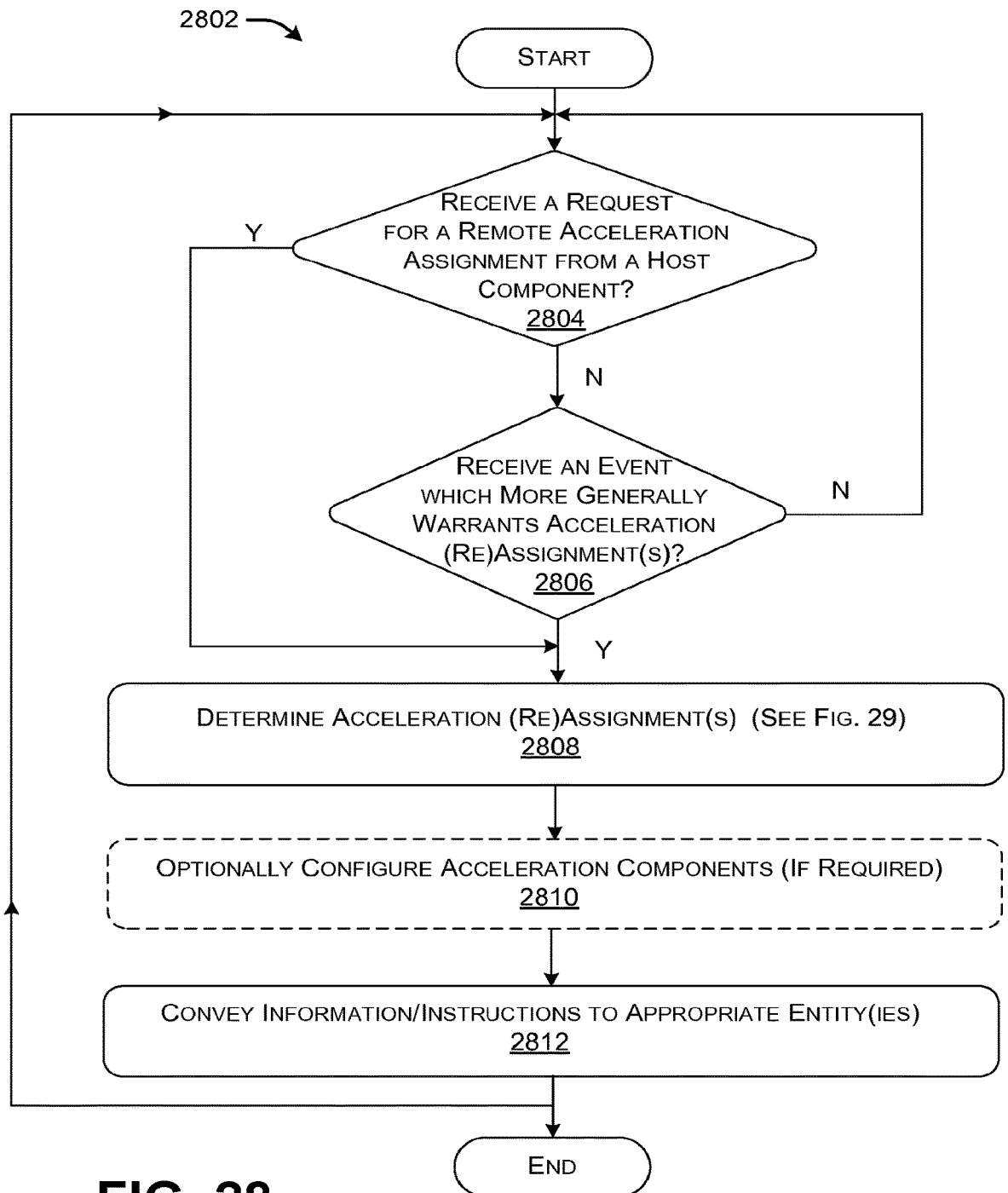
FIGS. 28-30 are flowcharts that show additional decision-related and management-related aspects of the operation of the management functionality.
Figure 29:
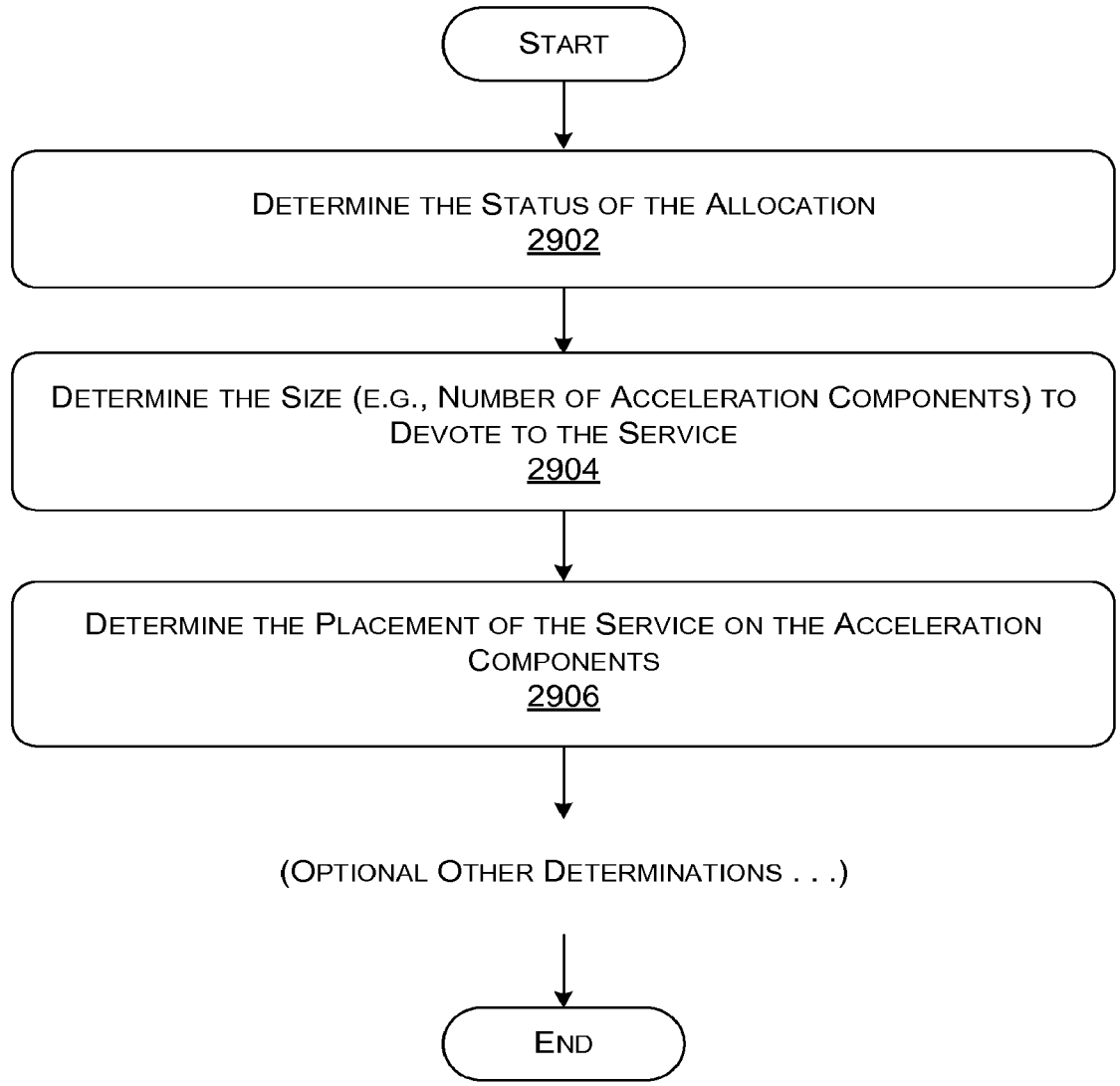
Figure 30:
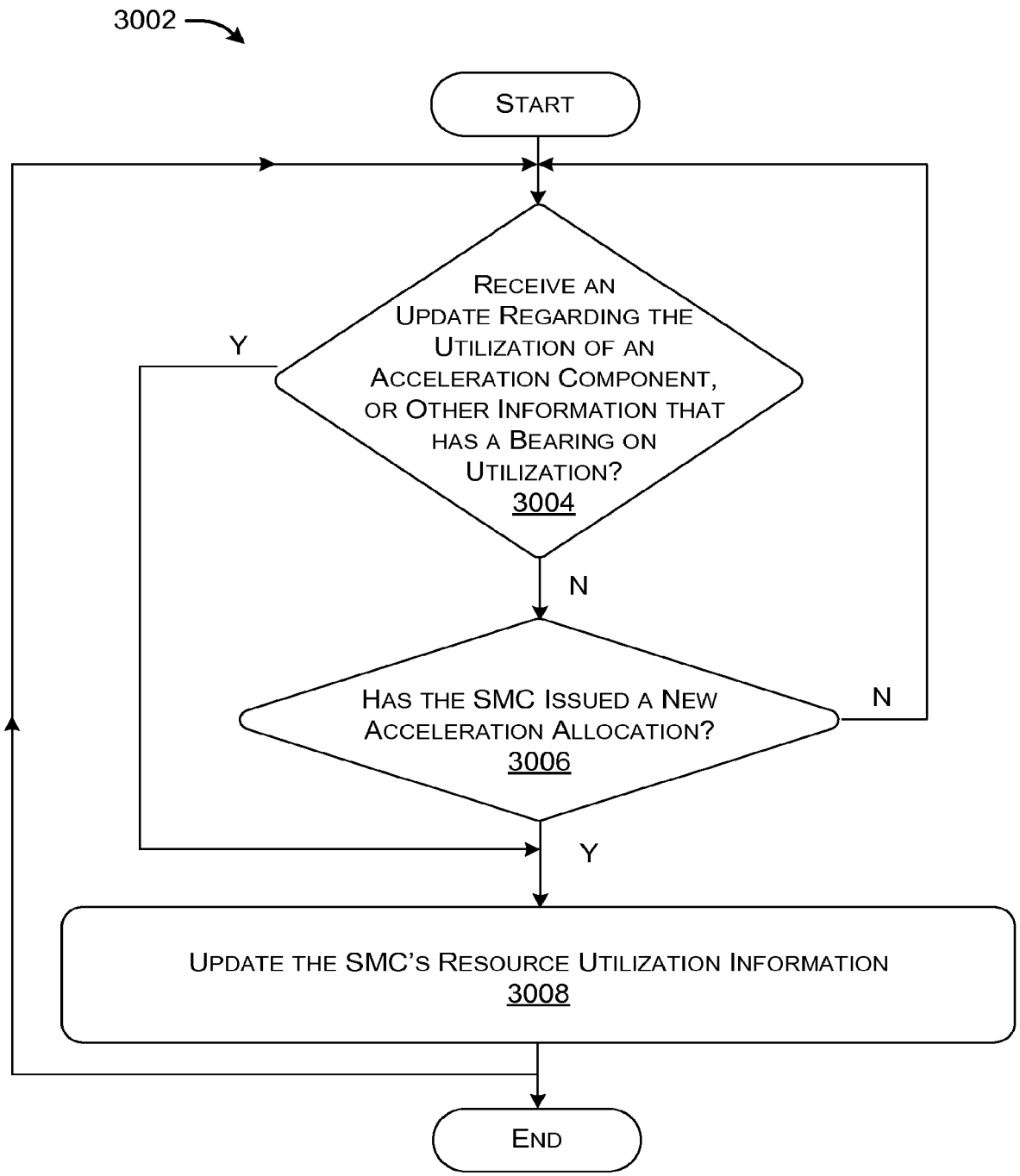

FIGS. 28-30 are processes (2802, 3002) that show the decision and management aspects of the operation of the SMC 128 of FIG. 10, e.g., from the standpoint of a global management component ($M_G$) or some other implementation.

In block 2804 of FIG. 28, the SMC 102 determines whether a request has been received (e.g., from a local management component), which asks for an address at which an identified service can be found. In other words, block 2804 determines when an event has been received which triggers the operation of the SMC 128 when operating in its request-driven mode. Further, in one implementation, block 2804 complements block 2710 of FIG. 27, in which the local management component makes such an inquiry to the global management component.

In block 2806, the SMC 102 determines whether it has received a triggering event that generally warrants reassignment of one or more services in the hardware acceleration plane 106. In other words, block 2806 asks whether an event has occurred which triggers the operation of the SMC 128 when operating in its background mode. But as noted above, the request-driven invocation in block 2804 may also entail background analysis, as a component thereof.

In block 2808, the SMC 128 determines one or more acceleration assignments in direct or indirect response to whatever triggering event has been received. The SMC 128 may indirectly respond to the triggering event, for instance, by buffering it and acting on it at a later time. In block 2810, the SMC 128 may optionally invoke the configuration component 1014 to configure one or more acceleration components, if, in fact, the allocation entails such configuration. In block 2812, the SMC 128 conveys information and/or instructions to appropriate recipient entities which will have the effect of carrying out the allocation. For example, the SMC 128 can convey an address to a local host component, which allows it to access a remote acceleration component.

FIG. 29 elaborates on different parts of the analysis that may be involved in block 2808. In block 2902, the SMC 102 may determine the status of its allocation (e.g., reserved vs. non-reserved, dedicated vs. fully shared, etc.). In block 2904, the SMC 102 may determine the number of components to be allocated to satisfy a triggering event (where the triggering event corresponds to a specific request or a general change in demand, etc.). Although not shown, the SMC 102 can also determine the type(s) of acceleration components to be selected. In block 2906, the SMC 102 determines the placement of the acceleration components within the data processing system 102, e.g., by selecting particular acceleration components within the data processing system 102.

In block 3004 of FIG. 30, the SMC 128 determines whether an update has been received regarding utilization of at least one acceleration component in the data processing system 102. For example, block 3004 may entail determining whether utilization information has been received from an acceleration component (or via a local management component) which reports the acceleration component's current spare capacity in the above-described manner. In block 3006, the SMC 128 determines whether it has itself just issued an allocation decision which affects one or more acceleration components. For example, in block 3006, the SMC 128 may have made one or more service-to-component allocations, and may have furthermore defined the status of these respective allocations (e.g., reserved vs. non-reserved, dedicated vs. fully shared, etc.) In block 3008, the SMC 128 updates resource utilization information to reflect the events of blocks 3004 and 3006. For example, the SMC 128 can update the availability information stored in the data store 1002 of FIG. 10.

C. Illustrative Implementation of a Hardware Acceleration Component

Figure 31:
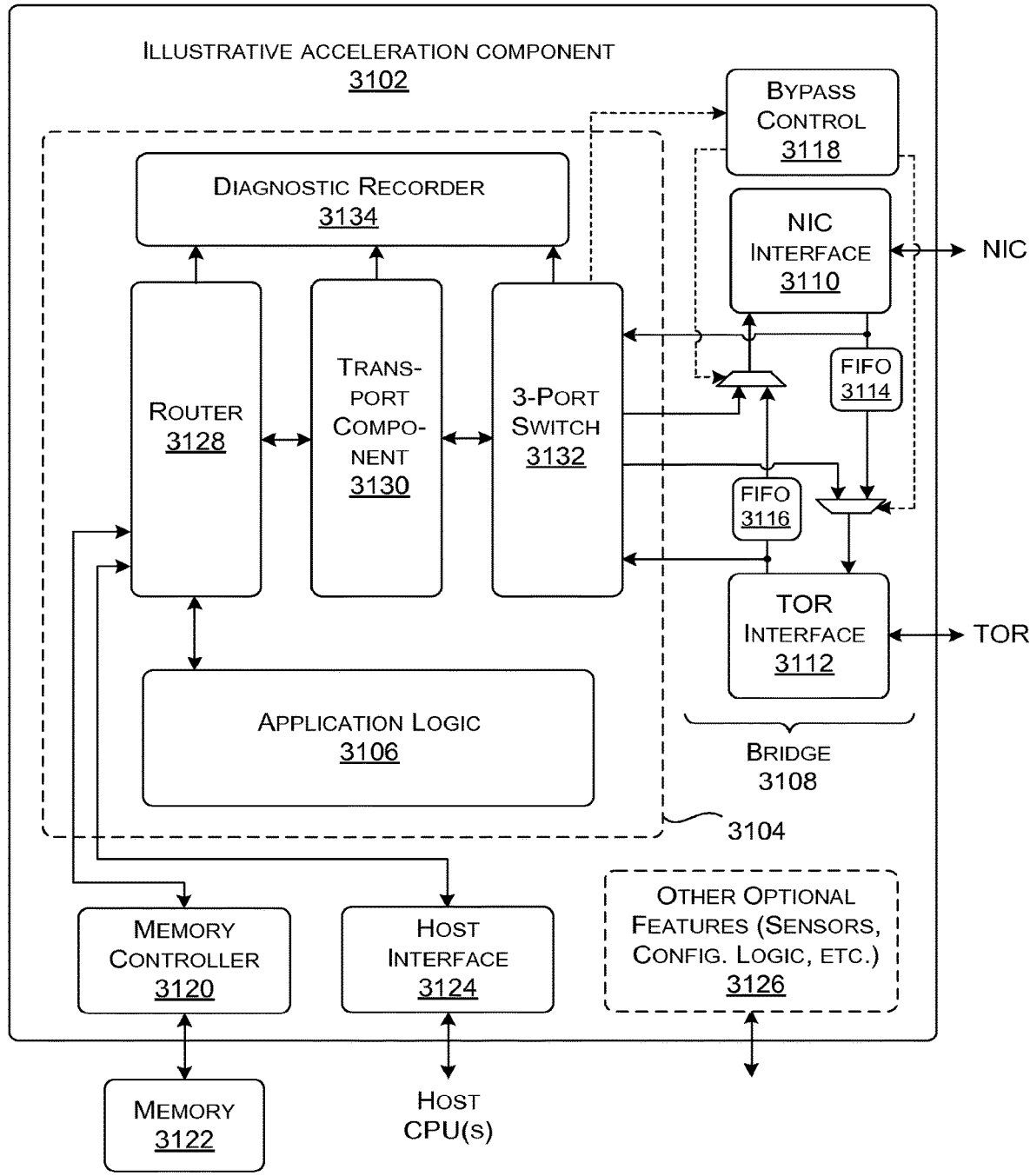
FIG. 31 shows one manner of implementing a hardware acceleration component of FIG. 1.

FIG. 31 shows one manner of implementing an acceleration component 3102 in the data processing system of FIG. 1, which may be physically implemented as an FPGA device. Note that the detail presented below is set forth in the spirit of illustration, not limitation; other data processing systems may use acceleration components having architectures which vary in one or more ways compared to that shown in FIG. 31. Further, other data processing systems may employ a heterogeneous design that includes acceleration components having different types.

From a high-level standpoint, the acceleration component 3102 may be implemented as a hierarchy having different layers of functionality. At a lowest level, the acceleration component 3102 provides an "outer shell" which provides basic interface-related components that generally remain the same across most application scenarios. A core component 3104, which lies inside the outer shell, may include an "inner shell" and application logic 3106. The inner shell corresponds to all the resources in the core component 3104 other than the application logic 3106, and represents a second level of resources that remain the same within a certain set of application scenarios. The application logic 3106 itself represents a highest level of resources which are most readily subject to change. Note however that any component of the acceleration component 3102 can technically be reconfigured.

In operation, the application logic 3106 interacts with the outer shell resources and inner shell resources in a manner analogous to the way a software-implemented application interacts with its underlying operating system resources. From an application development standpoint, the use of common outer shell resources and inner shell resources frees a developer from having to recreate these common components for each application that he or she creates. This strategy also reduces the risk that a developer may alter core inner or outer shell functions in a manner that causes problems within the data processing system 102 as a whole.

Referring first to the outer shell, the acceleration component 3102 includes a bridge 3108 for coupling the acceleration component 3102 to the network interface controller (via a NIC interface 3110) and a local top-of-rack switch (via a TOR interface 3112). The bridge 3108 supports two modes. In a first node, the bridge 3108 provides a data path that allows traffic from the NIC or TOR to flow into the acceleration component 3102, and traffic from the acceleration component 3102 to flow out to the NIC or TOR. The acceleration component 3102 can perform any processing on the traffic that it "intercepts," such as compression, encryption, etc. In a second mode, the bridge 3108 supports a data path that allows traffic to flow between the NIC and the TOR without being further processed by the acceleration component 3102. Internally, the bridge may be composed of various FIFOs (3114, 3116) which buffer received packets, and various selectors and arbitration logic which route packets to their desired destinations. A bypass control component 3118 controls whether the bridge 3108 operates in the first mode or the second mode.

A memory controller 3120 governs interaction between the acceleration component 3102 and local memory 3122 (such as DRAM memory). The memory controller 3120 may perform error correction as part of its services.

A host interface 3124 provides functionality that enables the acceleration component to interact with a local host component (not shown in FIG. 31). In one implementation, the host interface 3124 may use Peripheral Component Interconnect Express (PCIe), in conjunction with direct memory access (DMA), to exchange information with the local host component.

Finally, the shell may include various other features 3126, such as clock signal generators, status LEDs, error correction functionality, and so on.

In one implementation, the inner shell may include a router 3128 for routing messages between various internal components of the acceleration component 3102, and between the acceleration component 3102 and external entities (via a transport component 3130). Each such endpoint is associated with a respective port. For example, the router 3128 is coupled to the memory controller 3120, host interface 1120, application logic 3106, and transport component 3130.

The transport component 3130 formulates packets for transmission to remote entities (such as remote acceleration components), and receives packets from the remote acceleration components (such as remote acceleration components).

A 3-port switch 3132, when activated, takes over the function of the bridge 3108 by routing packets between the NIC and TOR, and between the NIC or TOR and a local port associated with the acceleration component 3102 itself.

Finally, an optional diagnostic recorder 3134 stores transaction information regarding operations performed by the router 3128, transport component 3130, and 3-port switch 3132 in a circular buffer. For example, the transaction information may include data about a packet's origin and destination IP addresses, host-specific data, timestamps, etc. A technician may study a log of the transaction information in an attempt to diagnose causes of failure or sub-optimal performance in the acceleration component 3102.

Figure 32:
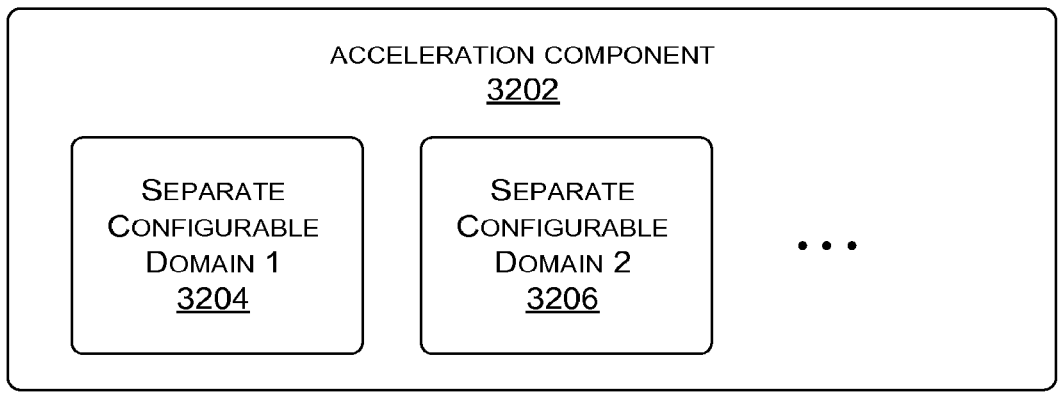
FIG. 32 shows a hardware acceleration component including separate configurable domains.

FIG. 32 shows an acceleration component 3202 that includes separate configurable domains (3204, 3206, . . . ). A configuration component (e.g., configuration component 1014 of FIG. 10) can configure each configurable domain without affecting other configurable domains. Hence, the configuration component 1014 can configure one or more configurable domains while the other configurable domains are executing operations based on their respective configurations, which are not disturbed.

In some implementations, the data processing system 102 of FIG. 1 may dynamically reconfigure its acceleration components to address any of the mapping considerations described in Section B. That reconfiguration can be performed on a partial and/or whole-service basis, and may be performed on a periodic and/or event-driven basis. Indeed, in some cases, the data processing system 102 may appear to be continually in the process of adapting itself to changing conditions in the data processing system 102 by reconfiguring its acceleration logic.

C.1. The Local Link

Figure 33:
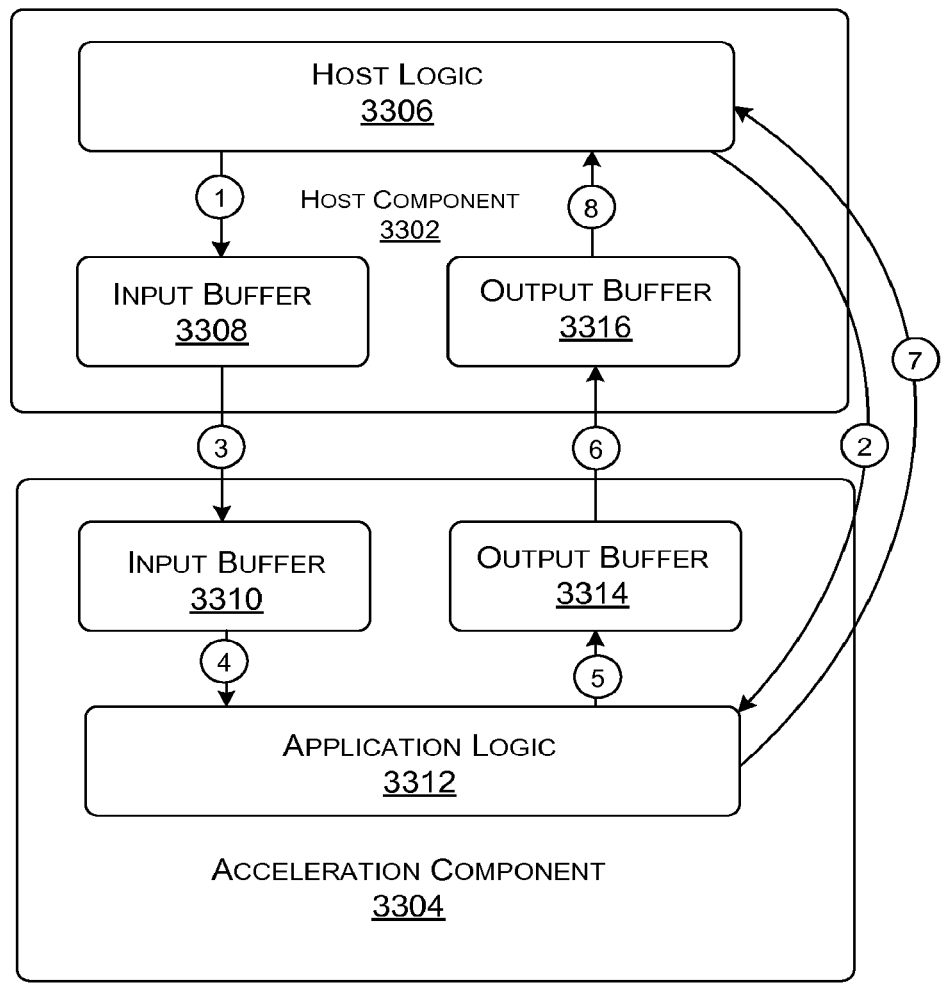
FIG. 33 shows functionality for performing data transfer between a local host component and an associated local hardware acceleration component.

FIG. 33 shows functionality by which a local host component 3302 may forward information to its local acceleration component 3304 via the host interface 3124 shown in FIG. 31 (e.g., using PCIe in conjunction with DMA memory transfer). In one non-limiting protocol, in operation (1), the host logic 3306 places data to be processed into a kernel-pinned input buffer 3308 in main memory associated with the host logic 3306. In operation (2), the host logic 3306 instructs the acceleration component 3304 to retrieve the data and begin processing it. The host logic's thread is then either put to sleep until it receives a notification event from the acceleration component 3304, or it continues processing other data asynchronously. In operation (3), the acceleration component 3304 transfers the data from the host logic's memory and places it in an acceleration component input buffer 3310.

In operations (4) and (5), the application logic 3312 retrieves the data from the input buffer 3310, processes it to generate an output result, and places the output result in an output buffer 3314. In operation (6), the acceleration component 3304 copies the contents of the output buffer 3314 into an output buffer in the host logic's memory. In operation (7), the acceleration component notifies the host logic 3306 that the data is ready for it to retrieve. In operation (8), the host logic thread wakes up and consumes the data in the output buffer 3316. The host logic 3306 may then discard the contents of the output buffer 3316, which allows the acceleration component 3304 to reuse it in the next transaction.

C.2. The Router

Figure 34:
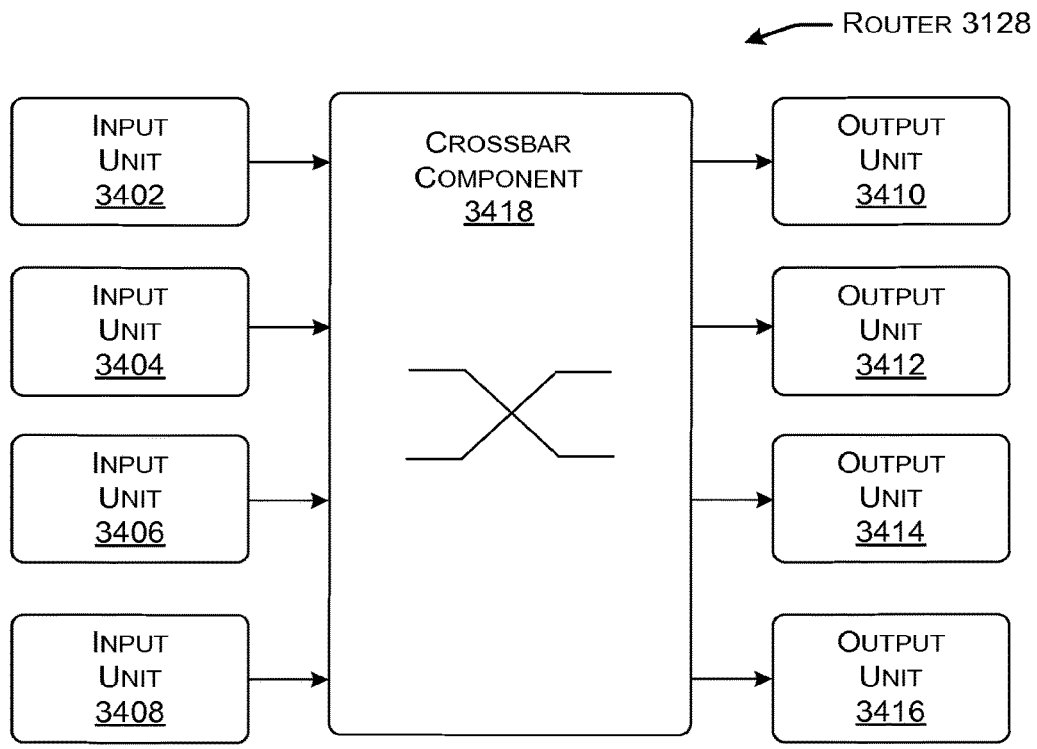
FIG. 34 shows one implementation of a router introduced in FIG. 31.

FIG. 34 shows one implementation of the router 3128 introduced in FIG. 31. The router includes any number of input units (here four, 3402, 3404, 3406, 3408) for receiving messages from respective ports, and output units (here four, 3410, 3412, 3414, 3414) for forwarding messages to respective ports. As described above, the endpoints associated with the ports include the memory controller 3120, the host interface 3124, the application logic 3106, and the transport component 3130. A crossbar component 3418 forwards a message from an input port to an output port based on address information associated with the message. More specifically, a message is composed of multiple "flits," and the router 3128 sends messages on a flit-by-flit basis.

In one non-limiting implementation, the router 3128 supports a number of virtual channels (such as eight) for transmitting different classes of traffic over a same physical link. That is, the router 3128 may support multiple traffic classes for those scenarios in which multiple services are implemented by the application logic 3106, and those services need to communicate on separate classes of traffic.

The router 3128 may govern access to the router's resources (e.g., its available buffer space) using a credit-based flow technique. In that technique, the input units (3402-3408) provide upstream entities with credits, which correspond to the exact number of flits available in their buffers. The credits grant the upstream entities the right to transmit their data to the input units (3402-3408). More specifically, in one implementation, the router 3128 supports "elastic" input buffers that can be shared among multiple virtual channels. The output units (3410-3416) are responsible for tracking available credits in their downstream receivers, and provide grants to any input units (3402-3408) that are requesting to send a flit to a given output port.

C.3. The Transport Component

Figure 35:
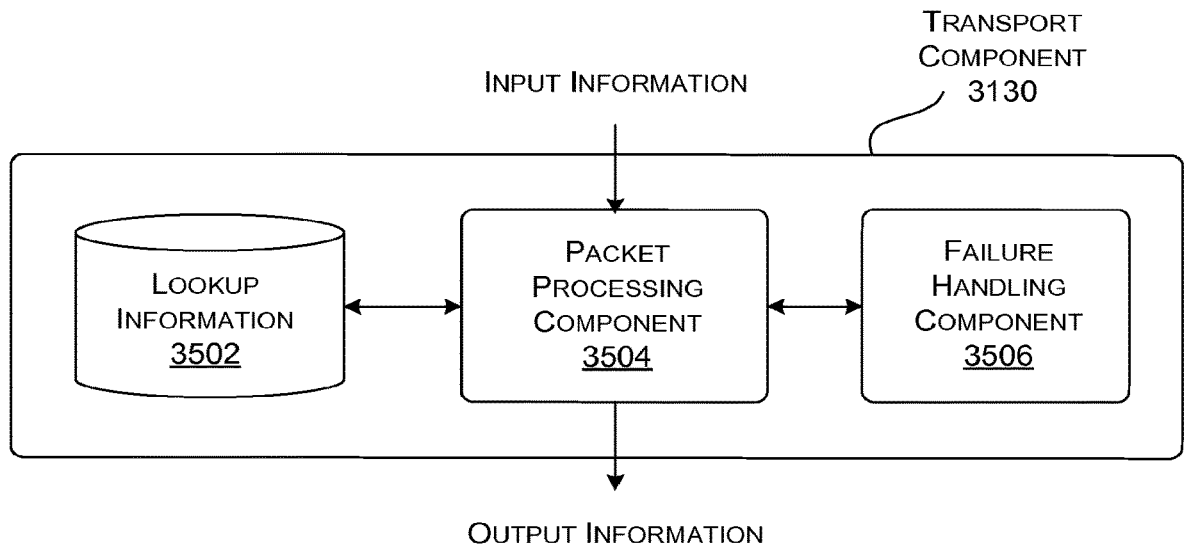
FIG. 35 shows one implementation of a transport component introduced in FIG. 31.

FIG. 35 shows one implementation of the transport component 3130 introduced in FIG. 31. The transport component 3130 may provide a register interface to establish connections between nodes. That is, each such connection is one-way and links a send queue on a source component to a receive queue on a destination component. A software process may set up the connections by statically allocating them before the transport component 3130 can transmit or receive data. A data store 3502 stores two tables that control the state of connections, a Send Connection Table and a Receive Connection Table.

A packet processing component 3504 processes messages arriving from the router 3128 which are destined for a remote endpoint (e.g., another acceleration component). It does so by buffering and packetizing the messages. The packet processing component 3504 also processes packets that are received from some remote endpoint and are destined for the router 3128.

For messages arriving from the router 3128, the packet processing component 3504 matches each message request to a Send Connection Table entry in the Send Connection Table, e.g., using header information and virtual channel (VC) information associated with the message as a lookup item, as provided by router 3128. The packet processing component 3504 uses the information retrieved from the Send Connection Table entry (such as a sequence number, address information, etc.) to construct packets that it sends out to the remote entity.

More specifically, in one non-limiting approach, the packet processing component 3504 encapsulates packets in UDP/IP Ethernet frames, and sends them to a remote acceleration component. In one implementation the packets may include an Ethernet header, followed by an IPv4 header, followed by a UDP header, followed by transport header (specifically associated with the transport component 3130), followed by a payload.

For packets arriving from the network (e.g., as received on a local port of the 3-port switch 3132), the packet processing component 3504 matches each packet to a Receive Connectable Table entry provided in the packet header. If there is a match, the packet processing component retrieves a virtual channel field of the entry, and uses that information to forward the received message to the router 3128 (in accordance with the credit-flow technique used by the router 3128).

A failure handling component 3506 buffers all sent packets until it receives an acknowledgement (ACK) from the receiving node (e.g., the remote acceleration component). If an ACK for a connection does not arrive within a specified time-out period, the failure handling component 3506 can retransmit the packet. The failure handling component 3506 will repeat such retransmission for a prescribed number times (e.g., 128 times). If the packet remains unacknowledged after all such attempts, the failure handling component 3506 can discard it and free its buffer.

C.4. The 3-Port Switch

Figure 36:
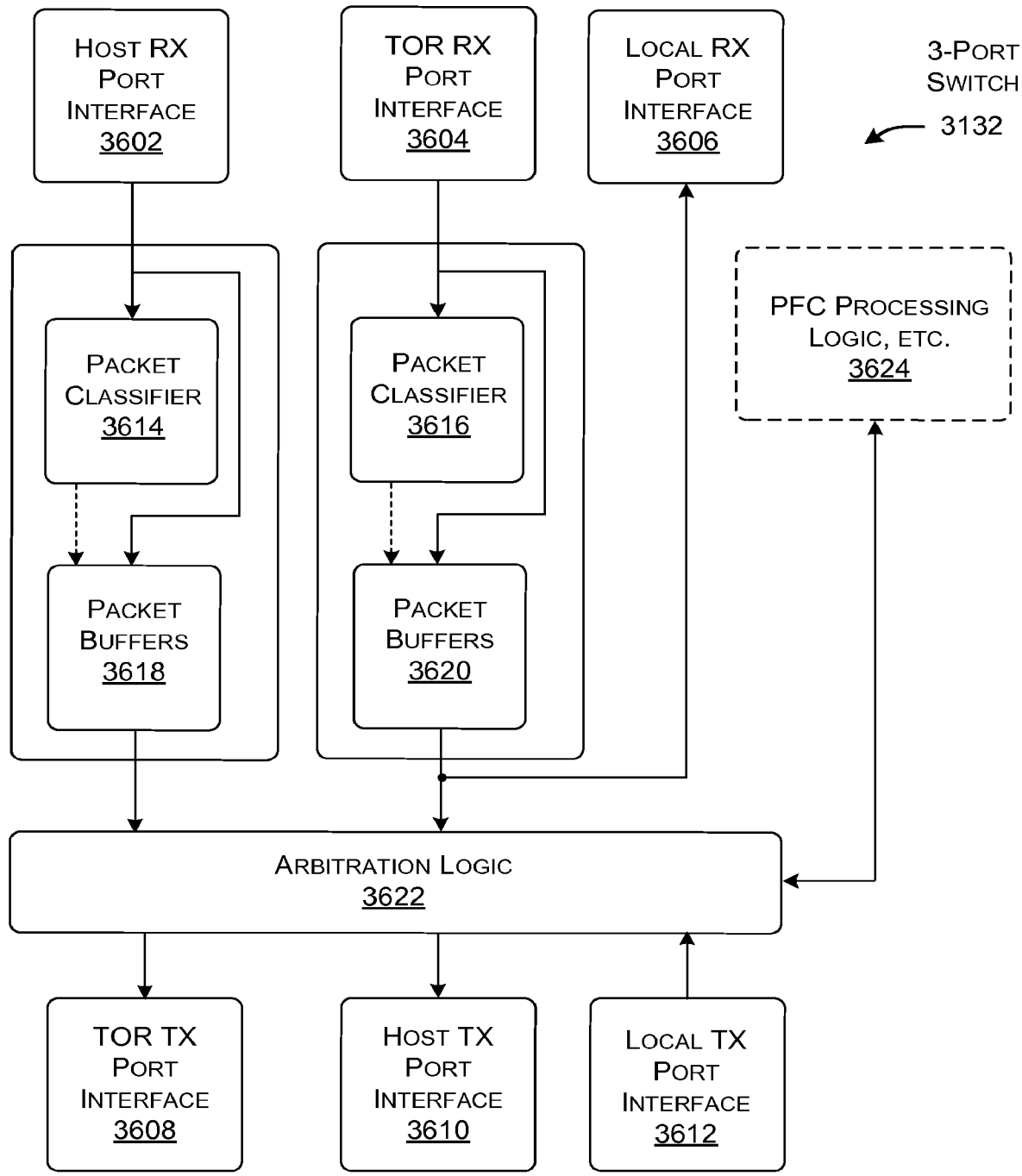
FIG. 36 shows one implementation of a 3-port switch introduced in FIG. 31.

FIG. 36 shows one implementation of the 3-port switch 3132. The 3-port switch 3132 operates to safely insert (and remove) acceleration component-generated network packets onto a data center network without compromising host-to-TOR network traffic.

The 3-port switch 3132 connects to the NIC interface 3110 (corresponding to a host interface), the TOR interface 3112, and a local interface associated with the local acceleration component 3102 itself. The 3-port switch 3132 may be conceptualized as including receiving interfaces (3602, 3604, 3606) for respectively receiving packets from the host component and TOR switch, and for receiving packets at the local acceleration component. The 3-port switch 3132 also includes transmitting interfaces (3608, 3610, 3612) for respectively providing packets to the TOR switch and host component, and receiving packets transmitted by the local acceleration component.

Packet classifiers (3614, 3616) determine the class of packets received from the host component or the TOR switch, e.g., based on status information specified by the packets. In one implementation, each packet is either classified as belonging to a lossless flow (e.g., remote direct memory access (RDMA) traffic) or a lossy flow (e.g., transmission control protocol/Internet Protocol (TCP/IP)

traffic). Traffic that belongs to a lossless flow is intolerant to packet loss, while traffic that belongs to a lossy flow can tolerate some packet loss.

Packet buffers (3618, 3620) store the incoming packets in different respective buffers, depending on the class of traffic to which they pertain. If there is no space available in the buffer, the packet will be dropped. (In one implementation, the 3-port switch 3132 does not provide packet buffering for packets provided by the local acceleration component (via the local port) because the application logic 3106 can regulate the flow of packets through the use of "back pressuring.") Arbitration logic 3622 selects among the available packets and transmits the selected packets.

As described above, traffic that is destined for the local acceleration component is encapsulated in UDP/IP packets on a fixed port number. The 3-port switch 3132 inspects incoming packets (e.g., as received from the TOR) to determine if they are UDP packets on the correct port number. If so, the 3-port switch 3132 outputs the packet on the local RX port interface 3606. In one implementation, all traffic arriving on the local TX port interface 3612 is sent out of the TOR TX port interface 3608, but it could also be sent to the host TX port interface 3610. Further note that FIG. 36 indicates that the acceleration component 3102 intercepts traffic from the TOR, but not from the host component; but it could be configured to intercept traffic from the host component as well.

PFC processing logic 3624 allows the 3-port switch 3132 to insert Priority Flow Control frames into either the flow of traffic transmitted to the TOR or host component. That is, for lossless traffic classes, if a packet buffer fills up, the PFC processing logic 3624 sends a PFC message to the link partner, requesting that traffic on that class be paused. If a PFC control frame is received for a lossless traffic class on either the host RX port interface 3602 or the TOR RX port interface 3604, the 3-port switch 3132 will cease sending packets on the port that received the control message.

C.5. An Illustrative Host Component

Figure 37:
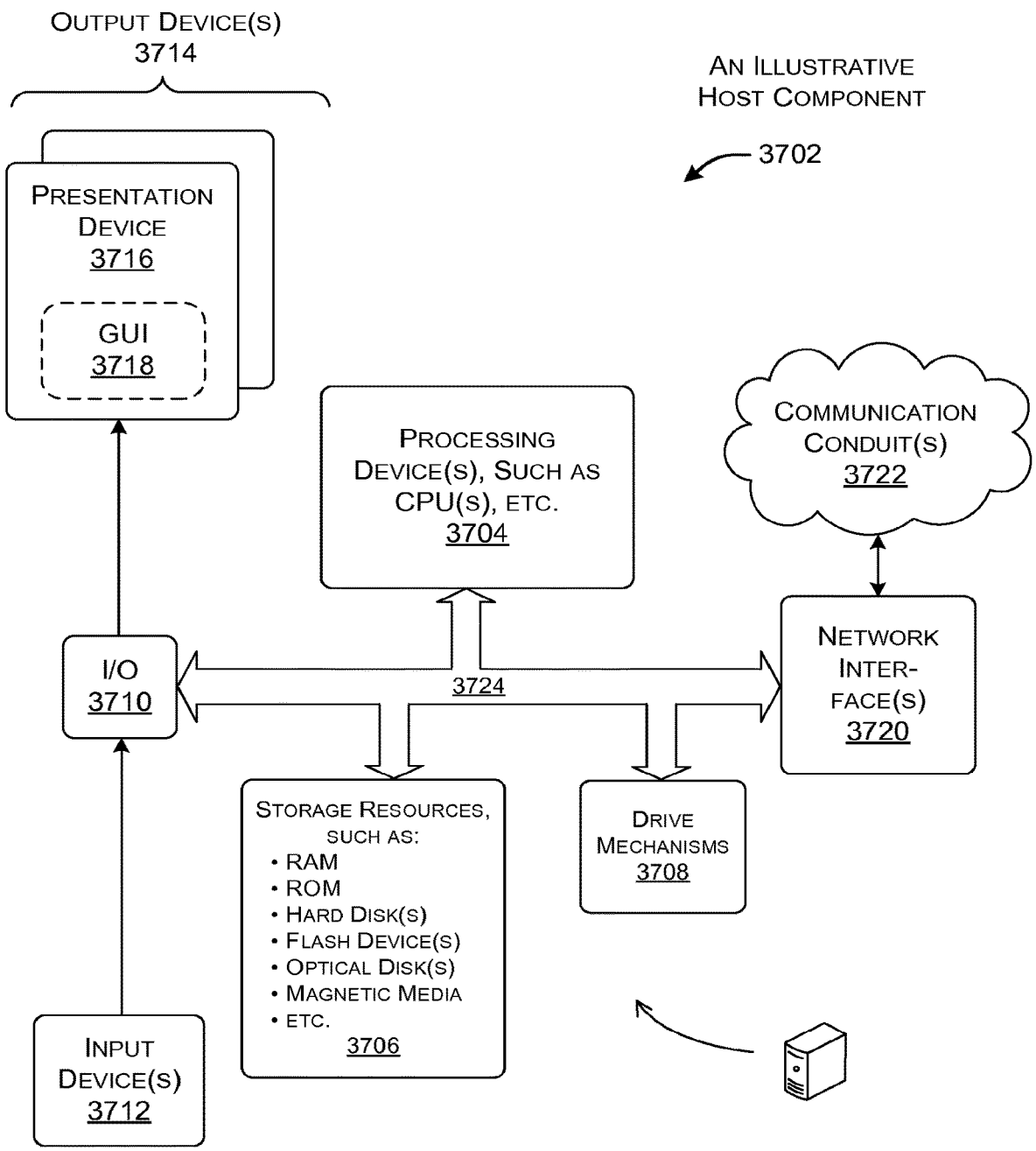
FIG. 37 shows one implementation of a host component shown in FIG. 1.

FIG. 37 shows one implementation of a host component 3702, corresponding to any of the host components (S) shown in FIG. 1. The host component 3702 can include one or more processing devices 3704, such as one or more central processing units (CPUs), each of which may implement one or more hardware threads. The host component 3702 can also include any storage resources 3706 for storing any kind of information, such as code, settings, data, etc. Without limitation, for instance, the storage resources 3706 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the host component 3702. In one case, the host component 3702 may perform any of the operations associated with local tenant functionality when the processing devices 3704 carry out associated instructions stored in any storage resource or combination of storage resources. The host component 3702 also includes one or more drive mechanisms 3708 for interacting with any storage resource, such as a hard disk drive mechanism, an optical disk drive mechanism, and so on.

The host component 3702 also includes an input/output module 3710 for receiving various inputs (via input devices 3712), and for providing various outputs (via output devices 3714). One particular output mechanism may include a presentation device 3716 and an associated graphical user interface (GUI) 3718. The host component 3702 can also include one or more network interfaces 3720 for exchanging data with other devices via one or more communication conduits 3722. One or more communication buses 3724 communicatively couple the above-described components together.

The communication conduit(s) 3722 can be implemented in any manner, e.g., by a local area network, a wide area network (e.g., the Internet), point-to-point connections, etc., or any combination thereof. The communication conduit(s) 3722 can include any combination of hardwired links, wireless links, routers, gateway functionality, name servers, etc., governed by any protocol or combination of protocols.

The following summary provides a non-exhaustive list of illustrative aspects of the technology set forth herein.

According to a first aspect, a data processing system is described that includes: a first local component that includes at least one instance of tenant functionality that requests a service; a local hardware acceleration component; a local link for coupling the first local component with the local hardware acceleration component; at least one remote hardware acceleration component that is indirectly accessible to the first local component; and a service mapping component that is configured to apply at least one rule to determine whether the service is to be satisfied by at least one of: the first local component, the local hardware acceleration component, and/or one or more of the remote hardware acceleration component(s).

According to a second aspect, the first local component is a first local host component that uses one or more central processing units to execute machine-readable instructions.

According to a third aspect, the service mapping component is configured to select a use of the local hardware acceleration component when it is determined that the local hardware acceleration component is already configured to provide the service.

According to a fourth aspect, the service mapping component is configured to select a use of the local hardware acceleration component when it is determined that the service is a line-rate service.

According to a fifth aspect, the service mapping component is configured to select a use of the local hardware acceleration component based on a latency-related consideration, pertaining to an amount of latency that will be incurred in interacting with the service.

According to a sixth aspect, the service mapping component is configured to select among candidate hardware acceleration components based on a service level requirement (SLA) associated with the service.

According to a seventh aspect, the service mapping component is configured to select among candidate hardware acceleration components based on a consideration of whether the service is characterized by intermittent traffic, or steady traffic.

According to an eighth aspect, the service mapping component is configured to select among candidate hardware acceleration components based on a security-related consideration.

According to a ninth aspect, the service mapping component is configured to select a use of the first local component to perform the service when it is determined that neither the local hardware acceleration component nor the remote hardware acceleration component can feasibly perform the service.

According to a tenth aspect, the data processing system further includes a configuration component, wherein the service mapping component is configured to use the configuration component to configure at least one hardware acceleration component to perform the service upon determining that the above-referenced at least one hardware acceleration component is not already configured to perform the service.

According to an eleventh aspect, the service mapping component is configured use the configuration component to perform partial configuration of the above-referenced at least one hardware acceleration component, which entails configuring part of each hardware acceleration component while leaving other parts of each hardware acceleration component unaltered.

According to a twelfth aspect, the service mapping component is configured to: receive a request for the service from the instance of tenant functionality provided by the first local component; determine whether it is appropriate for the service to be performed by the local hardware acceleration component; instruct the first local component to perform the service using the local hardware acceleration component, if a determination is made that it is appropriate for the service to be performed by the local hardware acceleration component; determine whether it is appropriate for the remote hardware acceleration component to perform the service, if it is determined that it is not appropriate for the local hardware acceleration component to perform the service; and instruct the first local component to interact with the remote hardware acceleration component, via the local hardware acceleration component, if it is determined that it is appropriate for the remote hardware acceleration component to perform the service.

According to a thirteenth aspect, the service mapping component is further configured to instruct the first local component to perform the service itself if it is determined that the remote acceleration component is not appropriate to perform the service.

According to a fourteenth aspect, the service mapping component includes a local management component and a global management component. The above-referenced determining whether it is appropriate for the service to be performed by the local hardware acceleration component is performed by the local management component. The above-referenced determining whether it is appropriate for the remote hardware acceleration component to perform the service is performed by the global management component. Further, the global management component forwards an address associated with the remote hardware acceleration component to the first local component, upon a determination that it is appropriate for the remote hardware acceleration component to perform the service. The first local component then accesses the service using the address, via the local hardware acceleration component.

According to a fifteenth aspect, a method, performed in a data processing system, is described herein that involves receiving a request for a service from tenant functionality implemented by a local host component, the local host component using one or more central processing units to execute machine-readable instructions. The method further includes determining whether it is appropriate for the service to be performed by a local hardware acceleration component, the local hardware acceleration component being coupled to the local host component via a local link. The method further includes instructing the local host component to perform the service using the local hardware acceleration component, if a determination is made that it is appropriate for the service to be performed by the local hardware acceleration component. The method further includes determining whether it is appropriate for a remote hardware acceleration component to perform the service, if it is determined that it is not appropriate for the local hardware acceleration component to perform the service, wherein the remote hardware acceleration component is accessible to the local host component via the local hardware acceleration component. The method further includes instructing the local host component to interact with the remote hardware acceleration component, via the local hardware acceleration component, if it is determined that it is appropriate for the remote hardware acceleration component to perform the service.

According to a sixteenth aspect, the method further includes instructing the local host component to perform the service itself if is determined that the remote acceleration component is not appropriate to perform the service.

According to a seventeenth aspect, the service mapping component includes a local management component and a global management component. The above-referenced determining of whether it is appropriate for the service to be performed by the local hardware acceleration component is performed by the local management component, and the above-referenced determining of whether it is appropriate for the remote hardware acceleration component to perform the service is performed by the global management component. Further, the global management component forwards an address associated with the remote hardware acceleration component to the local host component, upon a determination that it is appropriate for the remote hardware acceleration component to perform the service. Further, the local host component accesses the service using the address, via the local hardware acceleration component.

According to an eighteenth aspect, the above-referenced determining of whether it is appropriate for the service to be performed by the local hardware acceleration component is configured to select the use of the local hardware acceleration component when it is determined that the local hardware acceleration component is already configured to provide the service.

According to a nineteenth aspect, the above-referenced determining of whether it is appropriate for the service to be performed by the local hardware acceleration component is configured to select the use of the local hardware acceleration component when it is determined that the service is a line-rate service.

According to a twentieth aspect, at least one device that implements a service mapping component is described herein that includes logic configured to receive a request for a service from tenant functionality implemented by a local host component, the local host component using one or more central processing units to execute machine-readable instructions. The device(s) also includes logic configured to determine whether it is appropriate for the service to be performed by a local hardware acceleration component, the local hardware acceleration component being coupled to the local host component via a local link. The device(s) further includes logic configured to instruct the local host component to perform the service using the local hardware acceleration component, if a determination is made that it is appropriate for the service to be performed by the local hardware acceleration component. The device(s) further includes logic configured to determine whether a remote hardware acceleration component can perform the service, if it is determined that it is not appropriate for the local hardware acceleration component to perform the service, the remote hardware acceleration component being accessible to the local host component via the local hardware acceleration component. The device(s) further includes logic configured to instruct the local host component to interact with the remote hardware acceleration component, via the local hardware acceleration component, if it is determined that it is appropriate for the remote hardware acceleration component to perform the service. The device(s) further includes logic configured to instruct the local host component to perform the service itself if it is determined that it is not appropriate for the remote hardware acceleration component to perform the service.

A twenty-first aspect corresponds to any combination (e.g., any permutation or subset) of the above-referenced first through twentieth aspects.

A twenty-second aspect corresponds to any method counterpart, device counterpart, system counterpart, means counterpart, computer readable storage medium counterpart, data structure counterpart, article of manufacture counterpart, graphical user interface presentation counterpart, etc. associated with the first through twenty-first aspects.

In closing, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A data processing system, comprising:
    a first server unit that includes a first processing unit configured to execute tenant functionality, a first hardware acceleration component, and a first local link configured to couple the first processing unit with the first hardware acceleration component;
    a second server unit that includes a second processing unit, a second hardware acceleration component, and a second local link configured to couple the second processing unit with the second hardware acceleration component; and
    a service mapping component provided on the first server unit, the second server unit, or another device in the data processing system, the service mapping component being configured to, in different instances, cause one or more services requested by the tenant functionality on the first processing unit to be satisfied by the first processing unit, the first hardware acceleration component, and the second hardware acceleration component on a demand-sensitive basis,
    wherein the service mapping component is further configured to, in at least one instance, reallocate service assignments in the data processing system by:
        determining that a particular tenant instance executing on the first processing unit has requested a particular service;
        determining that the second processing unit is co-located with the first processing unit and has also requested the particular service; and
        based at least on the second processing unit being co-located with the first processing unit, designating the first hardware acceleration component for performing the particular service, the first hardware acceleration component having a reserved status for the particular service that prevents reconfiguration of the first hardware acceleration component in at least some circumstances.

2. The data processing system of claim 1, wherein the first processing unit and the second processing unit are central processing units configured to execute machine-readable instructions and are located in the same server rack.

3. The data processing system of claim 1, wherein the service mapping component is configured to:
    maintain availability information indicating whether the first hardware acceleration component and a third hardware acceleration component are available; and
    select the first hardware acceleration component or the third hardware acceleration component to perform the particular service based at least on the availability information.

4. The data processing system of claim 1, wherein the service mapping component is configured to:
    determine that the particular service is scheduled to run, in the future, on the first hardware acceleration component; and
    assign another service to execute on the second hardware acceleration component based at least on the particular service being scheduled to run on the first hardware acceleration component in the future.

5. The data processing system of claim 1, wherein the service mapping component is configured to:
    while the first hardware acceleration component is reserved for performing the particular service, assign one or more other services to the second hardware acceleration component instead of the first hardware acceleration component.

6. The data processing system of claim 1, wherein the service mapping component is configured to:
    monitor overall demand for services in the data processing system; and
    reallocate individual services to the first hardware acceleration component or the second hardware acceleration component based at least on detecting a change in the overall demand.

7. The data processing system of claim 1, wherein the service mapping component is provided on the first processing unit, the second processing unit, or a third processing unit of the data processing system.

8. The data processing system of claim 1, wherein the first hardware acceleration component and the second hardware acceleration component comprise field-programmable gate arrays, massively parallel processor arrays, graphics processing units, application-specific integrated circuits, or multiprocessor system-on-chip devices.

9. A method comprising:
    receiving requests to execute different services in a data processing system, the data processing system comprising a plurality of processing units and a plurality of hardware accelerators;
    allocating individual hardware accelerators to perform individual services in response to the requests;
    monitoring overall demand for the different services in the data processing system;
    detecting a change in the overall demand for a particular service in the data processing system;
    responsive to detecting the change in the overall demand, reallocating the individual hardware accelerators by adjusting how the individual services are allocated to the individual hardware accelerators; and
    wherein the reallocating comprises, in at least one instance:
        identifying a particular hardware accelerator that shares a local link with a particular processing unit having a particular tenant instance that has requested the particular service;
        identifying other processing units that are co-located with the particular processing unit and have also requested the particular service; and based at least on the other processing units being co-located with the particular processing unit, designating the particular hardware accelerator for performing the particular service, the particular hardware accelerator having a reserved status for the particular service that prevents reconfiguration of the particular hardware accelerator in at least some circumstances.

10. The method of claim 9, further comprising:
based at least on the particular hardware accelerator having the reserved status, reconfiguring another hardware accelerator in the data processing system to perform another service while the particular hardware accelerator remains configured to perform the particular service.

11. The method of claim 9, further comprising:
in response to an initial request for the particular service, configuring the particular hardware accelerator to perform the particular service and designating the particular hardware accelerator with a non-reserved status; and
in response to multiple subsequent requests for the particular service, designating the particular hardware accelerator as having the reserved status.

12. The method of claim 11, the local link comprising a hardware bus.

13. A system comprising:
a plurality of processing units configured to execute tenant functionality that requests services;
a plurality of hardware accelerators comprising parallel logic elements configured to perform computational tasks to implement the services; and
a common network shared by the plurality of processing units and the plurality of hardware accelerators,
an individual processing unit being configured to:
cause different services be performed in different instances on different processing units and different hardware accelerators in response to changing demands for the different services;
identify a particular hardware accelerator that shares a local link with a particular processing unit having a particular tenant instance that has requested a particular service;
identify other processing units that are co-located with the particular processing unit and have also requested the particular service; and
based at least on the other processing units being co-located with the particular processing unit, designate the particular hardware accelerator for performing the particular service, the particular hardware accelerator having a reserved status for the particular service that prevents reconfiguration of the particular hardware accelerator in at least some circumstances.

14. The system of claim 13, wherein the individual processing unit is further configured to:
determine that the particular processing unit has repeatedly requested the particular service within a period of time; and
designate the particular hardware accelerator as having the reserved status for performing the particular service based at least on the particular hardware accelerator having the local link connecting the particular hardware accelerator to the particular processing unit that has repeatedly requested the particular service within the period of time.

15. The system of claim 14, wherein the local link comprises a hardware bus.

16. The system of claim 14, wherein the particular hardware accelerator, the particular processing unit, and the other processing units are located in the same server rack.

17. The system of claim 16, the particular processing unit and the particular hardware accelerator sharing a physical network address on the common network.

18. The system of claim 17, the plurality of processing units and the plurality of hardware accelerators using different network protocols to communicate over the common network.

19. The system of claim 17, the plurality of processing units and the plurality of hardware accelerators using different network ports to communicate over the common network.

20. The system of claim 17, the plurality of processing units and the plurality of hardware accelerators using different values of a status flag in packets communicated over the common network.

* * * * *